United States Patent
Ohara et al.

(10) Patent No.: US 11,997,557 B2
(45) Date of Patent: May 28, 2024

(54) MOBILE COMMUNICATION SYSTEM, MASTER BASE STATION, SECONDARY BASE STATION, TARGET BASE STATION AND USER EQUIPMENT

(71) Applicant: Mitsubishi Electric Corporation, Chiyoda-ku (JP)

(72) Inventors: Takuya Ohara, Tokyo (JP); Taisei Suemitsu, Tokyo (JP); Mitsuru Mochizuki, Tokyo (JP); Kuniyuki Suzuki, Tokyo (JP); Masayuki Nakazawa, Tokyo (JP); Daisuke Hiramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/863,533

(22) Filed: Jul. 13, 2022

(65) Prior Publication Data

US 2022/0353770 A1   Nov. 3, 2022

Related U.S. Application Data

(63) Continuation of application No. 16/903,478, filed on Jun. 17, 2020, now abandoned, which is a
(Continued)

(30) Foreign Application Priority Data

Mar. 20, 2014 (JP) .................................. 2014-058327
May 21, 2014 (JP) .................................. 2014-105050

(51) Int. Cl.
*H04L 5/00*   (2006.01)
*H04W 16/32*   (2009.01)
(Continued)

(52) U.S. Cl.
CPC .......... *H04W 36/08* (2013.01); *H04L 5/0053* (2013.01); *H04W 16/32* (2013.01); *H04W 36/0069* (2018.08); *H04W 36/28* (2013.01)

(58) Field of Classification Search
CPC . H04W 36/08; H04W 16/32; H04W 36/0069; H04W 36/28; H04L 5/0053; Y02D 30/70
See application file for complete search history.

(56) References Cited

U.S. PATENT DOCUMENTS

2015/0215826 A1   7/2015   Yamada
2015/0230107 A1   8/2015   Chiba
(Continued)

FOREIGN PATENT DOCUMENTS

WO   WO 2015/114687 A1   8/2015
WO   WO 2015/115629 A1   8/2015
WO   WO 2015/141607 A1   9/2015

OTHER PUBLICATIONS

Discussionon handover procedure for small cell/3GPP TSG RAN2 Meeting #85 R2-140921/ Jan. 10-14, 2014/ 4 pgs.*
(Continued)

*Primary Examiner* — Joseph E Dean, Jr.
(74) *Attorney, Agent, or Firm* — Procopio, Cory, Hargreaves & Savitch LLP

(57) ABSTRACT

When being connected to a macro cell (S-MeNB) and a small cell (SeNB), a user equipment device performs a pre-handover process of disconnecting the connection with the SeNB before a handover process of switching a macro cell connected with the UE from the macro cell (S-MeNB) that is a moving source to a macro cell (T-MeNB) that is a moving destination along with moving of the UE, and after the handover process, performs a post-handover process of reestablishing the connection with the SeNB.

4 Claims, 34 Drawing Sheets

Related U.S. Application Data continuation of application No. 15/127,230, filed as application No. PCT/JP2015/057611 on Mar. 16, 2015, now Pat. No. 10,743,227.

(51) Int. Cl.
    *H04W 36/00*     (2009.01)
    *H04W 36/08*     (2009.01)
    *H04W 36/28*     (2009.01)

(56) References Cited

U.S. PATENT DOCUMENTS

| | | |
|---|---|---|
| 2015/0264612 A1 | 9/2015 | Baek |
| 2015/0351139 A1* | 12/2015 | Zhang ................. H04L 65/1104 370/329 |
| 2016/0338134 A1 | 11/2016 | Nagasaka |
| 2017/0034866 A1 | 2/2017 | Wager |
| 2018/0035339 A1* | 2/2018 | Mitsui ................... H04W 72/04 |
| 2019/0104452 A1* | 4/2019 | Park ................. H04W 36/0085 |
| 2022/0110076 A1 | 4/2022 | Shimoda |

OTHER PUBLICATIONS

Discussion handover procedure for small cell/3GPPTSG RAN2 Meeting #85 R2-140921/Jan. 10-14, 2014/4 pgs.*
International Search Report dated May 26, 2015, in PCT/JP2015/057611 filed Mar. 16, 2015.
3GPP TS 36.300, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", V11.7.0, 209 Pages, (Sep. 2013).
3GPP TS 36.304, "3$^{rd}$ Generation Partnership Project; Technical Specification Group Radio Access Network; Evolved Universal Terrestrial Radio Access (E-UTRA) ; User Equipment (UE) procedures in idle mode (Release 11)", V11.2.0, 33 Pages, (Dec. 2012).
3GPP TSG0-SA1 #42, S1-083461, Work Item: EHNB, "LS on HNB/HeNB Open Access Mode", 2 Pages, (Oct. 13-17, 2008).
3GPP TSG-RAN WG2 Meeting #62, R2-082899, Work Item: LTE, "LS on CSG cell identification", Qualcomm, 2 Pages, (May 5-9, 2008).
3GPP TR 36.814, "3$^{rd}$ Generation Partnership Project; Technical Specification Group Radio Access Network; Evolved Universal Terrestrial Radio Access (E-UTRA) ; Further advancements for E-UTRA physical layer aspects (Release 9)", V9.0.0, 104 Pages, (Mar. 2010).
3GPP TR 36.912, "3$^{rd}$ Generation Partnership Project; Technical Specification Group Radio Access Network; Feasibility study for Further Advancements for E-UTRA (LTE-Advanced) (Release 10)", V10.0.0, 263 Pages, (Mar. 2011).
3GPP TR 36.819, 3$^{rd}$ Generation Partnership Project; Technical Specification Group Radio Access Network; Coordinated multi-point operation for LTE physical layer aspects (Release 11), V11.1.0, 69 Pages, (Dec. 2011).
3GPP TS 36.141, "3$^{rd}$ Generation Partnership Project; Technical Specification Group Radio Access Network; Evolved Universal Terrestrial Radio Access (E-UTRA); Base Station (BS) conformance testing (Release 11)", V11.1.0, 224 Pages, (Jun. 2012).
3GPP TSG RAN WG1 Meeting #74bis, R1-134496, NTT Docomo, "Views on Small Cell On/Off with Small Cell Discovery", Agenda Item 7.2.6.1.1, 5 Pages, (Oct. 7-11, 2013).
International Preliminary Report on Patentability and Written Opinion dated Sep. 29, 2016 in PCT/JP2015/057611 (w/English translation).
3GPP TSG RAN WG1 Meeting #73, R1-132236, LG Electronics, "Analysis and design considerations of cell on/off in small cell", 6 Pages, (May 20-24, 2013).
3GPP TR 36.842, 3$^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects, (Release 12), V0.2.0, 38 Pages, (May 2013).
3GPP TSG-RAN2 Meeting #85, R2-140921, ZTE Corporation, Agenda Item: 7.2.1 , "Discussion on handover procedure for small cell", 4 Pages, (Jan. 10-14, 2014).
3GPP TSG-RAN WG2 #85, R2-140698, Kyocera, Agenda Item: 7.2.1, "Handover enhancements with dual connectivity", 8 Pages, (Feb. 10-14, 2014).
3GPP TSG RAN2 Meeting #85, R2-140511, NEC, Agenda Item: 7.2.1 ., "PCell change in dual connectivity", 2 Pages, (Feb. 10-14, 2014).
3GPP TSG-RAN WG3 Meeting #83, R3-140117, Huawei, "MeNB Mobility Procedure", 5 Pages, (Feb. 10-14, 2014).
3GPP TSG-RAN WG2 #84, Tdoc R2-134219, Ericsson, Agenda Item: 7.2.2.1 "Signalling procedures for dual connectivity", 9 Pages, (Nov. 11-15, 2013).
3GPP TSG-RAN WG3 #82, R3-132204, ZTE Corporation, Agenda Item: 20.2.1, "Signalling flows of solution 1A", 7 Pages, (Nov. 11-15, 2013).
3GPP TSG RAN WG3 Meeting #83, R3-140060, CATT, Agenda Item: 15.3, "ES solutions in small cells", 3 Pages, (Feb. 10-14, 2014).
Extended European Search Report dated Sep. 21, 2017 in Patent Application No. 15764823.9.
"3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, XP050917200, 2013, Retrieved from the Internet on Jan. 7, 2014, 71 page.
NTT Docomo, Inc., "Introduction of Dual Connectivity", 3GPP TSG-RAN WG2 #85, R2-140906, XP050770936, Feb. 10-14, 2014, Retrieved from the Internet on Feb. 22, 2014, 45 pages.
Extended European Search Report dated Feb. 5, 2019 in European Patent Application No. 18209619.8.
Japanese Office Action dated Apr. 16, 2019 in Patent Application No. 2016-508707, 10 pages (w/unedited computer-generated English translation).
Combined Chinese Office Action and Search Report dated Mar. 22, 2019 in Patent Application No. 201580015207.9, 15 pages (w/English translation).
Office Action dated Jun. 10, 2020 in Indian Application No. 201647031437.
Extended European Search Report dated Sep. 9, 2020 in corresponding European Patent Application No. 20183408.2, 10 pages.
Office Action dated Oct. 5, 2021 in Japanese Application No. 2020-113959 (w/computer-generated English translation).
Broadcom Corporation, "MCG handover for Dual Connectivity", R2-140531, 3GPP TSG-RAN WG2 Meeting #85, Prague, Czech Republic, Feb. 10-14, 2014.
Ericsson, "Mobility procedures for dual connectivity", Tdoc R2-140642, 3GPP TSG-RAN WG2 #85, Prague, Czech Republic, Feb. 10-14, 2014.
Office Action dated Sep. 30, 2021 in European Application No. 20 183 408.2.
Indian Office Action dated Jan. 19, 2022 in Indian Patent Application No. 202148009845, 8 pages.
Indian Office Action dated Jan. 20, 2022 in Indian Patent Application No. 202148009864, 8 pages.
Indian Office Action dated Jan. 20, 2022 in Indian Patent Application No. 202148009866, 8 pages.
Japanese Office Action dated Mar. 7, 2023 in Japanese Application 2022-078625, (with unedited computer-generated English translation), 7 pages.
Japanese Office Action dated Aug. 1, 2023, issued in Japanese Patent Application No. 2022-078625 (with English translation).
3GPP TSG-RAN WG3 Meeting #83, Prague, Czech Republic. Feb. 10-14, 2014. "Dual connectivity—mobility scenarios", R3-140346.
3GPP TSG-RAN WG3 Meeting #83, Prague, Czech Republic. Feb. 10-14, 2014. "Dual connectivity—mobility scenarios", RJ-140346.
European Patent Office, Extended European Search Report, Application No. 23187542.8, dated Nov. 3, 2023, in 10 pages.

(56) References Cited

OTHER PUBLICATIONS

Japanese Patent Office, Decision of Refusal, Application No. 2022-078625, dated Feb. 13, 2024, in 6 pages.
Japanese Patent Office, Dismissal of amendment, Application No. 2022-078625, dated Feb. 13, 2024, in 3 pages.

* cited by examiner

F I G . 1
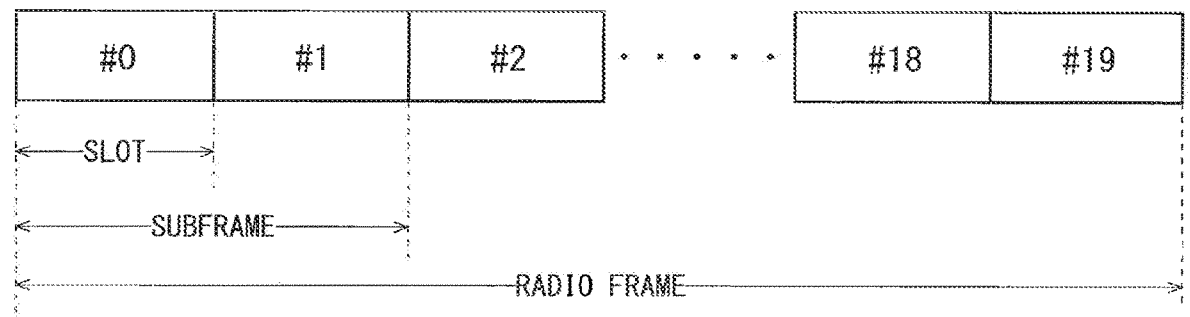

F I G. 5
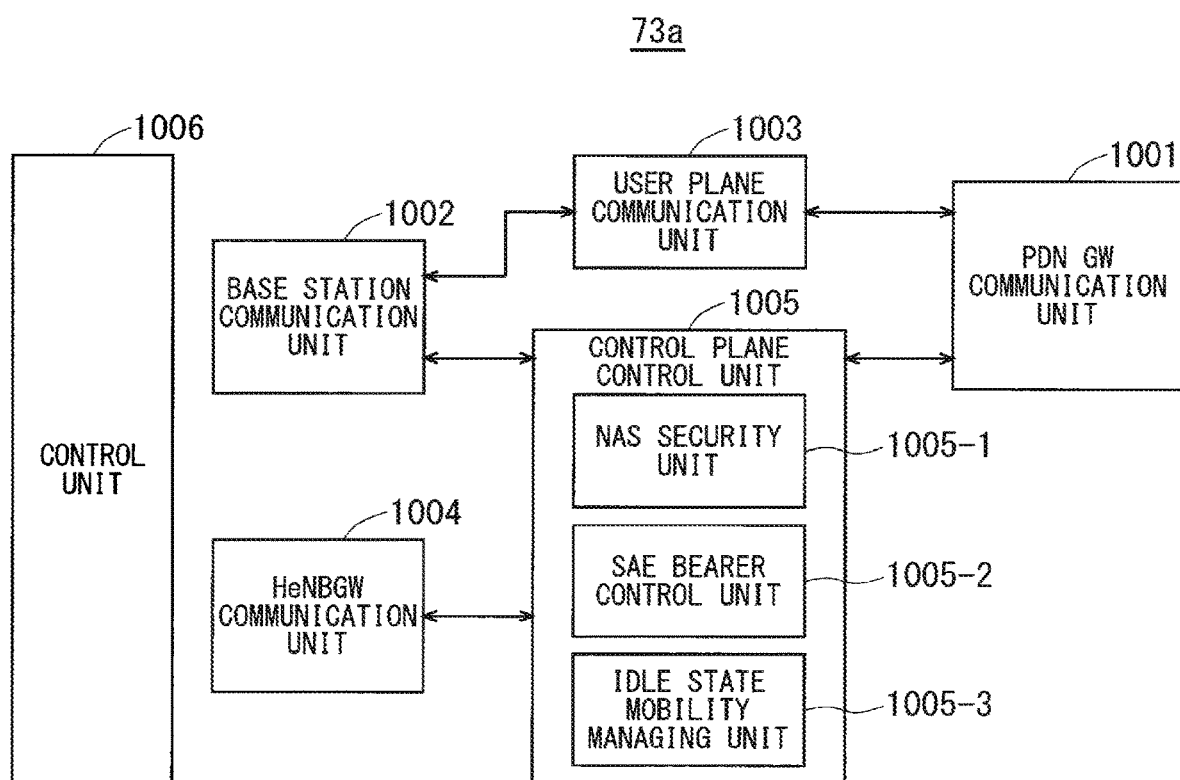

F I G. 9
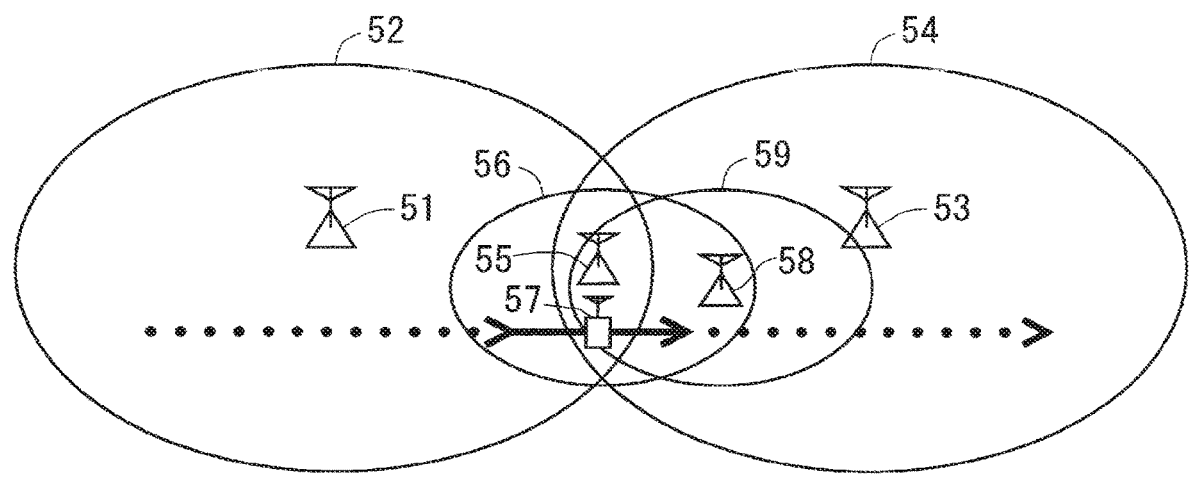

F I G. 3 1
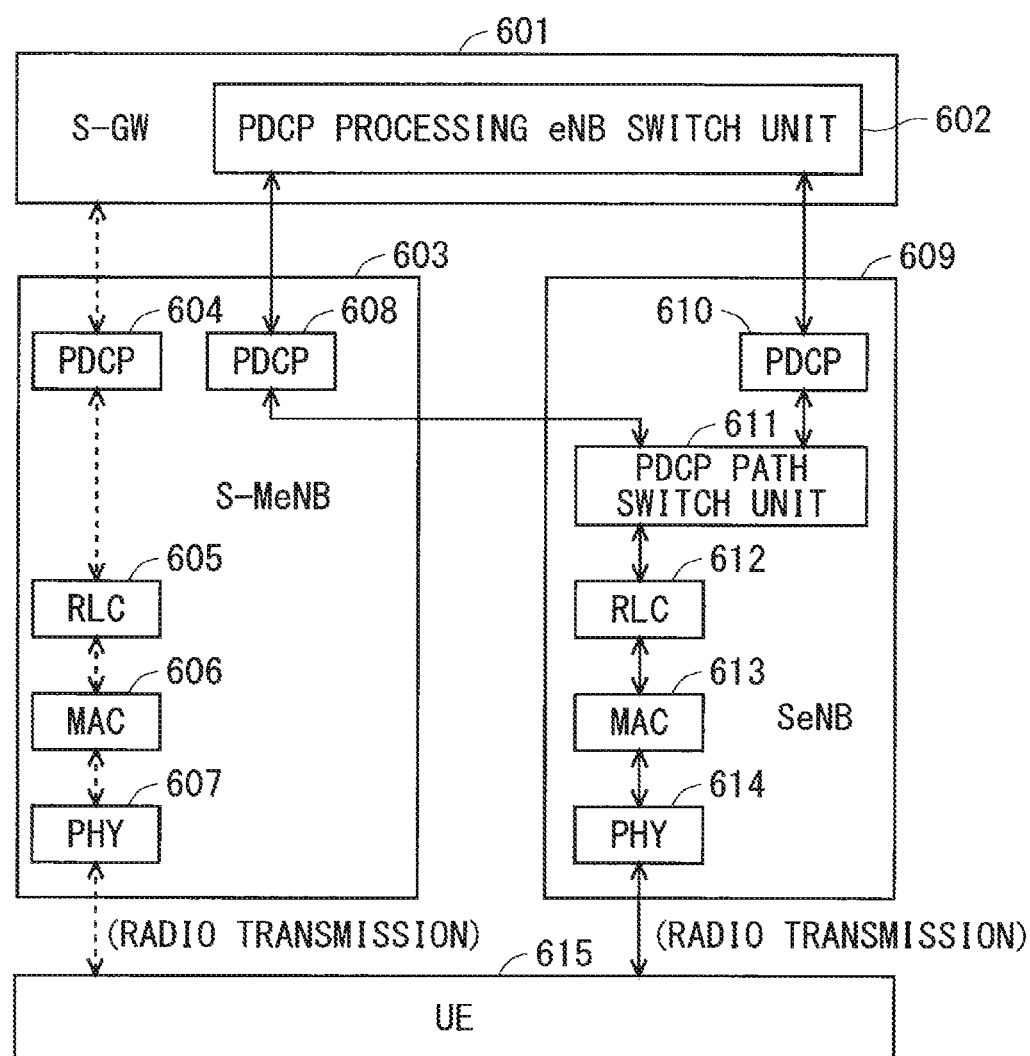

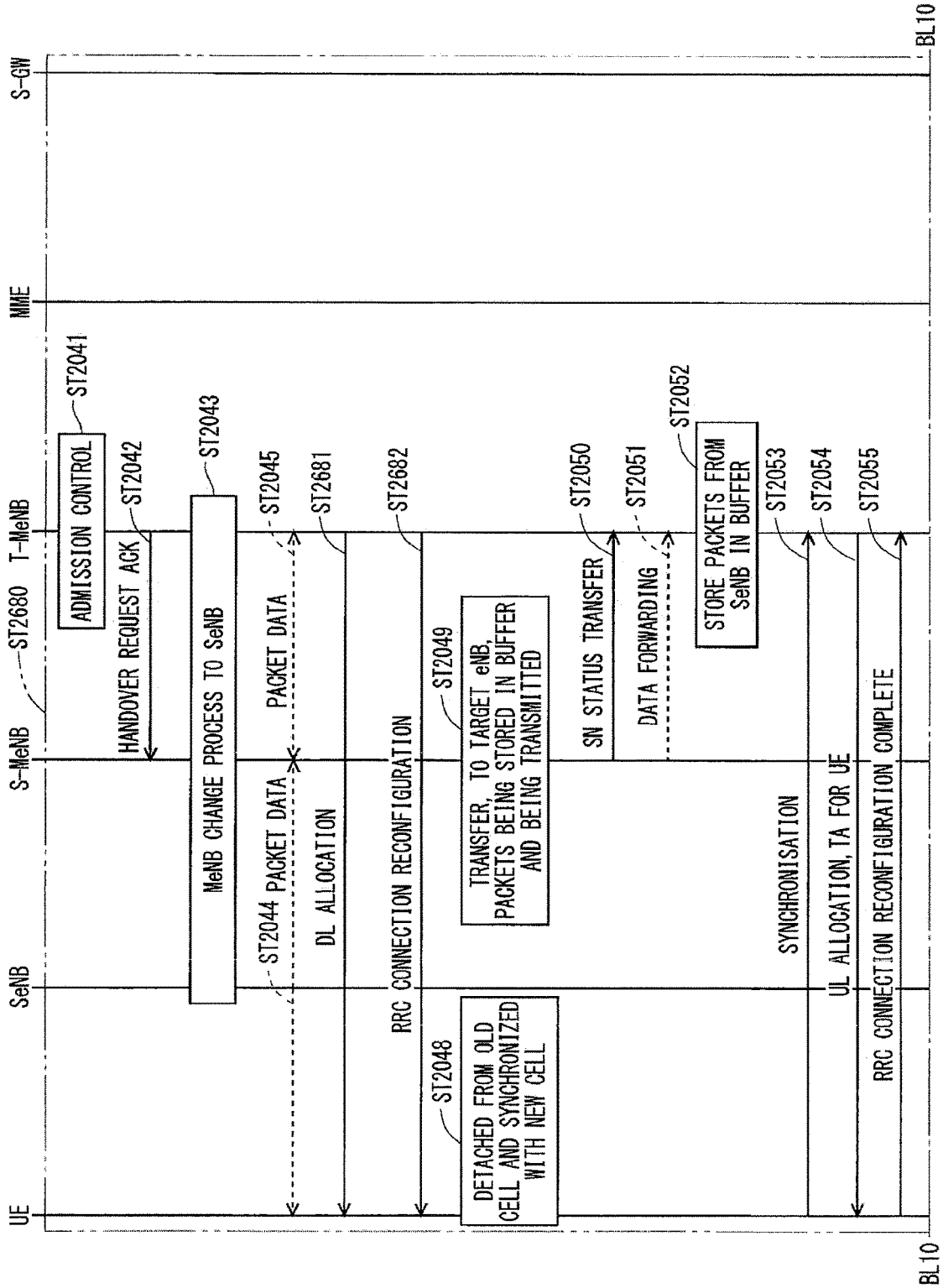

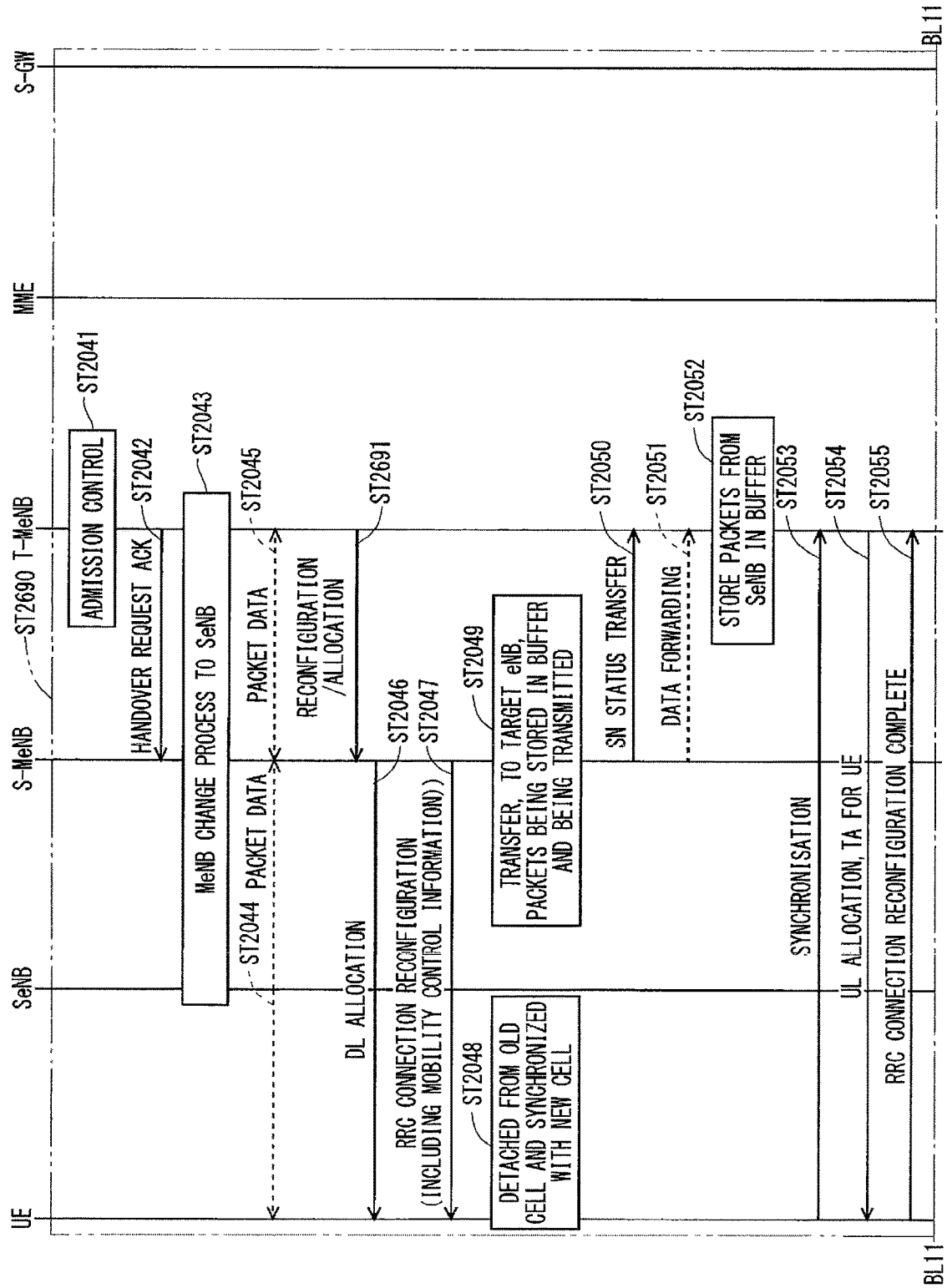

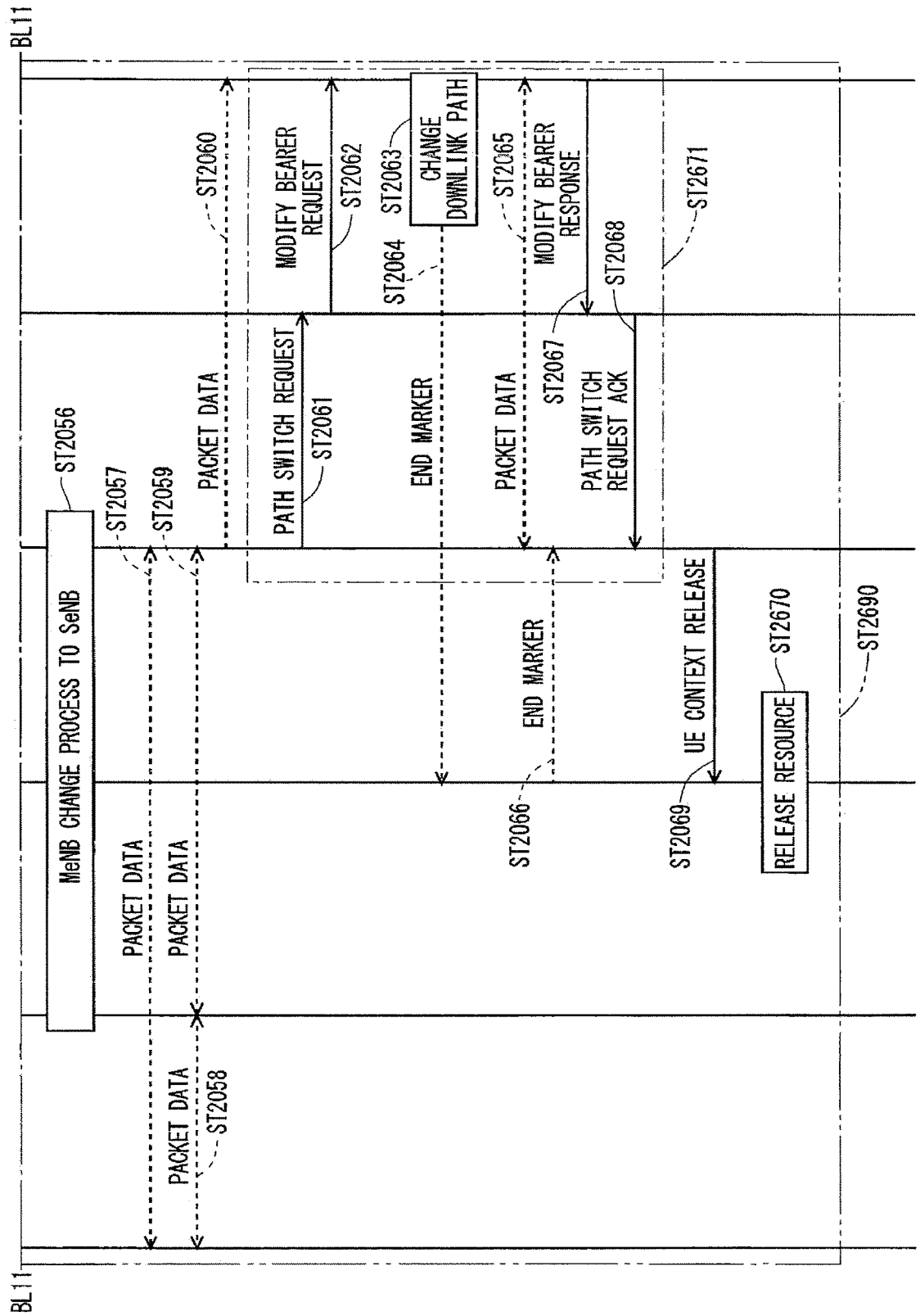

MOBILE COMMUNICATION SYSTEM, MASTER BASE STATION, SECONDARY BASE STATION, TARGET BASE STATION AND USER EQUIPMENT

CROSS-REFERENCE TO RELATED APPLICATIONS

This application is a continuation of and claims the benefit of priority under 35 U.S.C. § 120 from U.S. application Ser. No. 16/903,478 filed Jun. 17, 2020, which is a continuation of U.S. application Ser. No. 15/127,230 filed Sep. 19, 2016 (now U.S. Pat. No. 10,743,227 issued Aug. 11, 2020), the entire contents of which are incorporated herein by reference. U.S. application Ser. No. 15/127,230 is a National Stage of PCT/JP2015/057611 filed Mar. 16, 2015, which claims the benefit of priority under 35 U.S.C. § 119 from Japanese Application No. 2014-058327 filed Mar. 20, 2014 and Japanese Application No. 2014-105050 filed May 21, 2014.

TECHNICAL FIELD

The present invention relates to a communication system in which radio communication is performed between a communication terminal device and a base station device.

BACKGROUND ART

The 3rd generation partnership project (3GPP), the standard organization regarding the mobile communication system, is studying new communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 10). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal (SS) per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station to a user equipment. A BCH transport block is mapped to four subframes within a 40 ms interval. There is no explicit signaling indicating 40 ms timing.

A physical control format indicator channel (PCFICH) is a channel for downlink transmission from a base station to a user equipment. The PCFICH notifies the number of orthogonal frequency division multiplexing (OFDM) symbols used for PDCCHs from the base station to the user equipment. The PCFICH is transmitted per subframe.

A physical downlink control channel (PDCCH) is a channel for downlink transmission from a base station to a user equipment. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Hack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signals (DM-RSs) being UE-specific reference signals, positioning reference signals (PRSs), and channel-state information reference signals (CSI-RSs). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-TD that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking the locations of user equipments and calling user equipments, in other words, incoming calling to user equipments even in an idle state. An area for tracking locations of user equipments is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both of the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form and a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

The traffic flow of a mobile network is on the rise, and the communication rate is also increasing. It is expected that the communication rate will be further increased when the operations of the LTE and the LTE-A are fully initiated, leading to an increase in traffic flow.

Widespread use of smartphones and tablet terminals explosively increases traffic in cellular radio communications, causing a fear of insufficient radio resources all over the world.

To deal with the problem of increased traffic, 3GPP is developing specifications of Release 12. In the specifications of Release 12, the use of small eNBs is studied to satisfy a tremendous volume of traffic in the future. In an example technique under study, a large number of small eNBs are installed to configure a large number of small cells, thus increasing spectral efficiency for increased communication capacity.

In Release 12, dual connectivity is discussed as the technique of connecting a user equipment to both of a macro cell and a small cell when the macro cell and the small cell overlap each other (see Non-Patent Document 11).

PRIOR ART DOCUMENTS

Non-Patent Documents

Non-Patent Document 1: 3GPP TS 36.300 V11.7.0
Non-Patent Document 2: 3GPP TS 36.304 V11.2.0
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.1.0
Non-Patent Document 8: 3GPP TS 36.141 V11.1.0
Non-Patent Document 9: 3GPP R1-134496
Non-Patent Document 10: 3GPP R1-132236
Non-Patent Document 11: 3GPP TR 36.842 V0.2.0

SUMMARY OF INVENTION

Problem to be Solved by the Invention

As described above, Non-Patent Document 11 discloses dual connectivity as the technique of connecting a user equipment to both of a macro cell and a small cell when the macro cell and the small cell overlap each other.

Non-Patent Document 11, however, discloses nothing about an approach in which a user equipment during dual connectivity performs handover. The conventional handover method, in which a user equipment is connected to a single cell, does not reflect the connections of the UE to a macro cell and a small cell in dual connectivity.

Thus, the conventional handover approach cannot be applied to a user equipment during dual connectivity without any contrivance.

The present invention has an object to provide a communication system in which a user equipment device being connected with both of a macro cell and a small cell successfully performs handover between macro cells.

Means to Solve the Problem

A communication system of the present invention is a communication system including a user equipment device and a base station device configuring cells capable of radio communication with the user equipment device. The cells include a plurality of macro cells and a small cell that have a coverage in which the plurality of macro cells and the small cell are communicable with the user equipment device. The coverage of each of the plurality of macro cells is relatively large, and the coverage of the small cell is relatively small. When being connected to one of the plurality of macro cells and to the small cell, the user equipment device performs a pre-handover process of disconnecting connection with the small cell before a handover process of switching a macro cell connected with the user equipment device from a macro cell being a moving source to a macro cell being a moving destination along with moving of the user equipment device, and a post-handover process of reestablishing the connection with the small cell after the handover process.

A communication system according to the present invention is a communication system including a user equipment device and a base station device configuring cells capable of radio communication with the user equipment device. The cells include a plurality of macro cells and a small cell that have a coverage in which the plurality of macro cells and the small cell are communicable with the user equipment device. The coverage of each of the plurality of macro cells is relatively large, and the coverage of the small cell is relatively small. When the user equipment device is connected to one of the plurality of macro cells and to the small cell, upon activation of a handover process of switching a macro cell connected with the user equipment device from a macro cell being a moving source to a macro cell being a moving destination along with moving of the user equipment device, the small cell is notified that the macro cell that controls the small cell is to be changed.

Effects of the Invention

The communication system of the present invention allows the user equipment device being connected with both of the macro cell and the small cell to perform handover between the macro cells.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 5 is a block diagram showing the configuration of an MME according to the present invention.

FIG. 9 shows another example coverages of eNBs in the communication system of the first embodiment of the present invention.

FIG. 31 shows an example status of data transmission and reception to and from a UE.

FIG. 32 shows an example sequence of a MeNB HO process for EPS bearer #1 in a communication system of a sixth embodiment of the present invention.

FIG. 34 shows an example sequence of a MeNB HO process for EPS bearer #1 in a communication system of a seventh embodiment of the present invention.

FIG. 35 shows the example sequence of the MeNB HO process for EPS bearer #1 in the communication system of the seventh embodiment of the present invention.

DESCRIPTION OF EMBODIMENTS

First Embodiment

Figure 2:
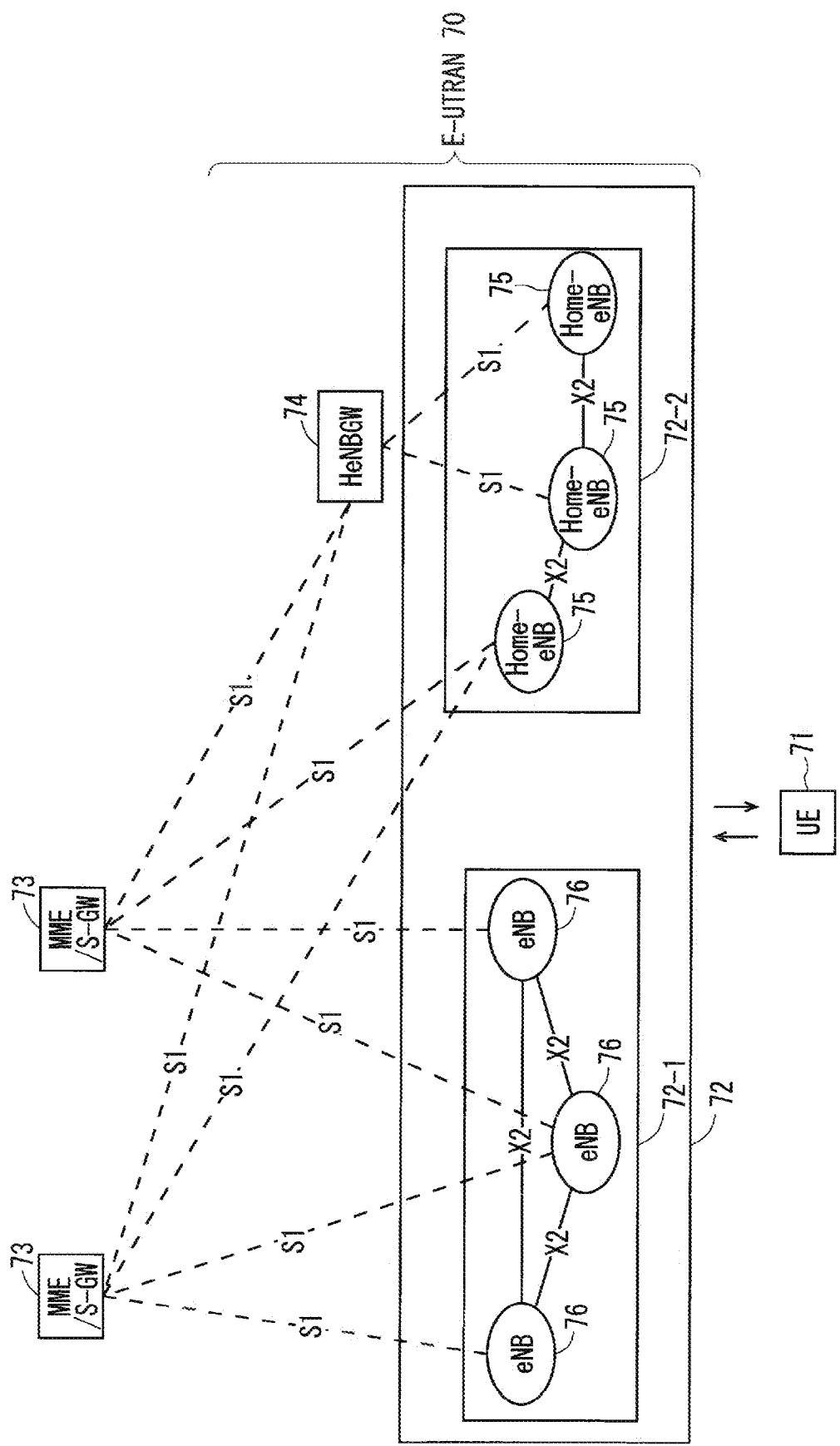
FIG. 2 is a block diagram showing the overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinafter, referred to as a "user equipment (UE)") 71 that is a communication terminal device is capable of radio communication with a base station device (hereinafter, referred to as a "base station (E-UTRAN Node B: eNB)") 72 and transmits and receives signals through radio communication.

The E-UTRAN is composed of one or a plurality of base stations 72, provided that a control protocol for a user equipment 71 such as a radio resource control (RRC), and user planes such as a packet data convergence protocol (PDCP), radio link control (RLC), medium access control (MAC), or physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 72 are classified into eNBs 76 and Home-eNBs 75. The communication system 700 includes an eNB group 72-1 including a plurality of eNBs 76 and a Home-eNB group 72-2 including a plurality of Home-eNBs 75. A system, composed of an evolved packet core (EPC) being a core network and an E-UTRAN 70 being a radio access network, is referred to as an evolved packet system (EPS). The EPC being a core network and the E-UTRAN 70 being a radio access network may be collectively referred to as a "network".

The eNB 76 is connected to an MME/S-GW unit (hereinafter, also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 by means of an S1 interface.

One or a plurality of Home-eNBs 75 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are entities of higher layer, specifically, higher nodes, and control the connections between the user equipment (UE) 71 and the eNB 76 and the Home-eNB 75 being base stations. The MME units 73 configure an EPC being a core network. The base station 72 and the HeNBGW 74 configure an E-UTRAN 70.

Further, 3GPP is studying the configuration below. The X2 interface between the Home-eNBs 75 is supported. In other words, the Horne-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 through the HeNBGW 74 and it is directly connected to the MME unit 73.

The base station device 72 may configure a single cell or a plurality of cells. Each cell has a range predetermined as a coverage in which the cell can communicate with a communication terminal device 71 and performs radio communication with the communication terminal device 71 within the coverage. In the case where one base station device 72 configures a plurality of cells, every cell is configured so as to communicate with the user equipment 71.

Figure 3:
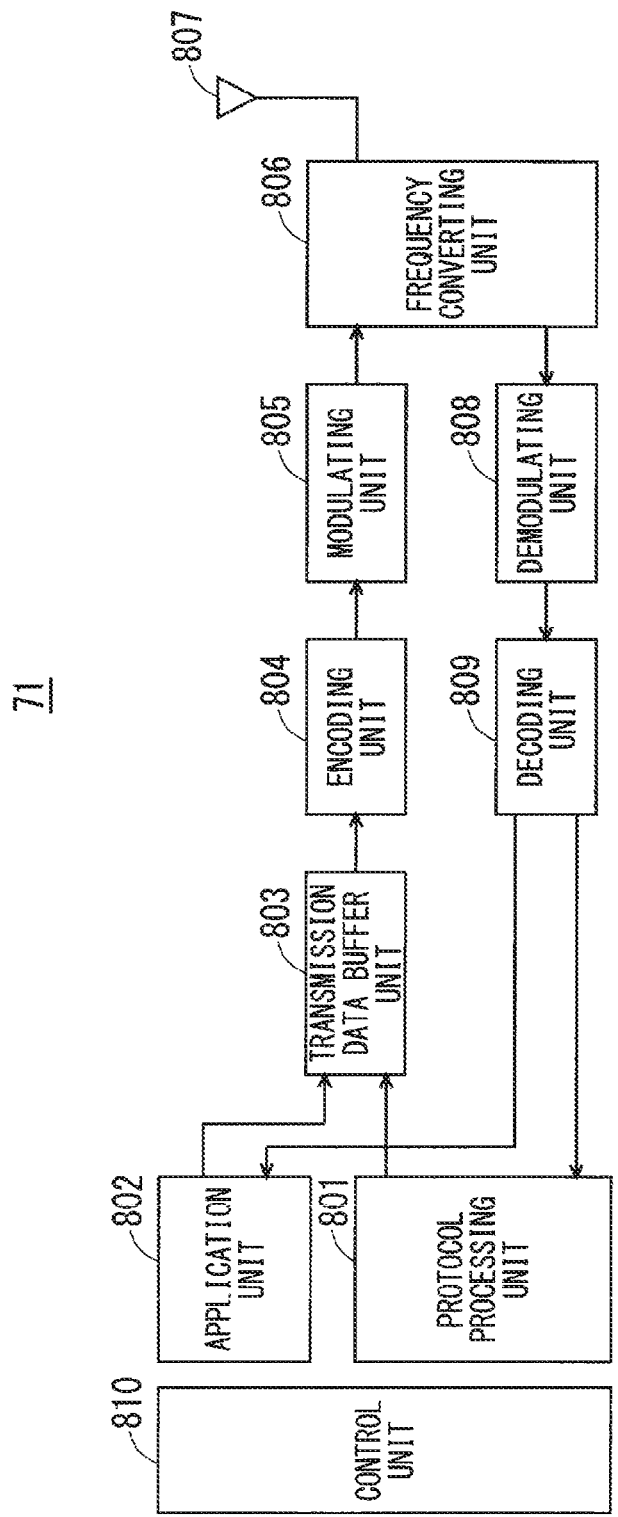
FIG. 3 is a block diagram showing the configuration of a user equipment 71 shown in FIG. 2, which is a user equipment according to the present invention.

FIG. 3 is a block diagram showing the configuration of the user equipment 71 of FIG. 2 that is a user equipment according to the present invention. The transmission process of the user equipment 71 shown in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. The radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, and the user data is passed to the application unit 802. A series of processes by the user equipment 71 is controlled by a control unit 810. This means that, though not shown in FIG. 3, the control unit 810 is connected to the individual units 801 to 809.

Figure 4:
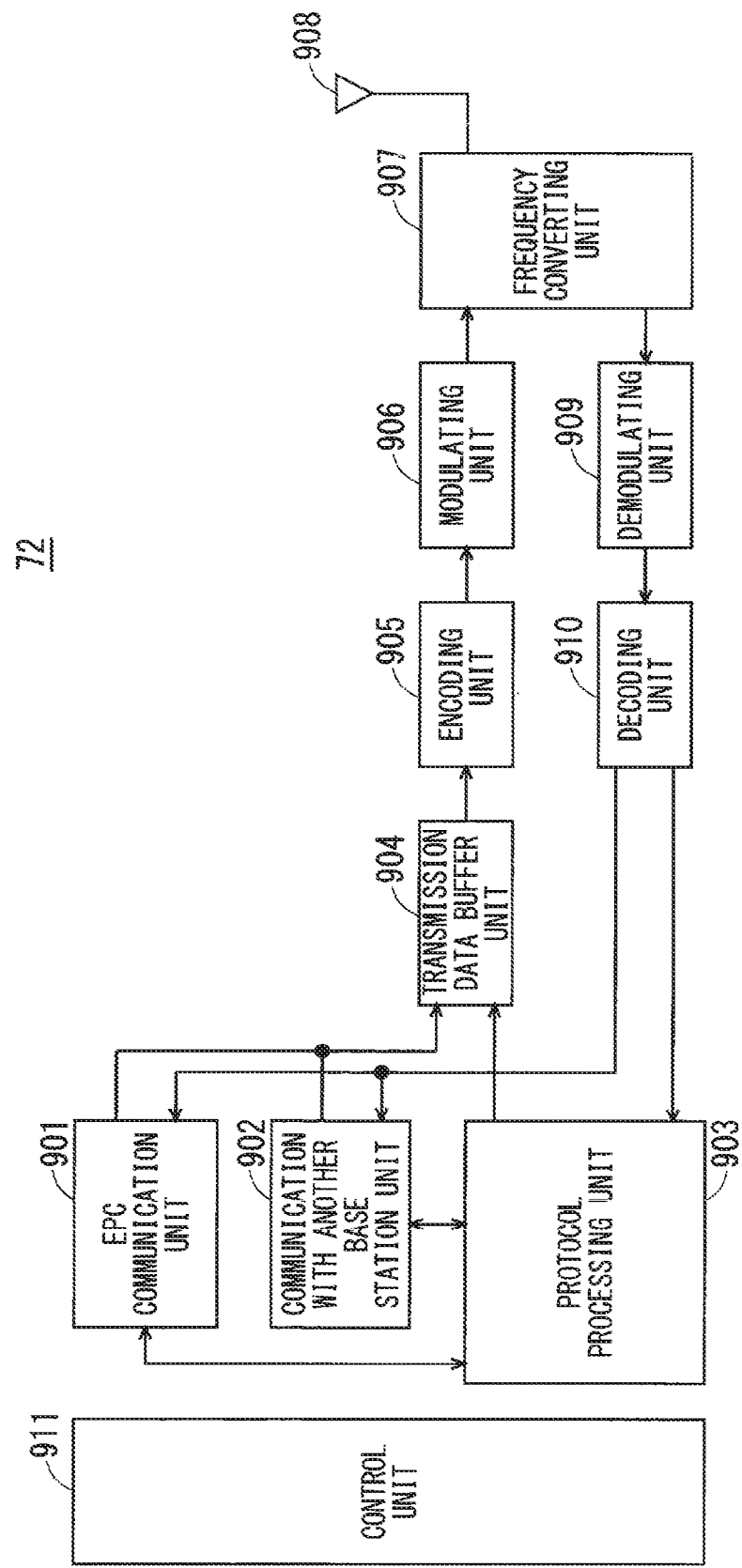
FIG. 4 is a block diagram showing the configuration of a base station 72 shown in FIG. 2, which is a base station according to the present invention.

FIG. 4 is a block diagram showing the configuration of the base station 72 of FIG. 2 that is a base station according to the present invention. The transmission process of the base station 72 shown in FIG. 4 will be described. An EPC communication unit 901 performs data transmission and reception between the base station 72 and the EPC (such as the MME unit 73), HeNBGW 74, and the like. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, and the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

FIG. 5 is a block diagram showing the configuration of the MIME according to the present invention. FIG. 5 shows the configuration of an MME 73*a* included in the MME unit 73 shown in FIG. 2 described above. A PDN GW communication unit 1001 performs data transmission and reception between the MME 73*a* and the PDN GW. A base station communication unit 1002 performs data transmission and reception between the MME 73*a* and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or a plurality of base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73*a* and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73*a* distributes a paging signal to one or a plurality of base stations 72. In addition, the MME 73*a* performs mobility control of an idle state. When the user equipment is in the idle state and an active state, the MME 73*a* manages a list of tracking areas. The MME 73*a* begins a paging protocol by transmitting a paging message to the cell belonging to a tracking area in which the UE is registered. The idle state mobility managing unit 1005-3 may manage the CSG of the Home-eNBs 75 to be connected to the MME 73*a*, CSG-IDs, and a whitelist.

Figure 6:
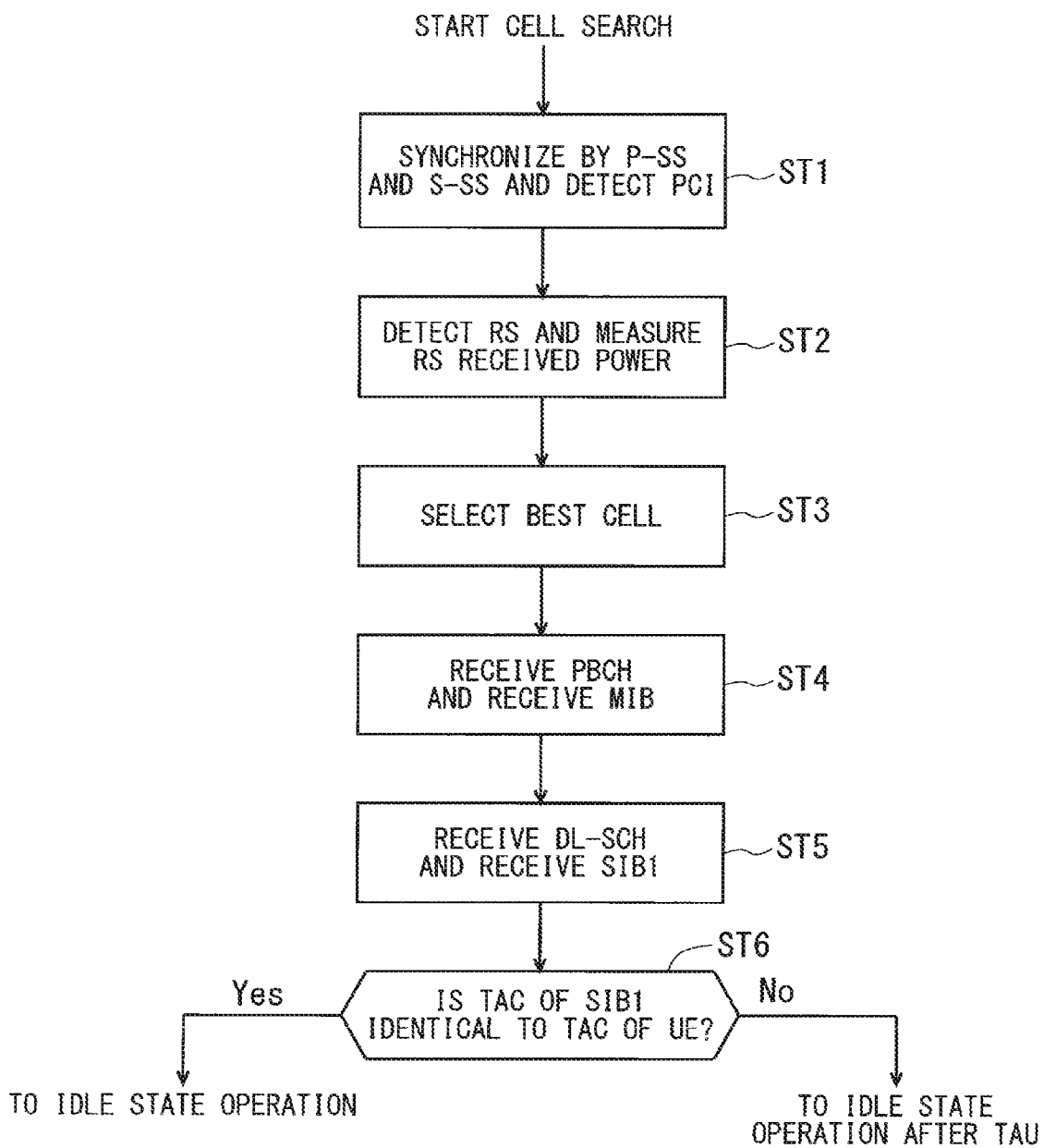
FIG. 6 is a flowchart showing an outline from a cell search to an idle state operation performed by a user equipment (UE) in the LTE communication system.

An example of a cell search method in a mobile communication system will be described next. FIG. 6 is a flowchart showing an outline from a cell search to an idle state operation performed by a user equipment (UE) in the LTE communication system. When starting a cell search, in Step ST1, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signals (SSs). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIS of the synchronized cells are detected (specified).

In Step ST2, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST1, so that the RS can be detected and the RS received power can be measured.

In Step ST3, next, the user equipment selects the cell having the best RS received quality, for example, the cell having the highest RS received power, that is, the best cell, from one or more cells that have been detected up to Step ST2.

In Step ST4, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST5, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST6, next, the user equipment compares the TAC of the SIB1 received in Step ST5 with the TAC portion of a tracking area identity (TAI) in the tracking area list that has already been possessed by the user equipment. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST6 shows that the TAC received in Step ST5 is identical to the TAC included in the tracking area list, the user equipment enters an idle state operation in the cell. If the comparison shows that the TAC received in Step ST5 is not included in the tracking area list, the user equipment requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a user equipment transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell whose coverage is relatively large, such as a cell configured by a conventional eNB, and a "macro eNB" refers to an eNB configuring a macro cell. A "small cell" refers to a cell whose coverage is relatively small, such as a downsized cell, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

Figure 7:
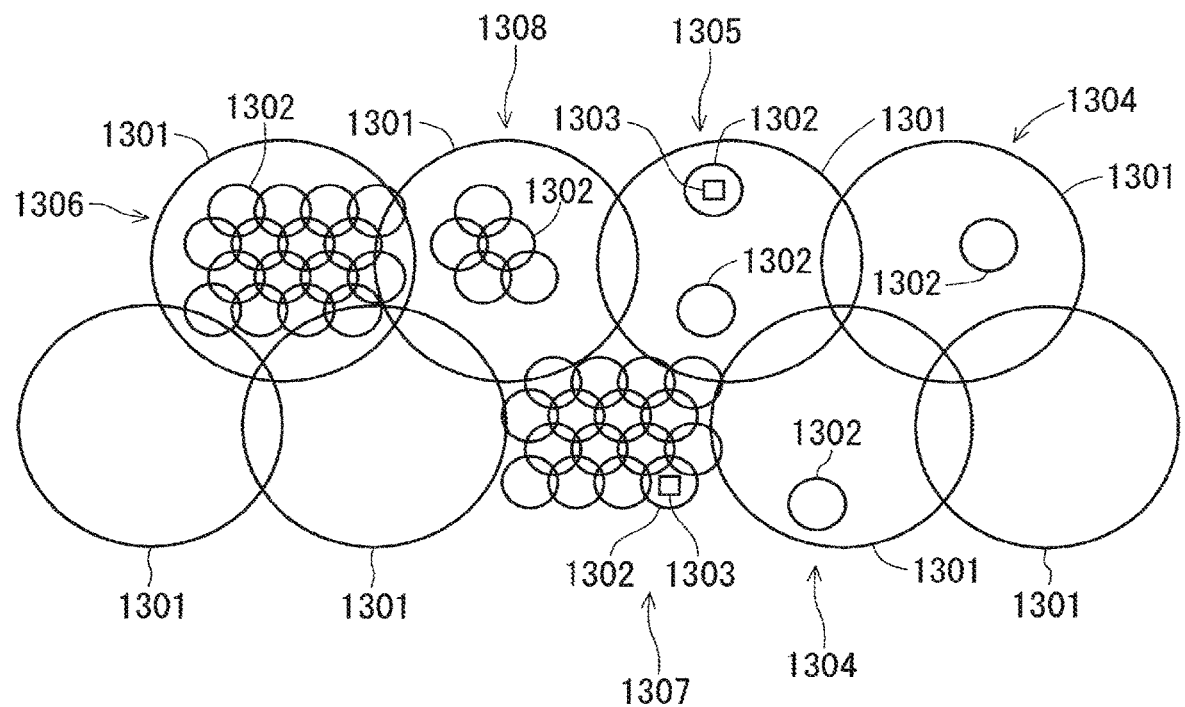
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 1301. A small cell configured by a small eNB has a coverage 1302 whose range is smaller than that of the coverage 1301 of the macro cell configured by a macro eNB.

When a plurality of eNBs coexist, the coverage of the cell configured by an eNB may be included in the coverage of the cell configured by another eNB. In the cell configuration shown in FIG. 7, as indicated by a reference "1304" or "1305", the coverage 1302 of the small cell configured by a small eNB may be included in the coverage 1301 of the macro cell configured by a macro eNB.

As indicated by a reference "1305", the coverages 1302 of a plurality of, for example, two small cells may be included in the coverage 1301 of one macro cell. A user equipment (UE) 1303 is included in, for example, the coverage 1302 of the small cell and performs communication via the small cell.

In the cell configuration shown in FIG. 7, as indicated by a reference "1306", the coverage 1301 of the macro cell configured by a macro eNB may overlap the coverages 1302 of the small cells configured by small eNBs in a complicated manner.

As indicated by a reference "1307", the coverage 1301 of the macro cell configured by a macro eNB may not overlap the coverages 1302 of the small cells configured by small eNBs.

Further, as indicated by a reference "1308", the coverages 1302 of a large number of small cells configured by a large number of small eNBs may be configured in the coverage 1301 of one macro cell configured by one macro eNB.

Figure 8:
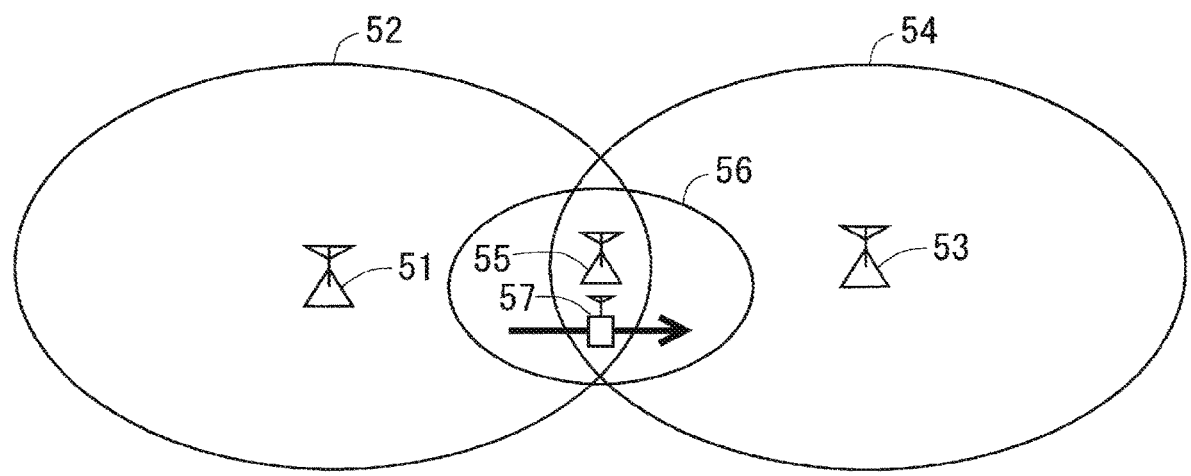
FIG. 8 shows example coverages of eNBs in a communication system of a first embodiment of the present invention.

FIGS. 8 and 9 each show example coverages of eNBs in a communication system of a first embodiment of the present invention. FIGS. 8 and 9 each show the case where a UE 57 during dual connectivity performs HO between macro cells 51 and 53.

In the following description, a macro cell that performs dual connectivity may be referred to as a "master cell", and an eNB that configures the master cell may be referred to as a "master eNB (abbreviated as MeNB)". A MeNB that is a HO source may be referred to as a "source MeNB (abbreviated as S-MeNB)", and a MeNB that is a HO destination may be referred to as a "target MeNB (abbreviated as T-MeNB)".

A small cell that performs dual connectivity may be referred to as a "secondary cell", and an eNB that configures the secondary cell may be referred to as a "secondary eNB (abbreviated as SeNB)".

In FIGS. 8 and 9, the S-MeNB is denoted by a reference "51", and the coverage of the S-MeNB 51 is denoted by a reference "52". The T-MeNB is denoted by a reference "53", and the coverage of the T-MeNB 53 is denoted by a reference "54". The SeNB is denoted by a reference "55", and the coverage of the SeNB 55 is denoted by a reference "56".

FIG. 9 shows a case where another SeNB 58 is present in addition to the SeNB 55 shown in FIG. 8. In FIG. 9, the SeNB 55 shown in FIG. 8 is a SeNB that is a moving source (hereinafter, also referred to as a "moving-source SeNB") 55, and the other SeNB is a SeNB that is a moving destination (hereinafter, also referred to as a "moving-destination SeNB") 58. In FIG. 9, a reference "56" denotes the coverage of the moving-source SeNB 55, and a reference "59" denotes the coverage of the moving-destination SeNB 58.

This embodiment will describe a case where a measurement report is performed, which indicates that moving of the UE 57 as shown in FIGS. 8 and 9 has degraded the reception quality of the S-MeNB 51 and has improved the reception quality of the T-MeNB 53 in the measurement of neighbor cells by the UE 57.

Figure 10:
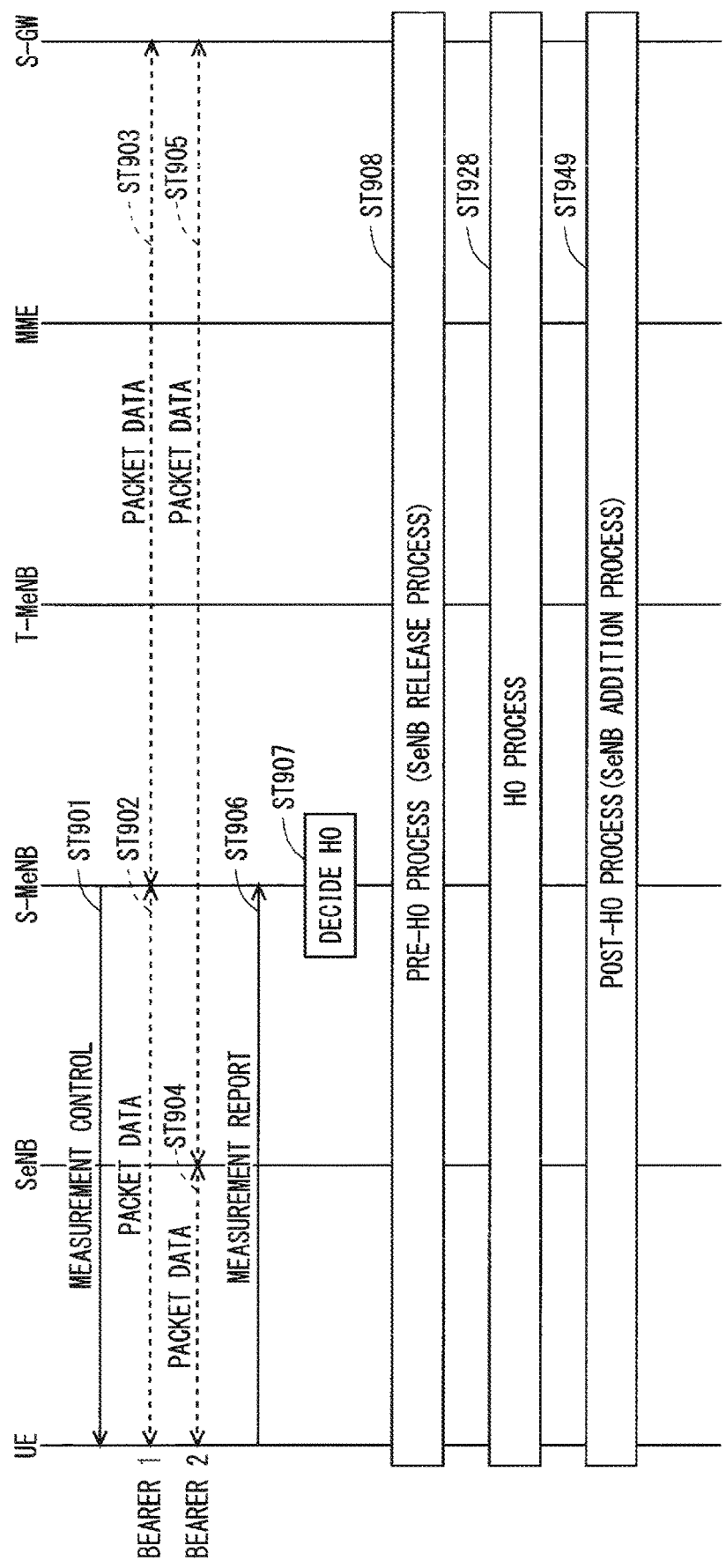
FIG. 10 shows an example sequence of a handover-related process in the communication system of the first embodiment of the present invention.
Figure 11:
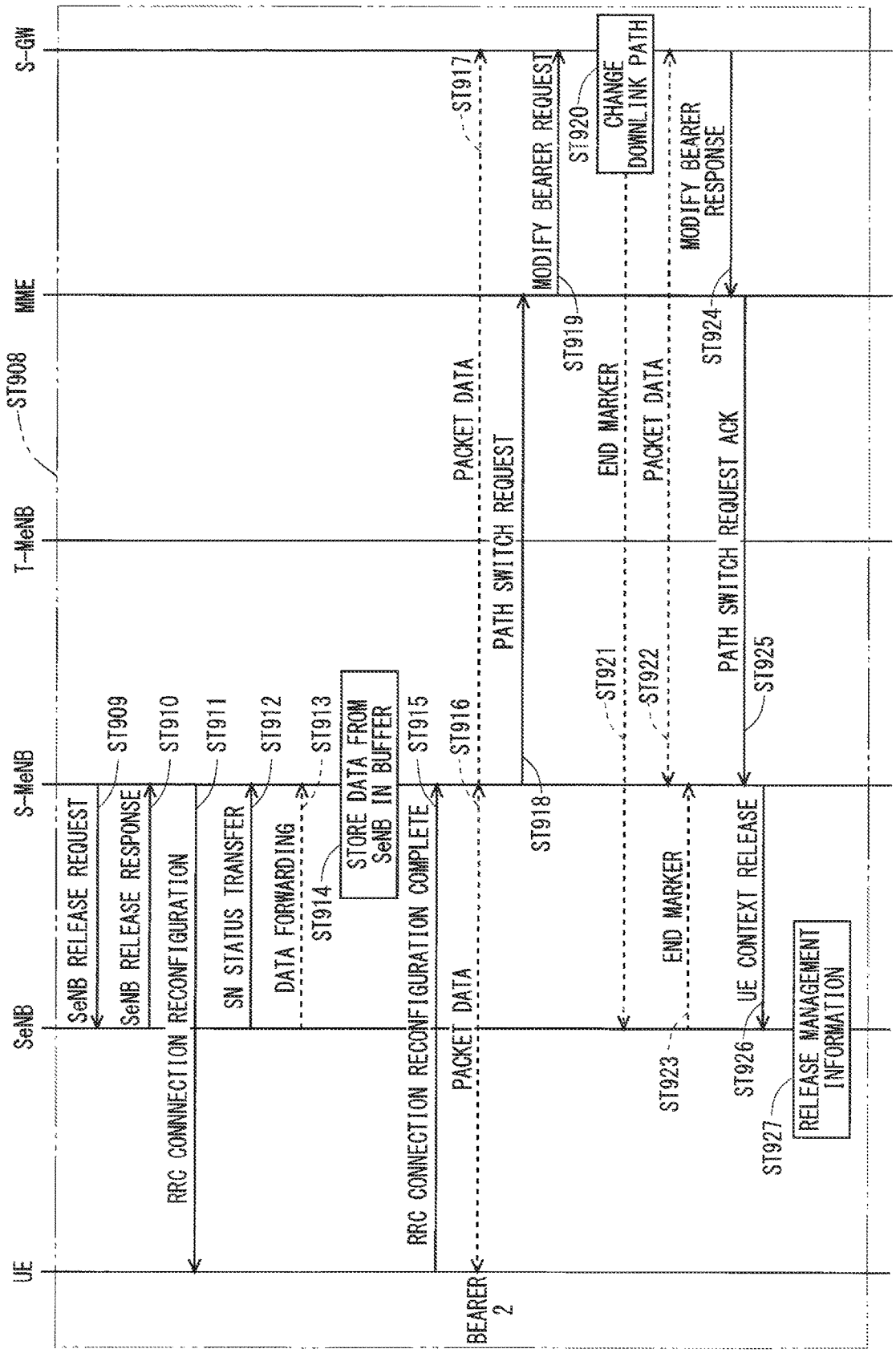
FIG. 11 shows an example sequence of a pre-HO process in step ST908 of FIG. 10.
Figure 12:
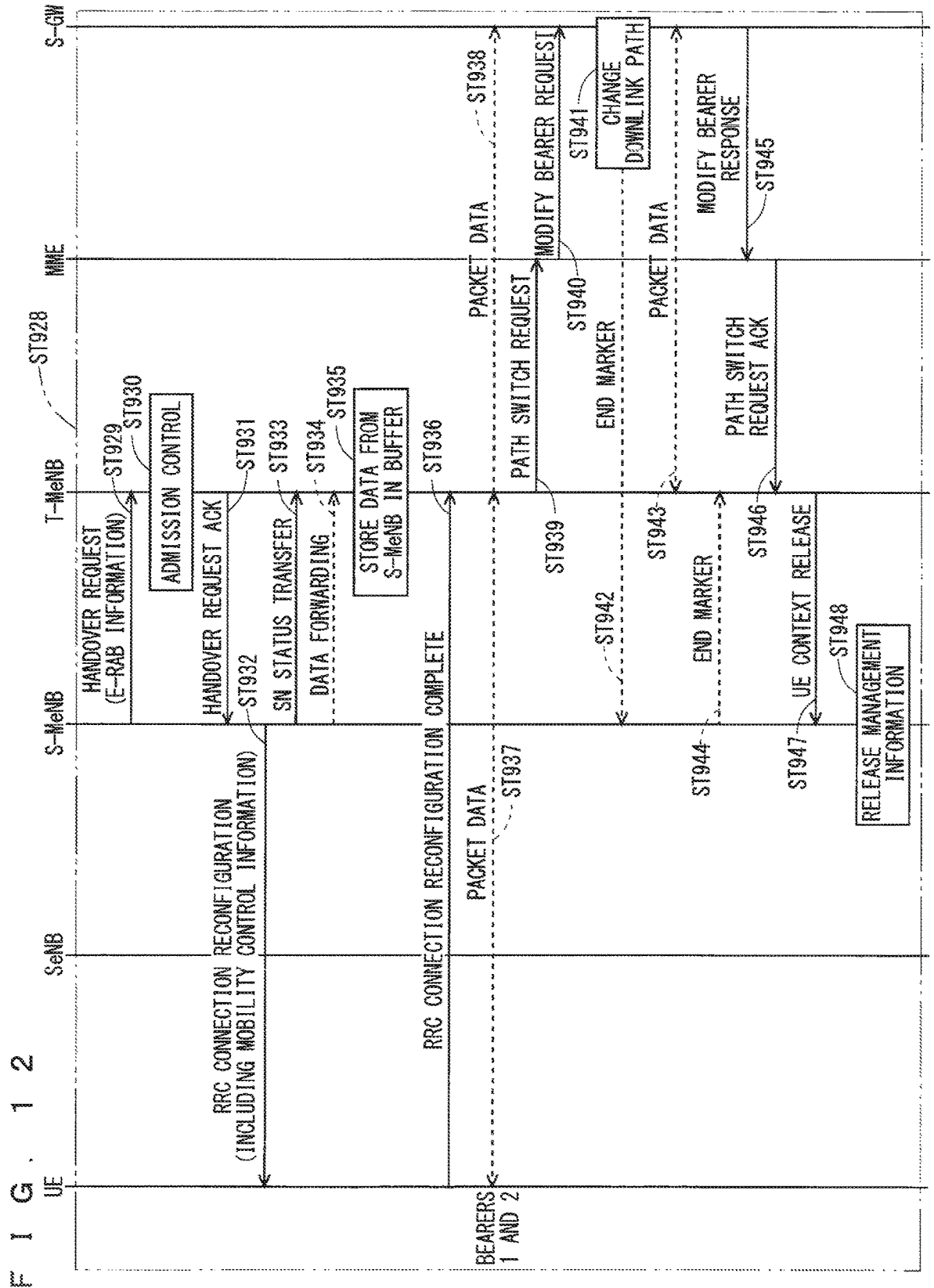
FIG. 12 shows an example sequence of a HO process in step ST928 of FIG. 10.
Figure 13:
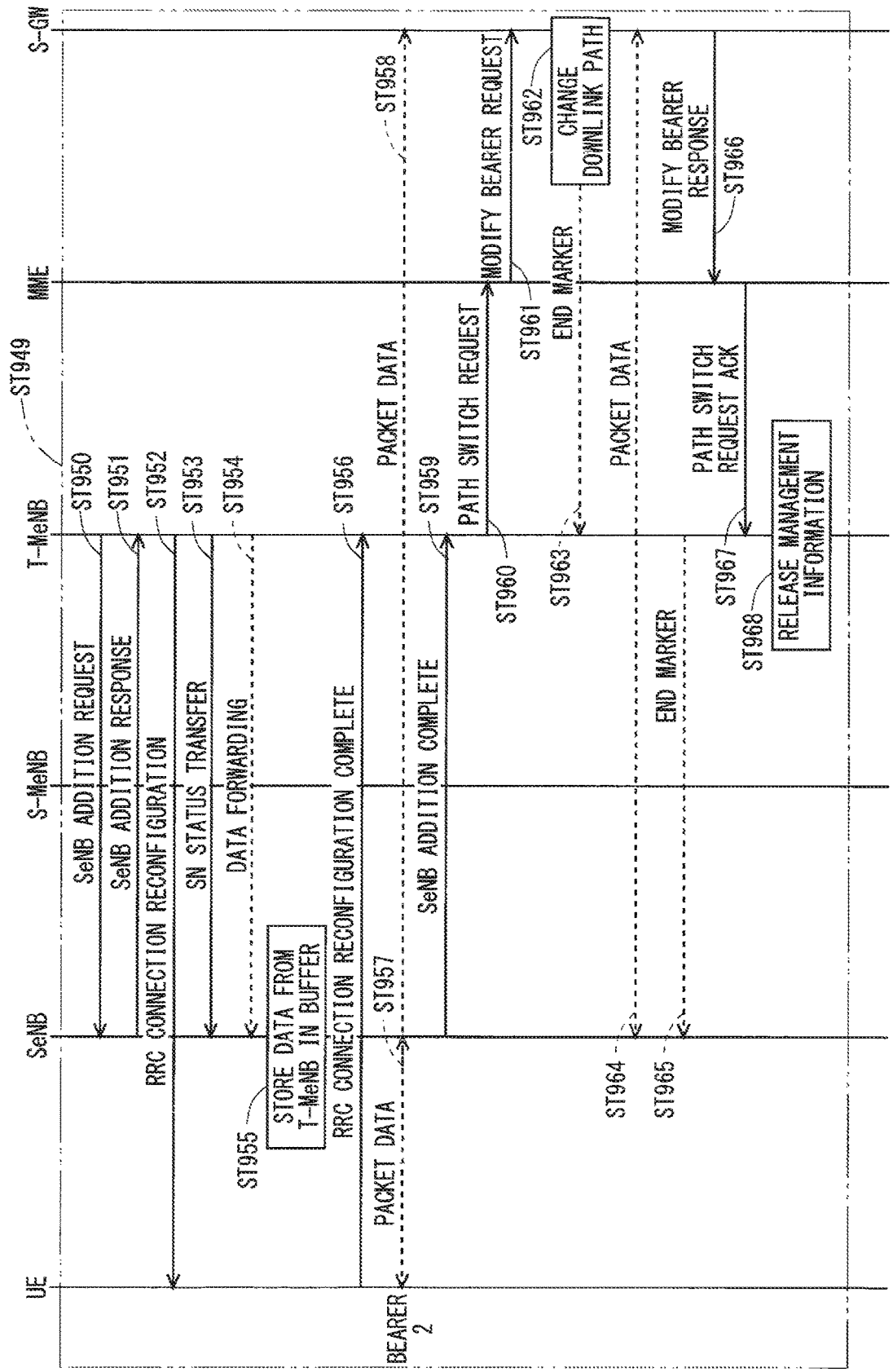
FIG. 13 shows an example sequence of a post-HO process in step ST949 of FIG. 10.

FIG. 10 shows an example sequence of a handover-related process in the communication system of the first embodiment of the present invention. FIG. 11 shows an example sequence of a pre-HO process in step ST908 of FIG. 10. FIG. 12 shows an example sequence of a HO process in step ST928 of FIG. 10. FIG. 13 shows an example sequence of a post-HO process in step ST949 of FIG. 10. Here, the handover-related process refers to the process related to handover (HO) and includes the pre-HO process, the HO process, and the post-HO process.

This embodiment will disclose a method in which a UE during dual connectivity performs HO between macro cells in the case of Alternative 1A of a user plane architecture of dual connectivity described in Non-Patent Document 11 (see 8.1.1.1 of Non-Patent Document 11).

In Alternative 1A of the user plane architecture, communications are performed through a path through which communication is performed from an S-GW via a MeNB (hereinafter, also referred to as a "via-MeNB path") and through a path through which communication is performed from an S-GW via a SeNB that is a small cell (hereinafter, also referred to as a "via-SeNB path"). The via-MeNB path is a path using the bearer 1 and is used in communications of packet data in, for example, steps ST902 and ST903. The via-SeNB path is a path using the bearer 2 and is used in communications of packet data in, for example, steps ST904 and ST905.

Disclosed below is a method in which a MeNB notifies a UE during dual connectivity of a measurement control message.

In the example shown in FIG. 10, in step ST901, the S-MeNB notifies the UE of a measurement control message. Measurement of a neighbor SeNB may be configured in the measurement control message. Measurement of a frequency for SeNB may be configured. Or, as the configuration of a measurement, an event for SeNB or an event at a frequency for SeNB, or event criteria may be configured separately from that for MeNB.

Examples of configuration parameters include a SeNB identifier, a frequency, an event number for report, a threshold of reception quality, and a measurement period. Examples of the reception quality include reference signal received power (RSRP) and reference signal received quality (RSRQ).

The UE that has received the measurement control message in step ST901 measures neighbor cells (MeNB and SeNB).

In step ST906, the UE notifies the S-MeNB of a measurement report message. In step ST907, the S-MeNB that has received the measurement report message in step ST906 uses the result of the measurement report to decide whether to cause the UE to perform handover (HO) to the T-MeNB.

In the example shown in FIG. 10, in step ST907, the S-MeNB decides to cause the UE to perform HO to the T-MeNB.

When the S-MeNB decides to cause the UE to perform HO to the T-MeNB in step ST907, the process moves to step ST908. In step ST908, a SeNB release process that is the pre-HO process shown in FIG. 11 is executed.

Specifically, when deciding to cause the UE to perform HO to the T-MeNB in step ST907 of FIG. 10, the S-MeNB moves to step ST909 of FIG. 11.

In step ST909, the S-MeNB notifies the SeNB of a SeNB release request message. In step ST910, the SeNB that has received the SeNB release request message in step ST909 notifies the S-MeNB of a SeNB release response message.

In step ST911, the S-MeNB notifies the UE of an RRC connection reconfiguration message as the RRC-related information.

In step ST912, the SeNB performs SN status transfer to transfer the status of the sequence number (abbreviated as SN) of the PDCP to the S-MeNB. Specifically, the SeNB notifies the S-MeNB of the PDCP SN information. In step ST913, the SeNB may perform data forwarding to forward the yet-to-be-transmitted data to the S-MeNB, thereby establishing loss-free communication.

The SeNB may determine whether to perform forwarding or whether to perform reordering in accordance with a bearer type, quality of service (abbreviated as QoS), a delay time occurring in a backhaul of a cell being a connection destination, or the number of forwardings (reforwardings of forwarded data). For example, the SeNB does not perform forwarding or reordering for the services that cause no problem in the event of data loss, such as voice over internet protocol (VOID). For example, the SeNB does not perform forwarding when forwarded data is to be reforwarded by the handover. Alternatively, for the services that require real-time capability, the SeNB does not perform forwarding if a delay time occurring in a backhaul of a cell being a connection destination is large. As a result, resources can be released immediately, thus providing a stable operation.

In step ST914, the S-MeNB stores the data forwarded from the SeNB in the buffer.

In step ST915, the UE notifies the S-MeNB of an RRC connection reconfiguration complete message. This completes RRC configuration and radio synchronization between the S-MeNB and the UE, so that communication is started between the UE and the S-MeNB in step ST916, and also, communication is started between the UE and the S-GW in step ST917.

In step ST918, the S-MeNB notifies the MME of a path switch request message requesting a path switch. In step ST919, the MME that has been notified of the path switch request message notifies the S-GW of a modify bearer request message requesting a modification of a bearer.

In step ST918 or ST919, the information indicating the presence or absence of a change of the SeNB may be provided. The information indicating that the request is not a path switch request or a modify bearer request due to HO of the UE may be provided. Or, it may be indicated that, by providing no information for identifying a UE being a HO target, the relevant request is not a path switch request or a modify bearer request due to HO of the UE.

Consequently, differently from a normal HO process, the MME, the S-GW, or a location registration and management function unit separately provided can omit a process of updating the location information of a UE and a process of managing radio resources associated with an update of the location information.

In step ST920, the S-GW that has been notified of the modify bearer request message changes the transmission destination of the bearer 2, which has been used in communication, from the SeNB to the S-MeNB. Also, in this case, the S-GW may modify the bearer for via-S-MeNB path in consideration of the user accommodation status of the S-MeNB.

In step ST924, the S-GW notifies the MME of a modify bearer response message indicating that the S-GW has responded to the modify bearer request. In step ST925, the MME that has been notified of the modify bearer response message notifies the S-MeNB of a path switch request Ack message indicating that the MME has accepted the path switch request.

In this way, in steps ST902 and ST903 of FIG. 10 and steps ST916 and ST922 of FIG. 11, the S-MeNB transmits and receives by two bearers, namely, bearer 1 and bearer 2, to and from the same UE.

In this case, in step ST921, the S-GW may provide an end marker to the PDCP to be transmitted to the SeNB, thus informing about the completion of the forwarding process. This allows the SeNB to recognize the end of the forwarded data, thus releasing a forwarding buffer at economical timing.

In step ST923, the SeNB may provide an end marker and forward it to the S-MeNB. This allows the S-MeNB to release a forwarding accept buffer at economical timing.

In step ST926, the S-MeNB notifies the SeNB of a UE context release message instructing to release a UE context. When being notified of the end marker in step ST923, in step ST926, the S-MeNB notifies the SeNB of the UE context release message and also notifies the SeNB that the S-MeNB has received the end marker. By notifying the SeNB of the UE context release message or that the S-MeNB has received the end marker in this way, in step ST927, the SeNB can release the management information of the UE.

As to the end marker, whether to provide an end marker may be determined in accordance with a bearer type or QoS. As to the service that causes no problem in the event of data loss, such as voice data, for example, VoIP, resources can be managed immediately by releasing a resource without providing an end marker to the data, leading to an effect that a stable operation can be provided.

As shown in FIG. 8, when the UE 57 moves and approaches the boundary of the coverage 52 of the S-MeNB 51, in step ST907 of FIG. 10, the S-MeNB 51 decides HO to the T-MeNB 53 based on the measurement report of the UE 57. In this case, the SeNB 55 during communication has a good measurement value.

When the SeNB 55 has a good measurement value, the S-MeNB 51 determines that the UE 57 is present within the coverage 56 of the SeNB 55 also after HO. Then, in step ST909 of FIG. 11, the resource holding instruction information or the ID for holding a resource may be provided to the release request message to be notified to the SeNB 55 and then may be notified.

As a result, the SeNB 55 does not release the configuration or information related to the configured RRC and the configuration or information related to radio synchronization. After HO to the T-MeNB 53, accordingly, a resource reserving process and a resynchronization process in reconfiguration of dual connectivity from the T-MeNB 53 to the SeNB 55 can be eliminated.

After releasing the management information of the UE by the SeNB in step ST927, in step ST928 of FIG. 10, the process of handover from the S-MeNB to the T-MeNB is performed. This causes both of the two bearers to be switched from the S-MeNB to the T-MeNB.

Specifically, the handover process of step ST928 is executed as shown in FIG. 12. In step ST929, the S-MeNB notifies the T-MeNB that is a HO destination of a handover request message. The HO request message includes E-UTRAN radio access bearer (E-RAB) information for performing HO.

In step ST930, the T-MeNB performs admission control to confirm accommodation capacity. When judging that it can accept HO based on the result of the admission control, in step ST931, the T-MeNB notifies the S-MeNB of a handover request Ack message.

Upon receipt of the handover request Ack message of step ST931, in step ST932, the S-MeNB notifies the UE of an RRC connection reconfiguration message including mobility control information.

In step ST933, the S-MeNB performs SN status transfer to the T-MeNB. Specifically, the S-MeNB notifies the T-MeNB of the PDCP SN information.

In step ST934, the S-MeNB may perform data forwarding to forward yet-to-be-transmitted data to the T-MeNB. In step ST935, the T-MeNB stores the data forwarded from the S-MeNB in the buffer.

In step ST936, the UE completes the radio configuration, and notifies the T-MeNB of an RRC connection reconfiguration complete message. When the radio configuration completes in this way, communication is started between the UE and the T-MeNB in step ST937, and also, communication is started between the UE and the S-GW in step ST938.

In step ST939, the T-MeNB notifies the MME of a path switch request message. In step ST940, the MME that has been notified of the path switch request message notifies the S-GW of a modify bearer request message.

The information indicating the presence or absence of a change of the SeNB may be provided in step ST939 or ST940. The information indicating that the relevant request is a path switch request or modify bearer request due to HO of the UE may be provided. The information for identifying the UE that is a HO target may be provided to indicate that the relevant request is a path switch request or a modify bearer request due to HO of the UE. Or, the relevant request may be a conventional path switch request or a conventional modify bearer request to indicate the conventional HO of the UE.

This allows the MME, the S-GW, or the location registration and management function unit separately provided to perform, as a normal HO process, the process of updating the location information of the UE and the process of managing radio resources associated with the update of the location information.

In step ST941, the S-GW that has been notified of the modify bearer request message changes the transmission destination of the bearer 2 used in communication to the T-MeNB. Also, in this case, the S-GW may modify the bearer for via-T-MeNB path in consideration of the user accommodation status of the T-MeNB.

The bearer 1 and the bearer 2 are configured for route via the T-MeNB, so that communication is performed between the UE and the T-MeNB in step ST937, and also, communication is performed between the S-GW and the T-MeNB in step ST943.

In step ST945, the S-GW notifies the MIME of a modify bearer response message. In step ST946, the MME that has been notified of the modify bearer response message notifies the T-MeNB of a path switch request Ack message.

For loss-free transmission, the S-GW may provide an end marker to the final data to the S-MeNB in step ST942. This allows the S-MeNB to release a forwarding buffer at economical timing.

In step ST944, the S-MeNB may provide an end marker to the finally forwarded data. This allows the T-MeNB to release the forward acceptance buffer at economical timing.

In step ST947, the T-MeNB notifies the S-MeNB of a UE context release message. When being notified of the end marker in step ST944, in step ST947, the T-MeNB notifies the S-MeNB of a UE context release message and also notifies the S-MeNB that the T-MeNB has received the end marker. The S-MeNB is notified of the UE context release message or notified that the T-MeNB has received the end marker in this way, thus allowing the S-MeNB to release the management information of the UE in step ST948.

After the S-MeNB releases the management information of the UE in step ST948, in step ST949 of FIG. 10, the SeNB addition process that is a post-HO process is performed. Specifically, the SeNB addition process of step ST949 is executed as shown in FIG. 13.

After the switch to the T-MeNB by the HO process in step ST928 of FIG. 10, in step ST950 of FIG. 13, the T-MeNB notifies the SeNB of a SeNB addition request message.

In step ST951, the SeNB notifies the T-MeNB of a SeNB addition response message.

In step ST952, the T-MeNB notifies the UE of an RRC connection reconfiguration message as the RRC-related information.

Upon the SeNB notifying of the SeNB addition response message indicating that the SeNB has received the SeNB addition request in response to the SeNB addition request message in step ST951, in step ST953, the T-MeNB notifies the SeNB of the PDCP SN information as an SN status transfer.

In step ST954, the T-MeNB may perform data forwarding to forward yet-to-be-transmitted data to the SeNB, thereby establishing loss-free communication.

The T-MeNB may determine whether to perform data forwarding or perform SN reordering in accordance with a bearer type or QoS. For the bearer that causes no problem in the event of data loss, such as voice data, for example, VoIP, eliminating data forwarding or SN reordering achieves the effects that resources can be released immediately and a stable operation can be provided.

In step ST955, the SeNB stores the data forwarded from the T-MeNB in the buffer.

In step ST956, the UE completes radio synchronization and notifies the T-MeNB of an RRC connection reconfiguration complete message indicating that the reconfiguration of the RRC connection between the SeNB and the UE has completed. When the radio synchronization completes in this way, communication is started between the UE and the SeNB in step ST957, and also, communication is started between the UE and the S-GW in step ST958.

Further, in step ST959, the SeNB notifies the T-MeNB of the completion of radio configuration, specifically, a SeNB addition complete message indicating that the addition of the SeNB has completed. In step ST960, the T-MeNB that has been notified of the SeNB addition complete message notifies the MIME of a path switch request message. In step ST961, the MME that has been notified of the path switch request message notifies the S-GW of a modify bearer request message.

In step ST960 or ST961, the information indicating the presence or absence of a change (addition) of the SeNB may be provided. The information indicating that the request is not a path switch request or a modify bearer request due to HO of the UE may be provided. Or, it may be indicated that, by providing no information for identifying a UE being a HO target, the relevant request is not a path switch request or a modify bearer request due to HO of the UE.

Consequently, differently from a normal HO process, the MME, the S-GW, or the location registration and management function unit separately provided can omit a process of updating the location information of a UE and a process of managing radio resources associated with an update of the location information.

In step ST962, the S-GW that has been notified of the modify bearer request message changes the transmission destination of the bearer 2 used in communication to the SeNB. Also, in this case, the S-GW may modify a bearer for via-SeNB path in consideration of the user accommodation status of the SeNB.

In step ST966, the S-GW notifies the MME of a modify bearer response message. In step ST967, the MME that has been notified of the modify bearer response message notifies the T-MeNB of a path switch request Ack message indicating the completion of a path switch. As a result, the bearer 2 is configured for route via the SeNB, so that communication is performed between the UE and the SeNB in step ST957, and also, communication is performed between the S-GW and the SeNB in step ST964. In step ST968, the T-MeNB may release the management information of the UE to the bearer 2.

In this case, in step ST963, the S-GW may provide an end marker to the PDCP to be transmitted to the T-MeNB, thus informing about the completion of the forwarding process. This allows the T-MeNB to recognize the end of the forwarded data, thus releasing a forwarding buffer at economical timing.

In step ST965, the T-MeNB may provide an end marker to the data and forward the data to the SeNB. This allows the SeNB to release the forwarding buffer at economical timing.

As to the end marker, whether to provide an end marker may be determined in accordance with a bearer type or QoS. As to the service that causes no problem in the event of data loss, such as voice data, for example, VoIP, resources can be managed immediately by releasing a resource without providing an end marker to the data, leading to an effect that a stable operation can be provided.

As shown in FIG. 9 described above, the SeNB 58 is added after the UE 57 moves and approaches the boundary of the coverage 52 of the S-MeNB 51, the moving-source SeNB 55 is released, and HO from the S-MeNB 51 to the T-MeNB 53 is executed. At this time, the T-MeNB 53 may decide a to-be-added SeNB 58 in accordance with the moving direction information of the UE 57, the moving speed information of the UE 57, the location information of a neighbor SeNB (the GPS information of each SeNB or the information indicating to which MeNB each SeNB is closer), the cell size of a SeNB that is a moving destination (which may be a maximum transmission power value of the SeNB corresponding to a cell size), the information indicating whether the UE is included in a closed subscriber group (CSG), or a combination of these pieces of information, in addition to the measurement report notified in step ST906 of FIG. 10. The UE described herein may be a mobile router that organizes a plurality of UEs. As the judgment result, the SeNB specification information for specifying a SeNB to be added after HO may be added to the HO request message notified in step ST929 of FIG. 12.

For example, in the case where a UE is on a train, even when the measurement information of the UE shows that a measurement value on a SeNB during communication is better than that on a moving-destination SeNB, the dual connectivity process can be alleviated by adding a moving-destination SeNB if the moving-destination SeNB has a communicable quality and the location information shows that the moving-destination SeNB is within the coverage of the T-MeNB. In other words, an increase in process due to an immediate release of a moving-source SeNB and addition of a moving-destination SeNB by the UE moving at high speed after the addition of the moving-source SeNB can be prevented.

For example, during a communication of a moving-source SeNB in a CSG, even when the moving-destination SeNB is temporarily inadvertently good due to shadowing by a human body, a moving-source SeNB is added because the communication is performed in the CSG or the moving speed is slow. This enables continuous, stable communication.

As described above, in this embodiment, when a UE is connected to one macro cell and one small cell and performs dual connectivity, a pre-HO process is performed before a HO process of switching a macro cell connected with the UE from the S-MeNB that is a macro cell being a moving source to the T-MeNB that is a macro cell being a moving destination, and after the HO process, a post-HO process is performed. In the pre-HO process, the SeNB that is a small cell is released, thus disconnecting the connection with the SeNB. In the post-HO process, a SeNB is added, thus reestablishing the connection with the SeNB.

This enables the UE during dual connectivity to execute HO between macro cells in the case of Alternative 1A of the user plane architecture of dual connectivity described in Non-Patent Document 11.

First Modification of First Embodiment

Figure 14:
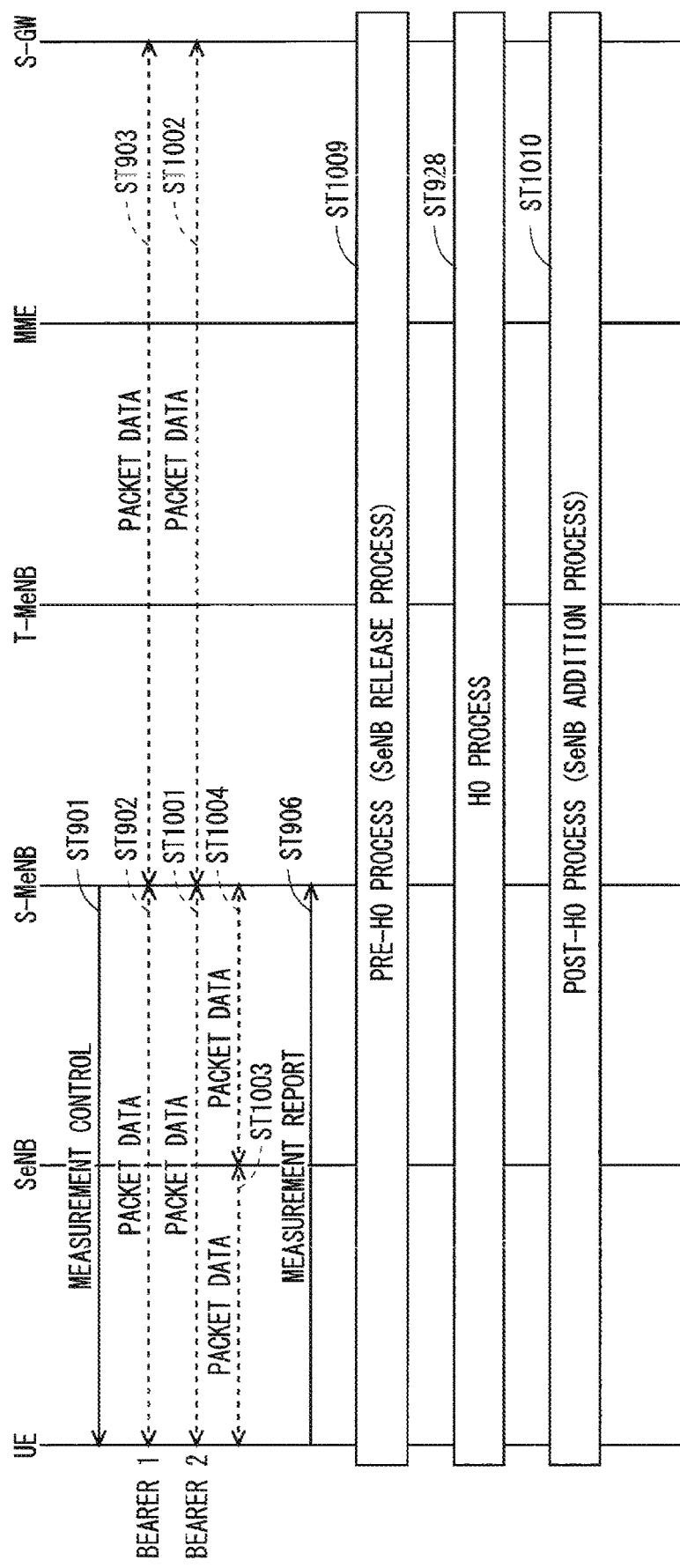
FIG. 14 shows an example sequence of a handover-related process in a communication system of a first modification of the first embodiment of the present invention.
Figure 15:
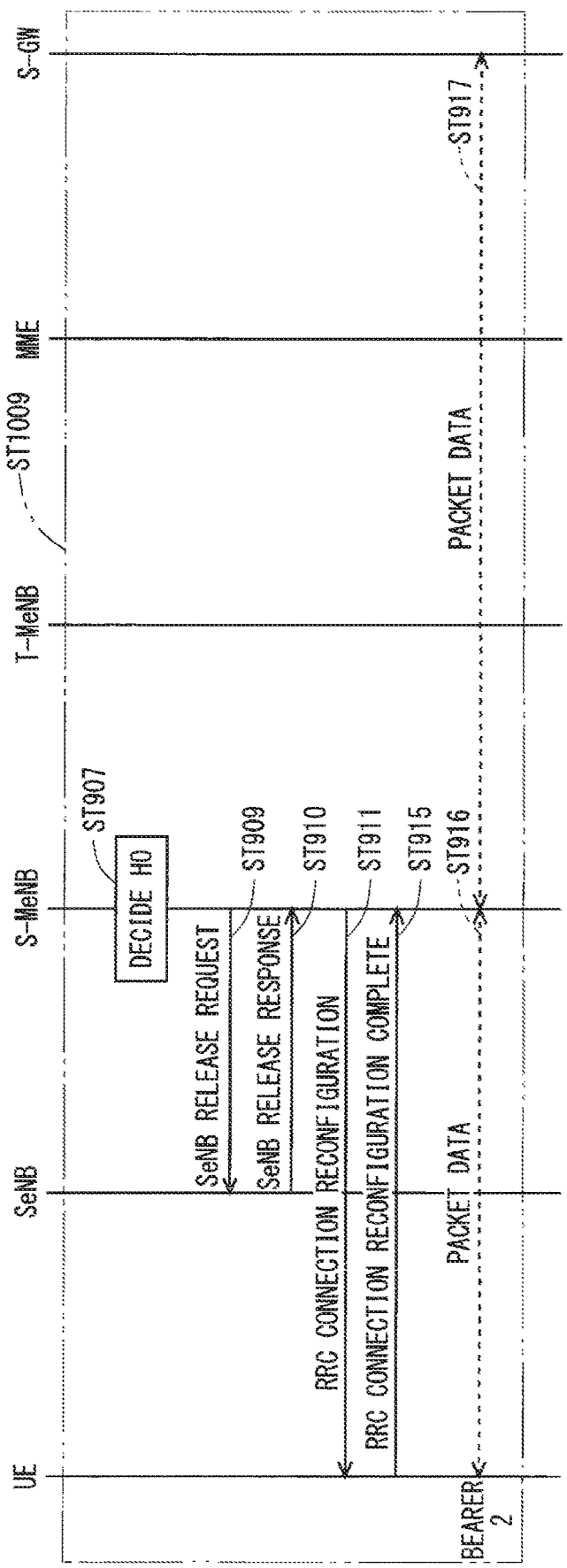
FIG. 15 shows an example sequence of a pre-HO process in step ST1009 of FIG. 14.
Figure 16:
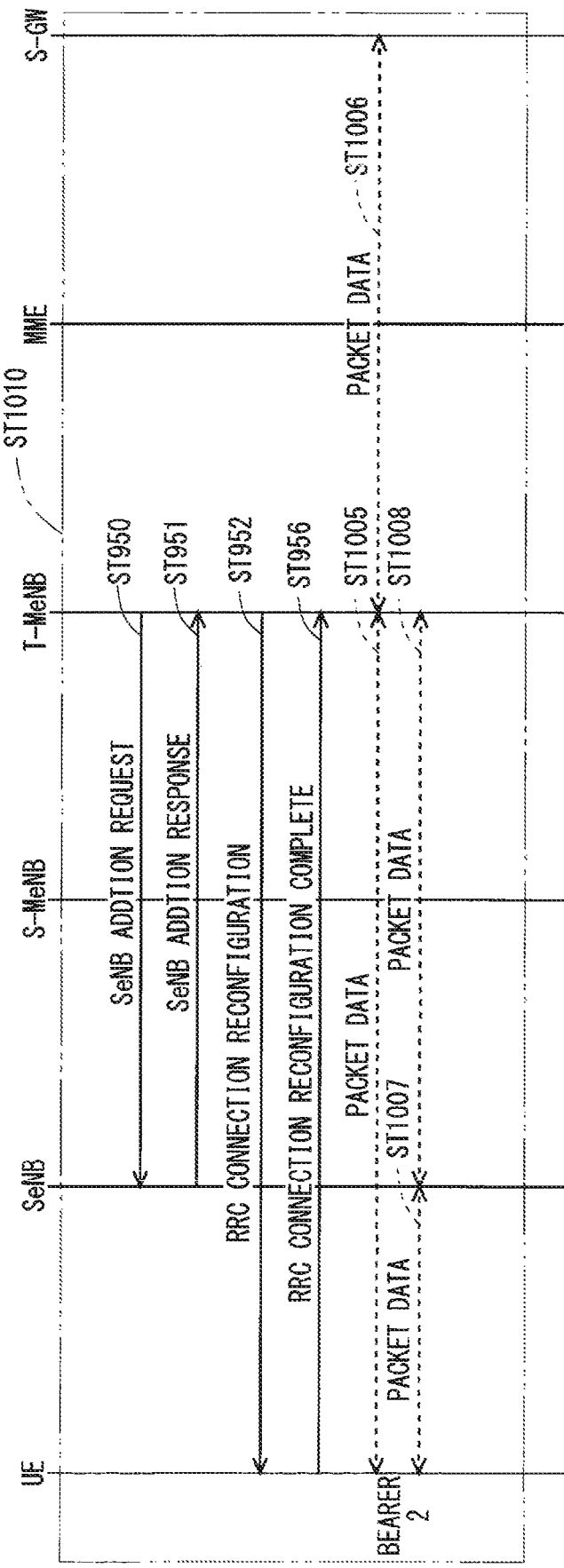
FIG. 16 shows an example sequence of a post-HO process in step ST1010 of FIG. 14.

FIG. 14 shows an example sequence of a handover-related process in a communication system of a first modification of the first embodiment of the present invention. FIG. 15 shows an example sequence of a pre-HO process in step ST1009 of FIG. 14. FIG. 16 shows an example sequence of a post-HO process in step ST1010 of FIG. 14. The handover-related process of this modification is similar to the handover-related process of the first embodiment shown in FIGS. 10 to 13 described above, and thus, the same steps will be denoted by the same step numbers, and description thereof will be omitted.

This embodiment will disclose a method in which a UE during dual connectivity performs HO between macro cells in the case of Alternative 3C of the user plane architecture of dual connectivity described in Non-Patent Document 11 (see 8.1.1.8 of Non-Patent Document 11).

In Alternative 3C of the user plane architecture, by the MeNB, between the MeNB and the UE, bearer split where bearer (bearer 2) is split with a path for performing communication via a small cell is performed, with a path (bearer 1) for performing direct communication.

In bearer split, an E-RAB corresponding to one EPS bearer is separated into two paths by an S-MeNB, so that data is communicated between the S-GW and the UE. Through one path, in step ST1001, data is directly communicated between the S-MeNB and the UE. Through the other path, in steps ST1003 and ST1004, data is communicated between the S-MeNB and the UE via the SeNB.

Between the S-MeNB and the S-GW, in step ST1002, data is communicated through one path. The communication between the SeNB and the MeNB is performed between different eNBs. If the communication quality of a channel between the different eNBs is poor, for example, dropped data may occur. In order to solve such a problem, a deliver confirmation process may be introduced in the communication between the SeNB and the MeNB. For example, a retransmission process may be introduced. This reduces dropped data in the communication between the SeNB and the MeNB.

The case where a UE during dual connectivity performs HO between MeNBs by bearer split will be described.

Described below is a case where moving of a UE degrades the reception quality of an S-MeNB and improves the reception quality of a T-MeNB in the measurement, and a measurement report is performed in accordance with event criteria.

In this embodiment, a SeNB release process is performed as described below. In step ST907 of FIG. 15, the S-MeNB that has received the measurement report from the UE in step ST906 of FIG. 14 uses the result of the measurement report to decide to cause the UE to perform HO to the T-MeNB.

When deciding to cause the UE to perform HO to the T-MeNB in step ST909, the S-MeNB transmits a SeNB release request message requesting release of the SeNB to the SeNB. In step ST911, the S-MeNB transmits, as the RRC-related information, an RRC connection reestablishment request message to the UE. This causes the S-MeNB to stop bearer split of the bearer 2 and transmit and receive the bearer 2 directly to and from the UE in steps ST916 and ST917.

After the release of the SeNB, in step ST928 of FIG. 14, the handover (HO) process from the S-MeNB to the T-MeNB is performed. The HO process of step ST928 is executed similarly to the HO process shown in FIG. 12 described above. This HO process switches both of the two bearers from the S-MeNB to the T-MeNB.

After the switch to the T-MeNB, the post-HO process in step ST1010 of FIG. 14 is executed. Specifically, in step ST950 of FIG. 16, the T-MeNB notifies the SeNB of an addition request message, and in step ST952, notifies the UE of the RRC-related information for communication. Consequently, the bearer 2 is subjected to bearer split.

One bearer of the bearer 2 subjected to bearer split is used when data is directly communicated between the T-MeNB and the UE in step ST1005, and the other bearer is used when data is communicated between the T-MeNB and the UE via the SeNB in steps ST1007 and ST1008. Between the T-MeNB and the S-GW, in step ST1006, data is communicated through one path. In this way, bearer split can be processed without sending a path switch request to the MME and the S-GW.

As described above, this modification enables the UE during dual connectivity to perform HO between macro cells in the case of Alternative 3C of the user plane architecture of dual connectivity described in Non-Patent Document 11, that is, in the case where communication is performed between the macro cell and the UE and between the small cell and the UE using a bearer subjected to bearer split.

Second Embodiment

Figure 17:
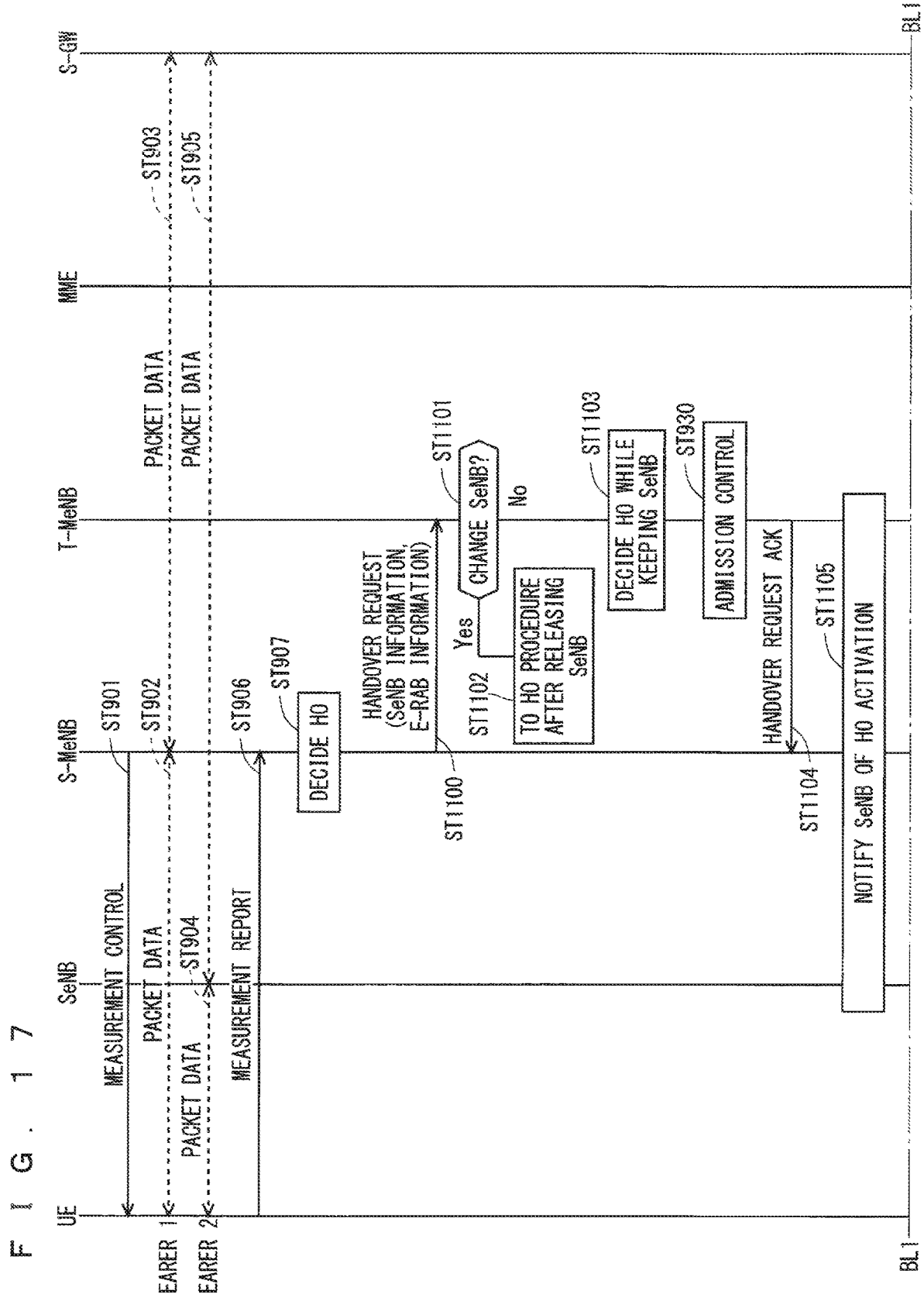
FIG. 17 shows an example sequence of a handover-related process in a communication system of a second embodiment of the present invention.
Figure 18:
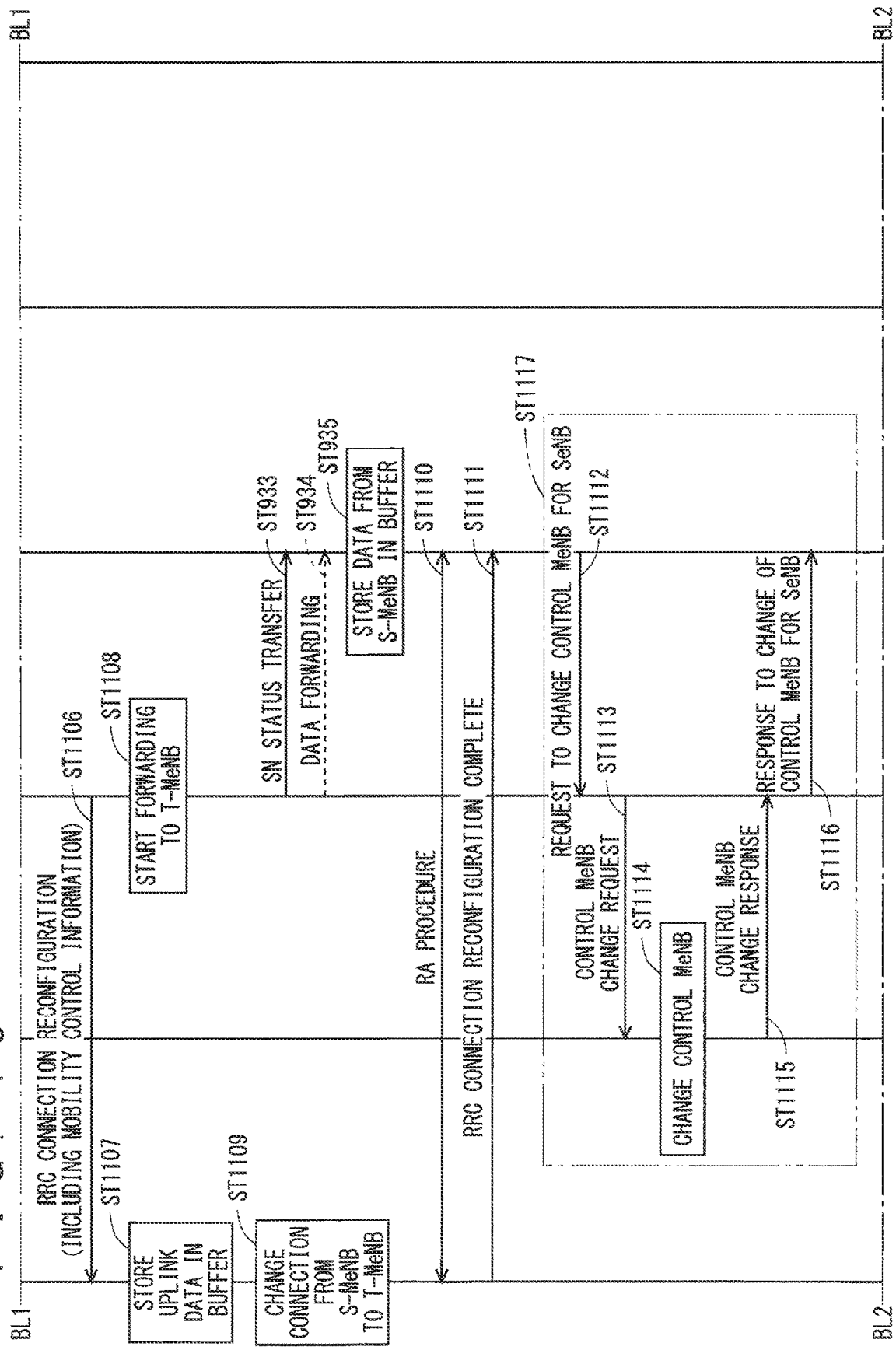
FIG. 18 shows the example sequence of the handover-related process in the communication system of the second embodiment of the present invention.
Figure 19:
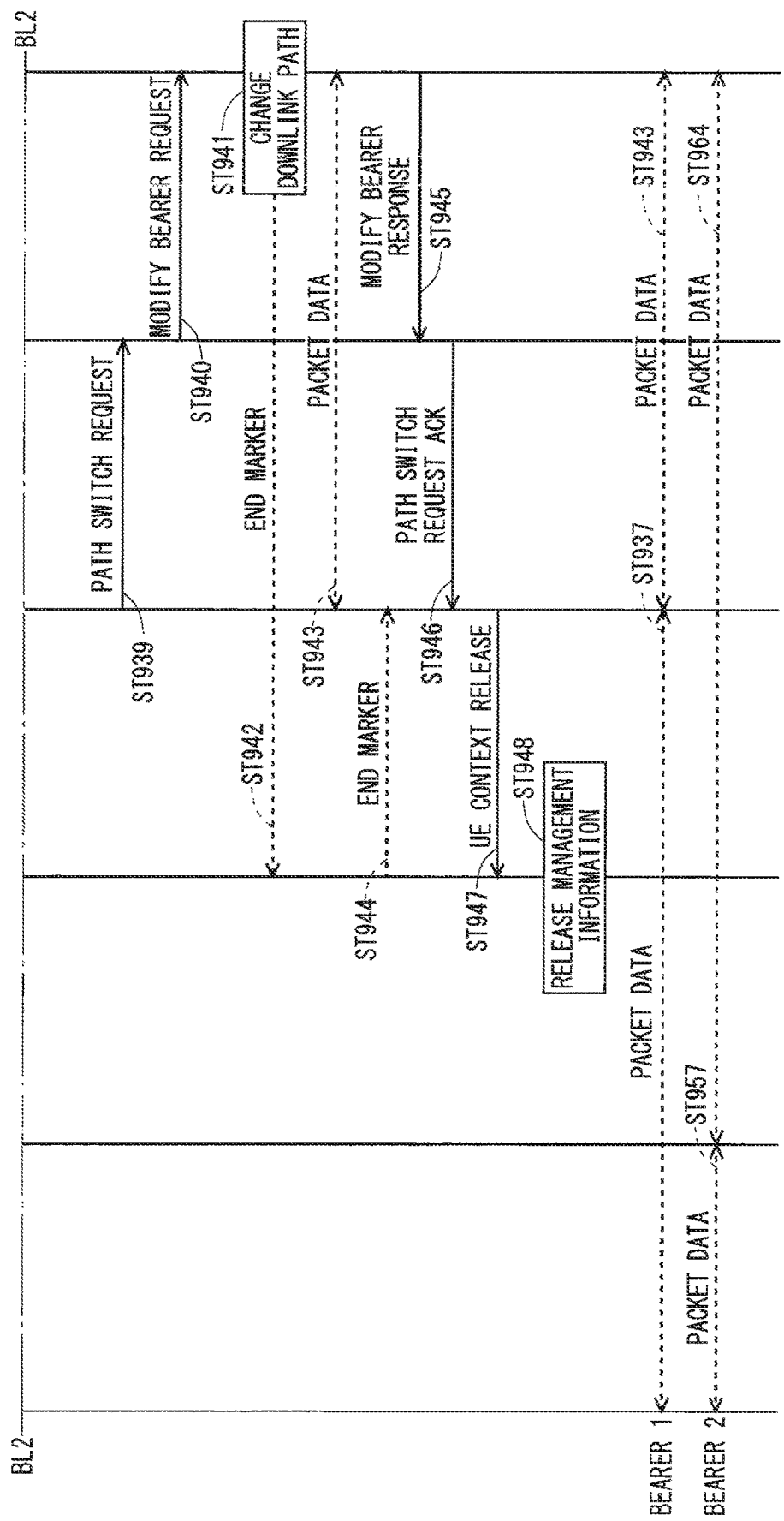
FIG. 19 shows the example sequence of the handover-related process in the communication system of the second embodiment of the present invention.

FIGS. 17 to 19 show an example sequence of a handover-related process in a communication system of a second embodiment of the present invention. FIG. 17 is continuous with FIG. 18 at a boundary BL1. FIG. 18 is continuous with FIG. 19 at a boundary BL2. The handover-related process of this embodiment is similar to the handover-related process of the first embodiment shown in FIGS. 10 to 13 described above, and thus, the same steps will be denoted by the same step numbers and common description will be omitted.

This embodiment will disclose a method of performing HO without releasing a SeNB in the case of Alternative 1A of the user plane architecture of dual connectivity described in Non-Patent Document 11 (see 8.1.1.1 of Non-Patent Document 11).

In Alternative 1A of the user plane architecture, in steps ST902 and ST903, communication is performed through two paths: a path through which communication is performed from the S-GW via the MeNB using the bearer 1 in steps ST902 and ST903, and a path through which communication is performed from the S-GW via the small cell using the bearer 2 in steps ST904 and ST905.

In this embodiment, the connection of the UE during dual connectivity with the SeNB is not released when the UE performs HO between MeNBs. In other words, HO between MeNBs is performed while keeping dual connectivity of the UE.

Disclosed below is a method in which a MeNB notifies a UE during dual connectivity of a measurement control message.

In the example shown in FIGS. 17 to 19, in step ST901, the S-MeNB notifies the UE of a measurement control message. Measurement of neighbor SeNBs may be configured in the measurement control message. Measurement of a frequency for SeNB may be configured. Or, as the measurement configuration, an event for SeNB or an event at a frequency for SeNB, or event criteria may be configured separately from that for MeNB.

Examples of the configuration parameter include a SeNB identifier, a frequency, an event number for report, a threshold of reception quality, and a measurement period. Examples of the reception quality include RSRP and RSRQ.

The UE that has received the measurement control message in step ST901 measures the MeNB and the SeNB.

Described below is a case where moving of a UE degrades the reception quality of an S-MeNB and improves the reception quality of a T-MeNB in the measurement, and a measurement report is performed in accordance with event criteria.

In step ST906, the UE performs a measurement report to the S-MeNB. The measurement report from the UE may include the identifier and the reception quality of the SeNB used for dual connectivity.

In step ST907, the S-MeNB that has received the measurement report from the UE in step ST906 uses the result of the measurement report to decide to cause the UE to perform HO to the T-MeNB.

In step ST1100, the S-MeNB notifies the T-MeNB of a HO request message. The information related to a SeNB (hereinafter also referred to as "SeNB information") may be included in the HO request message to be notified. Examples of the SeNB information include a SeNB identifier and the reception quality of the SeNB in the UE.

A non-limiting example of the information related to the bearer of the SeNB (hereinafter also referred to as "bearer information") is an E-RAB identifier. When a plurality of bearers are configured in a SeNB, the MeNB may provide an identifier to each bearer. The identifier of each bearer and the information related to a bearer configuration may be notified in association with each other. The identifier of the SeNB and the identifier of the bearer may be notified in association with each other. Examples of the information related to the bearer configuration configured per bearer include QoS parameters, specifically, a quality of service (QoS) class identifier (abbreviated as QCI), allocation and retention priority (abbreviated as ARP), and guaranteed bit rate QoS information.

This enables a configuration per bearer, so that the S-MeNB can notify the T-MeNB of a bearer configuration used by the SeNB. The T-MeNB can obtain a bearer configuration for each bearer of the SeNB, and thus can determine whether the bearer configuration needs to be changed per bearer. The bearer configuration may be notified in association with the bearer information of a SeNB.

A non-limiting example of the configuration information related to RRC is an RRC context. Examples of the RRC context include an access stratum (AS) configuration indicating the configuration of a radio resource and a radio resource management (abbreviated as RRM) configuration indicating RRM information.

The RRC-related information includes the RRC-related information for MeNB and the RRC-related information for SeNB. Each piece of RRC-related information may be discernable. For example, an RRC context for MeNB and an RRC context for SeNB are created separately. Alternatively, the information for MeNB and the information for SeNB may be created separately in one RRC context.

Consequently, the RRC-related information for SeNB and the RRC-related information for MeNB are configurable dedicatedly, so that the S-MeNB can notify the T-MeNB of the RRC-related information of each of the MeNB and the SeNB. The T-MeNB can obtain the RRC-related information of each of the S-MeNB and the SeNB. The T-MeNB can thus determine whether the RRC-related configuration of the SeNB needs to be changed.

In step ST1101 the T-MeNB determines whether to change the SeNB using the information received in the HO request message from the S-MeNB. This process determines whether the bearer of the SeNB can be handed over to the T-MeNB in the same state as it was configured in the S-MeNB. For example, in some cases, the number of S-MeNBs that can be accommodated by the T-MeNB is limited, and a S-MeNB cannot be accepted due to such a limit. In the case of Alternative 3C of the user plane architecture in dual connectivity, whether a bearer subjected to bearer split by the S-MeNB can be accommodated is also the information for judgment.

If judging to change the SeNB, the T-MeNB moves to step ST1102. Or, the T-MeNB may move to step ST1102 when deciding to release the SeNB in the HO process, not limited to the case where the T-MeNB determines to change the SeNB.

In step ST1102, the T-MeNB executes the SeNB release process of step ST908 shown in FIG. 10 to release the SeNB, and then, executes the HO process of step ST908. Specifically, the T-MeNB notifies the S-MeNB of the information indicating a request to execute the SeNB release process (hereinafter also referred to as "SeNB release process executing request information"). The S-MeNB that has been notified of the SeNB release process execution request information from the T-MeNB may apply the method disclosed in the first embodiment, description of which will be omitted here.

In this case, the HO request from the S-MeNB to the T-MeNB in step ST1100 may be omitted. After notifying the S-MeNB of the SeNB release process execution request information, the T-MeNB may perform admission control of step ST930.

The T-MeNB may use the handover request Ack message to notify the S-MeNB of the SeNB release process execution request information. For example, the T-MeNB may notify of the information using the handover request Ack message in step ST1104. The T-MeNB that has decided to release the SeNB in the HO process determines to perform HO only between MeNBs, performs admission control based on the judgment, includes the SeNB release process execution request information in a handover request Ack message, and notifies the S-MeNB of the handover request Ack message. When the system is defined such that the SeNB is released in HO of the MeNB, the handover request Ack message may indicate a request to execute a SeNB release process. The S-MeNB performing dual connectivity that has received the handover request Ack message from the T-MeNB executes the SeNB release process.

The T-MeNB may notify the UE of SeNB release process execution request information using the RRC connection reconfiguration message including mobility control information (MCI). For example, an RRC connection reconfiguration message including MCI of step ST1106 may be used. When the system is defined such that the SeNB is released in HO of the MeNB, the RRC connection reconfiguration message including MCI may indicate the request to execute a SeNB release process. The UE configuring the SeNB that has received the RRC connection reconfiguration message including MCI from the S-MeNB executes the process of releasing the SeNB.

If judging not to change the SeNB, in step ST1103, the T-MeNB decides to perform the HO process while continuously using the SeNB. In other words, the T-MeNB only changes the MeNB. If judging not to change the SeNB, the T-MeNB does not perform the process of changing the bearer 2 being used by the SeNB.

In step ST930, the T-MeNB performs admission control in response to a HO request. The admission control may be performed before the judgment as to whether to change the SeNB or may be performed together with this judgment.

The T-MeNB does not change the SeNB, and thus, performs admission control due to a change of the MeNB. In admission control, the T-MeNB performs an RRC-related configuration for T-MeNB. Examples of the RRC-related configuration include an AS configuration indicating the configuration of a radio resource and an RRM configuration indicating RRM information. The T-MeNB may configure the information included in the RRC connection reconfiguration message.

A UE-dedicated RACH preamble configuration used by the T-MeNB may be provided and configured separately from a UE-dedicated RACH preamble configuration used by the SeNB. Also, a cell-radio network temporary identifier (C-RNTI) used by the T-MeNB may be provided and configured separately from the C-RNTI used by the SeNB. In the case where, for example, the SeNB supports another UE not being served by the T-MeNB, the configuration and C-RNTI can be configured dedicatedly to each UE, thus enabling flexible control.

Alternatively, a UE-dedicated RACH preamble configuration used by the T-MeNB may be configured to be identical to a UE-dedicated RACH preamble configuration used by the SeNB. Also, the C-RNTI used by the T-MeNB may be configured to be identical to the C-RNTI used by the SeNB. In the case where, for example, the SeNB does not support another UE not being served by the T-MeNB, the configuration and C-RNTI need not to be configured dedicatedly to each UE and can be controlled by one value, resulting in simple control.

The RRC-related configuration for T-MeNB needs the information for allowing the UE to perform an RRC connection reconfiguration with the T-MeNB.

When deciding to accept a HO request, in step ST1104, the T-MeNB notifies the S-MeNB of a handover request Ack message including a HO command message. This HO command message may include the configuration information related to RRC for T-MeNB described above.

When keeping the bearer 2 using the SeNB, the T-MeNB may notify the S-MeNB that HO is enabled while keeping the configuration of the bearer 2 using the SeNB. When keeping the configuration of the bearer 2 using the SeNB, the T-MeNB may notify the S-MeNB that HO is enabled while keeping the RRC-related configuration for SeNB. These may be notified in a handover request Ack message, may be notified together with a handover request Ack message to the bearer not using the SeNB, or may be notified separately from a handover request Ack message to the bearer not using the SeNB.

The handover request Ack message or the HO command message may include the information indicating whether there is a change in the RRC-related configuration of the SeNB. When obtaining the information and recognizing that there is a change, the S-MeNB may further obtain the RRC-related configuration of the SeNB. This simplifies the process when there is no change.

When there is no change in the RRC-related configuration of the SeNB, the configuration information needs not to be included in a HO command message. This reduces an amount of information to be signaled.

Alternatively, the HO command message may include the configuration information related to RRC for SeNB. The S-MeNB can compare the configuration information related to RRC for SeNB obtained from the T-MeNB with the configuration information related to RRC for SeNB of its own cell, thus reliably verifying that there is no change.

The S-MeNB that has received the handover request Ack message in step ST1104 can recognize that the relevant HO is HO to the T-MeNB while keeping the SeNB to the UE during dual connectivity.

The S-MeNB which has recognized that it is to perform HO while keeping the SeNB does not request the SeNB to change the configuration of the bearer 2. The S-MeNB does not request to change the RRC-related configuration for SeNB.

In step ST1105 the process of notifying the SeNB of the information indicating that HO is to be activated is performed among the T-MeNB, the S-MeNB, and the SeNB. For example, the T-MeNB notifies the SeNB of the information indicating that HO is to be activated. This notification may be performed when the T-MeNB transmits a handover request Ack message to the S-MeNB. Alternatively, the S-MeNB that has received the handover request Ack message from the T-MeNB may notify the SeNB of the information indicating that HO is to be activated.

In step ST1108 of FIG. 18, the S-MeNB forwards the PDCP SN information and the yet-to-be-transmitted data to the T-MeNB and establishes loss-free communication.

A change of the configuration of the bearer 2 activated by the SeNB may be avoided while the UE during dual connectivity is performing HO between MeNBs. Any change in the configuration of the bearer activated by the SeNB during HO can trigger the process when the MeNB is changed from the S-MeNB to the T-MeNB, leading to complicated control, which increases a possibility of malfunction. A change of the configuration of the bearer 2 activated by the SeNB during HO is avoided, thus reducing malfunctions.

Disclosed below is a method of avoiding a change of the configuration of the bearer 2 activated by the SeNB during HO.

The T-MeNB notifies the SeNB of the information indicating that HO is to be activated. This notification may be performed when the T-MeNB transmits a handover request Ack message to the S-MeNB. Alternatively, the S-MeNB that has received the handover request Ack message from the T-MeNB may notify the SeNB of the information indicating that HO is to be activated.

The SeNB that has received the information indicating that HO has been activated does not activate a request to change the configuration of the bearer 2. The SeNB may avoid activating the request until the HO completes.

In another method, during the HO, the S-MeNB or the T-MeNB may notify the SeNB of Nack (or rejection) in response to the request to change the configuration of the bearer 2 from the SeNB. Cause information may be included, and the information indicating that Nack (or rejection) is notified because it is during HO may be provided and configured as a cause.

The method in which a SeNB recognizes the completion of HO will be disclosed below. The T-MeNB may notify the SeNB of the information indicating the completion of HO. This notification may be made when the T-MeNB receives a path switch request Ack message from the MME in the HO process. Alternatively, the completion of HO may be the completion of a MeNB change process described below.

This prevents, in the HO process of a UE during dual connectivity, a change of the configuration of the bearer 2 to the UE activated by the SeNB. Malfunctions are thus reduced as a system.

Another method will be disclosed. Although it has been disclosed that when performing HO while keeping the SeNB, the S-MeNB does not request the SeNB to change the configuration of the bearer 2 and to change the RRC-related configuration for the SeNB, in another method, when performing HO while keeping the SeNB, the S-MeNB may notify the SeNB that the relevant HO is HO while keeping the SeNB. Alternatively, the S-MeNB may notify that it does not request the SeNB to change the split bearer configuration and to change the RRC-related configuration for SeNB. This may be notified together with the information indicating that HO is to be activated.

This allows the SeNB to recognize during HO, for example, whether the relevant HO is HO to be performed while keeping the SeNB. For HO while keeping the SeNB, during the HO, the SeNB can avoid the change of the configuration of the bearer 2 to the UE activated by the SeNB. Similar effects described above can be achieved.

In step ST1106, the S-MeNB that has received the handover request Ack message notifies the UE of an RRC connection reconfiguration message including mobility control information (abbreviated as MCI) to cause the UE to perform HO to the T-MeNB. The S-MeNB that has received the handover request Ack message may notify the UE that there is no change in the bearer using the SeNB.

The S-MeNB notifies the UE that there is no change in the SeNB for E-RAB that configures the bearer 2 during the HO. Or, the S-MeNB may notify that there is no change in the RRC-related configuration for SeNB. A notification may be made by being included in an RRC connection reconfiguration message including the MCI.

When recognizing the configuration information related to RRC for the SeNB, the S-MeNB may notify the UE of the configuration information as desired. The UE can compare the configuration information related to RRC for the SeNB connected with its own UE and the received configuration information, thus reliably verifying that there is no change.

The UE that has received the RRC connection reconfiguration message including MCI in step ST1106 performs HO from the S-MeNB to the T-MeNB while remaining synchronized and connected with the SeNB. The UE performs HO while keeping a radio resource with the SeNB. In this state, the UE can communicate with the SeNB.

The method of handling uplink data from the UE to the SeNB will be disclosed below. When performing HO while remaining connected with the SeNB, the UE can keep transmitting the uplink data of the bearer 2. Or, the UE can stop transmitting the uplink data and store the uplink data in the buffer during HO until the completion of HO from the S-MeNB to the T-MeNB. This provides a time interval before the establishment of a control plane, thus reducing, for example, a process of buffering the control information between the SeNB and the S-MeNB or between the SeNB and the T-MeNB when the control plane path is yet to be established, which simplifies the process of the SeNB.

In step ST1107, the UE that has received, from the S-MeNB, the MCI instructing HO to the T-MeNB in the step ST1106 stops transmitting the uplink data of the bearer 1 and stores the uplink data in the buffer.

In step ST1109, the UE performs a process of changing connection from the S-MeNB to the T-MeNB in accordance with the MCI. After receiving the MCI, the UE disconnects the connection with the S-MeNB and is then connected with the T-MeNB. The UE reconfigures the RRC connection for the T-MeNB using the contents received in the RRC connection reconfiguration message in step ST1106, thereby being connected with the T-MeNB.

The UE performs an RA procedure with the T-MeNB in step ST1110 and notifies the T-MeNB of an RRC connection reconfiguration complete message in step ST1111.

After notifying the T-MeNB of the RRC connection reconfiguration complete message, the UE can perform data communication directly with the T-MeNB.

After notifying of the RRC connection reconfiguration complete message with the T-MeNB, the UE transmits uplink data of the bearer 1.

The method of handling downlink data to be notified to the UE by the SeNB will be disclosed below. When performing HO while remaining connected with the UE, the SeNB can keep transmitting the downlink data of the bearer 2.

Alternatively, the SeNB can also stop transmitting the downlink data and store the downlink data in the buffer during HO until the completion of HO from the S-MeNB to the T-MeNB. This provides a time interval before the establishment of a control plane, thus reducing, for example, a process of buffering the control information between the SeNB and the S-MeNB or between the SeNB and the T-MeNB when the control plane path is yet to be established, which simplifies the process of the SeNB.

The SeNB is notified of the configuration of a bearer for dual connectivity to the UE by the MeNB. The configuration information related to RRC of the SeNB to the UE is notified by the MeNB.

The SeNB thus needs to recognize, for example, by which MeNB the configuration of the bearer has been notified, and to which MeNB the SeNB should notify of the configuration information related to RRC that has been configured by the SeNB. In other words, the SeNB needs to recognize the MeNB.

The SeNB performs data communication for the UE that performs dual connectivity between MeNBs. The SeNB needs to recognize data from which MeNB the SeNB should transmit to the UE, and to which MeNB the SeNB should transmit the data from the UE. In other words, the SeNB needs to recognize the MeNB.

Although the former MeNB and the latter MeNB may be configured separately, a case where they are the same will now be described. In the description below, the MeNB is referred to as a control MeNB for the SeNB.

Disclosed below is a method of recognizing, in the HO process by the UE during dual connectivity, to which MeNB the control MeNB for the SeNB has been changed in the case where the SeNB is not changed and the MeNB is changed from the S-MeNB to the T-MeNB. The following two, (1) and (2), will be disclosed as specific examples.

The following two, (1) and (2), will be disclosed as specific examples of the method of recognizing to which MeNB the control MeNB for the SeNB has been changed.
 (1) The S-MeNB notifies the SeNB of a change of the control MeNB.
 (2) The T-MeNB notifies the SeNB of a change of the control MeNB.

The specific example (1) will be disclosed below specifically. Upon receipt of an RRC connection reconfiguration complete message from the UE, the T-MeNB notifies the S-MeNB of a message requesting to change the control MeNB for the SeNB so as to request the SeNB to change a control MeNB. The notification may be made through X2 signaling. The identifier of a SeNB that is to change the control MeNB may be included in this notification to be notified. The change cause information may be included to be notified. Or, the information indicating that a change of the MeNB is due to HO may be provided to be notified.

The S-MeNB that has received the notification notifies the SeNB that is to change a control MeNB of a control MeNB change request message requesting to change a control MeNB. This notification may be made through X2 signaling. Alternatively, this notification may be made through signaling on an interface provided between the MeNB and the SeNB.

The following five, (1) to (5), will be disclosed as specific examples of the information included in the signaling.
 (1) Information indicating a change of the control MeNB.
 (2) Identifier of a control MeNB after change, which is herein the identifier of a T-MeNB.
 (3) Bearer identifier of a path using a SeNB, which is herein an E-RAB identifier (which may be, for example, E-RAB ID) or an EPS bearer identifier.
 (4) Identifier of a UE that performs dual connectivity using a bearer.
 (5) Combination of (1) to (4) above.

The SeNB that has received the control MeNB change request message specifies a bearer whose MeNB is to be changed from the information included in the control MeNB change request message. The SeNB changes the control MeNB of the bearer to a MeNB after change. The SeNB may manage the bearer in association with the identifier of the control MeNB. In other words, the SeNB may associate the identifier of the bearer with the identifier of the control MeNB. This allows the SeNB to change a control MeNB of a bearer for the UE that performs dual connectivity.

After changing a control MeNB, the SeNB accepts a modification of the bearer and a request for release only from the control MeNB after change. Additionally, the SeNB performs data communication with the MeNB after change.

This allows the SeNB to recognize to which MeNB the control MeNB has been changed and to perform, between the control MeNB after change and itself, communication for control of, for example, a request to modify and release the bearer to the UE and data communication.

The SeNB that has changed the control MeNB may notify the S-MeNB of a control MeNB change response message. This message may include the information indicating that the control MeNB has been changed.

The S-MeNB that has received the control MeNB change response message from the SeNB may notify the control MeNB after change, here, the T-MeNB of a message indicating that a change of the control MeNB for the SeNB has completed.

This allows the MeNB after change, here, the T-MeNB to recognize that the control MeNB for the SeNB has been changed and to start, to the SeNB, communication for control of, for example, a request to modify and release the bearer to the UE and data communication.

The MeNB after change may notify the SeNB of a message confirming that the control MeNB of the bearer to the UE has been changed. The SeNB may respond to the message.

The specific example (2) will be disclosed below specifically. Upon receipt of the RRC connection reconfiguration complete message from the UE, the T-MeNB notifies the SeNB of a control MeNB change request message. Used as the identifier of the SeNB may be SeNB information included in the HO request message received from the S-MeNB. This notification may be made through X2 signaling or through signaling on the interface provided between the MeNB and the SeNB. The information disclosed in the method of the specific example (1) is applicable as the information included in the signaling.

The process by the SeNB that has received the control MeNB change request message from the T-MeNB is similar to that of the specific example (1), and thus, description thereof will be omitted.

This allows the SeNB to recognize to which MeNB the control MeNB has been changed and to perform, between the control MeNB after change and itself, communication for control of, for example, a request to modify and release the bearer to the UE and data communication.

The SeNB that has changed the control MeNB may notify the T-MeNB of a control MeNB change response message. This message may include the information indicating that the control MeNB has been changed.

The T-MeNB that has received the control MeNB change response message from the SeNB may notify the control MeNB before change, here, the S-MeNB of a message indicating that a change of the control MeNB for the SeNB has completed.

This allows the MeNB before change, here, the S-MeNB to recognize that the control MeNB for the SeNB has been changed and to end the communication for control of, for example, a request to modify and release the bearer to the UE and data communication to the SeNB.

When UE during dual connectivity using a SeNB has performed HO, the SeNB can perform communication for control related to the bearer configuration and data communication with the MeNB after change (T-MeNB).

The UE and the T-MeNB can thus perform data communication via the SeNB.

A specific example of the process of changing a MeNB for the SeNB will be described. In step ST1112, the T-MeNB that has received the RRC connection reconfiguration complete message from the UE in step ST1111 notifies the S-MeNB of a control MeNB change request message requesting to change the control MeNB for the SeNB. The identifier of the SeNB that is to change the control MeNB is included in the message requesting to change the control MeNB for the SeNB.

In step ST1113, the S-MeNB that has received the message notifies the SeNB that is to change the control MeNB of a control MeNB change request message. The control MeNB change request message includes the information indicating a change of the control MeNB, the identifier of the T-MeNB, the bearer identifier of the path using the SeNB, the identifier of a bearer whose control MeNB is to be changed in the SeNB, the identifier of the S-MeNB, and the identifier of a UE being a HO target that is to perform dual connectivity using the SeNB. This allows the SeNB to recognize for which bearer configured by which MeNB the SeNB should change a control MeNB.

In step ST1114, the SeNB that has received the control MeNB change request message uses the received information to change a control MeNB. This allows the SeNB to perform communication for control related to a bearer and data communication with the T-MeNB that is a control MeNB after change. The SeNB that has changed the control MeNB ends the communication for control and data communication with the control MeNB before change.

In step ST1115, the SeNB that has changed the control MeNB in step ST1114 notifies the S-MeNB of a control MeNB change response message for notifying that the SeNB has changed the control MeNB. In step ST1116, the S-MeNB that has received the control MeNB change response message notifies the T-MeNB of a message responding to the change of the control MeNB for the SeNB in order to notify that a change of the control MeNB for the SeNB has completed. This allows the T-MeNB to recognize that the control MeNB for the SeNB has been changed to the T-MeNB. The T-MeNB can thus perform communication for control related to a bearer and data communication with the SeNB.

In this embodiment, as described above, the SeNB is notified of the control MeNB change request message via the S-MeNB. Alternatively, without via the S-MeNB, a control MeNB change request message and a control MeNB change response message may be transmitted and received directly between the T-MeNB and the SeNB. In that case, the information about a S-MeNB may be included in a control MeNB change request message and used to determine that the request is not an illegal control MeNB change request in the process of changing a control MeNB for the SeNB.

Steps ST1112 to ST1116 shown in FIG. 18 are referred to as step ST1117. Step ST1117 represents the process of changing a control MeNB for the SeNB that is performed among the T-MeNB, the S-MeNB, and the SeNB.

The path switch process by the S-GW for changing a MeNB is similar to that of FIG. 12 described above, and thus, description thereof will be omitted. The path switch process enables data communication via the T-MeNB between the S-GW and the UE being a HO target.

As to the data communication between the S-GW and the UE, through one path, data is communicated directly between the S-MeNB and the UE, while through the other path, data is communicated directly between the SeNB and the UE. The method disclosed in this embodiment allows the UE during dual connectivity using a bearer to perform HO between MeNBs.

Another method of the process of changing a control MeNB for the SeNB will be disclosed. In the method disclosed above, the process of changing a control MeNB for the SeNB is performed after the T-MeNB receives an RRC connection reconfiguration complete message from the UE.

In another method, the process of changing a control MeNB for the SeNB may be performed after the T-MeNB notifies the S-MeNB of a handover request Ack message, after the S-MeNB receives a handover request Ack message from the T-MeNB, or after the S-MeNB transmits an RRC connection reconfiguration message including MCI to the UE. The method described above may be applied to the process of changing a control MeNB for the SeNB.

Consequently, a control MeNB can be changed early to the T-MeNB by the SeNB, allowing control data communication to be performed early between the SeNB and the T-MeNB.

Another method of the process of changing a control MeNB for the SeNB will be disclosed. The process of changing a control MeNB for the SeNB may be performed after the T-MeNB completes a path switch process for the MME and the S-GW. Upon receipt of a path switch request Ack message from the MME, the T-MeNB notifies the SeNB that the MeNB is to be changed.

Alternatively, upon receipt of a UE context release message from the T-MeNB, the S-MeNB may notify the SeNB that the MeNB is to be changed. The method described above may be applied to the process of changing a control MeNB for the SeNB.

Consequently, data communication by a bearer using a SeNB can be performed after the HO process, which includes the path switch of the MME and the S-GW to the T-MeNB, completes. Data communication is performed after the reliable completion of the HO process, thus preventing the control of data communication from becoming more complicated.

According to this embodiment, as described above, upon activation of the HO process, the SeNB being a small cell is notified that a macro cell which controls the small cell is to be changed. This enables the execution of the HO process while holding a path through which communication is performed from the S-GW via the small cell, thus allowing the user plane data communication to be continued even during the HO process.

Compared with the case where HO is executed after releasing the SeNB as in the first embodiment, the control sequence is simplified, thus reducing an amount of information to be signaled in the HO sequence starting from during the dual connectivity.

Third Embodiment

Figure 20:
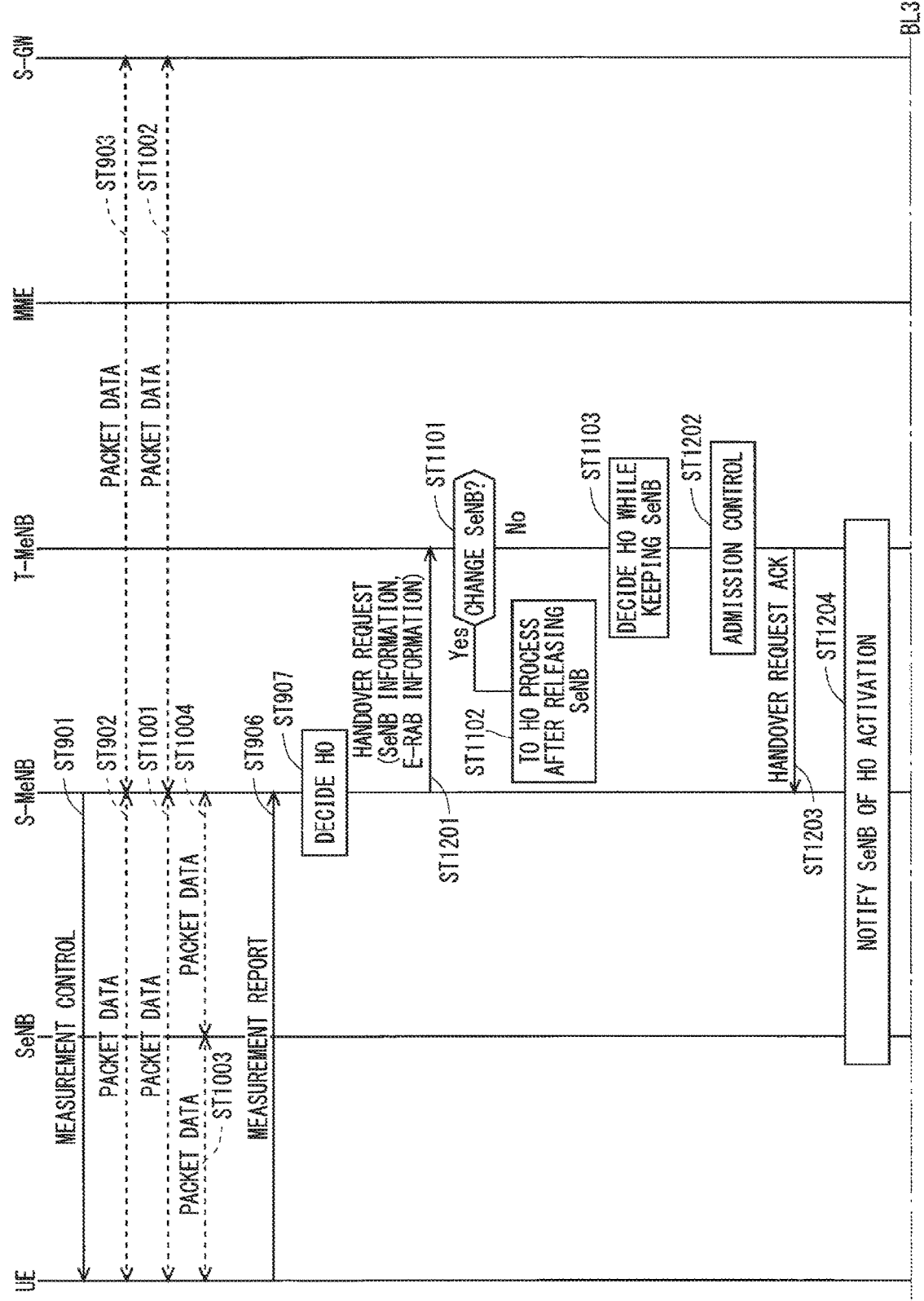
FIG. 20 shows an example sequence of a handover-related process in a communication system of a third embodiment of the present invention.
Figure 21:
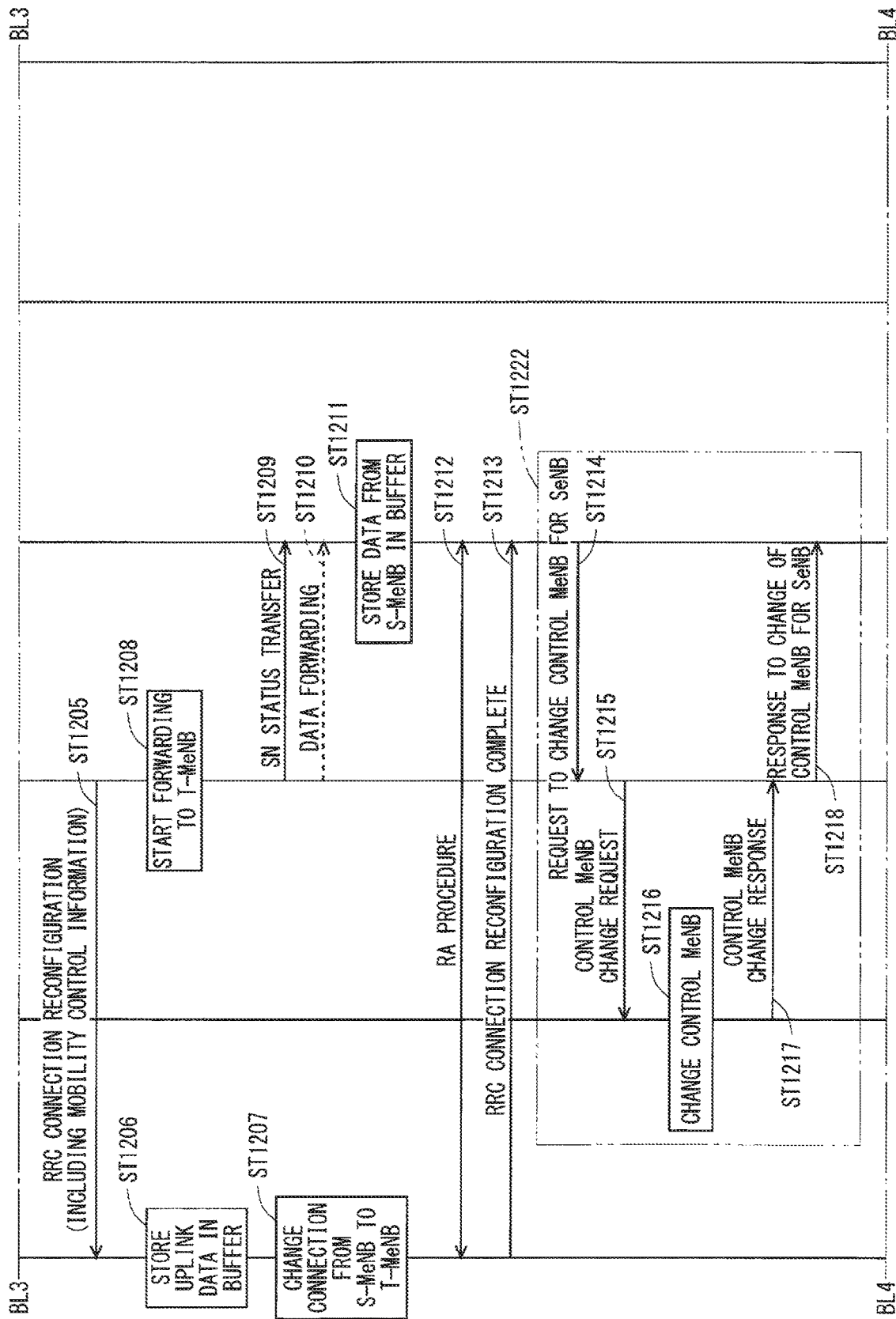
FIG. 21 shows the example sequence of the handover-related process in the communication system of the third embodiment of the present invention.
Figure 22:
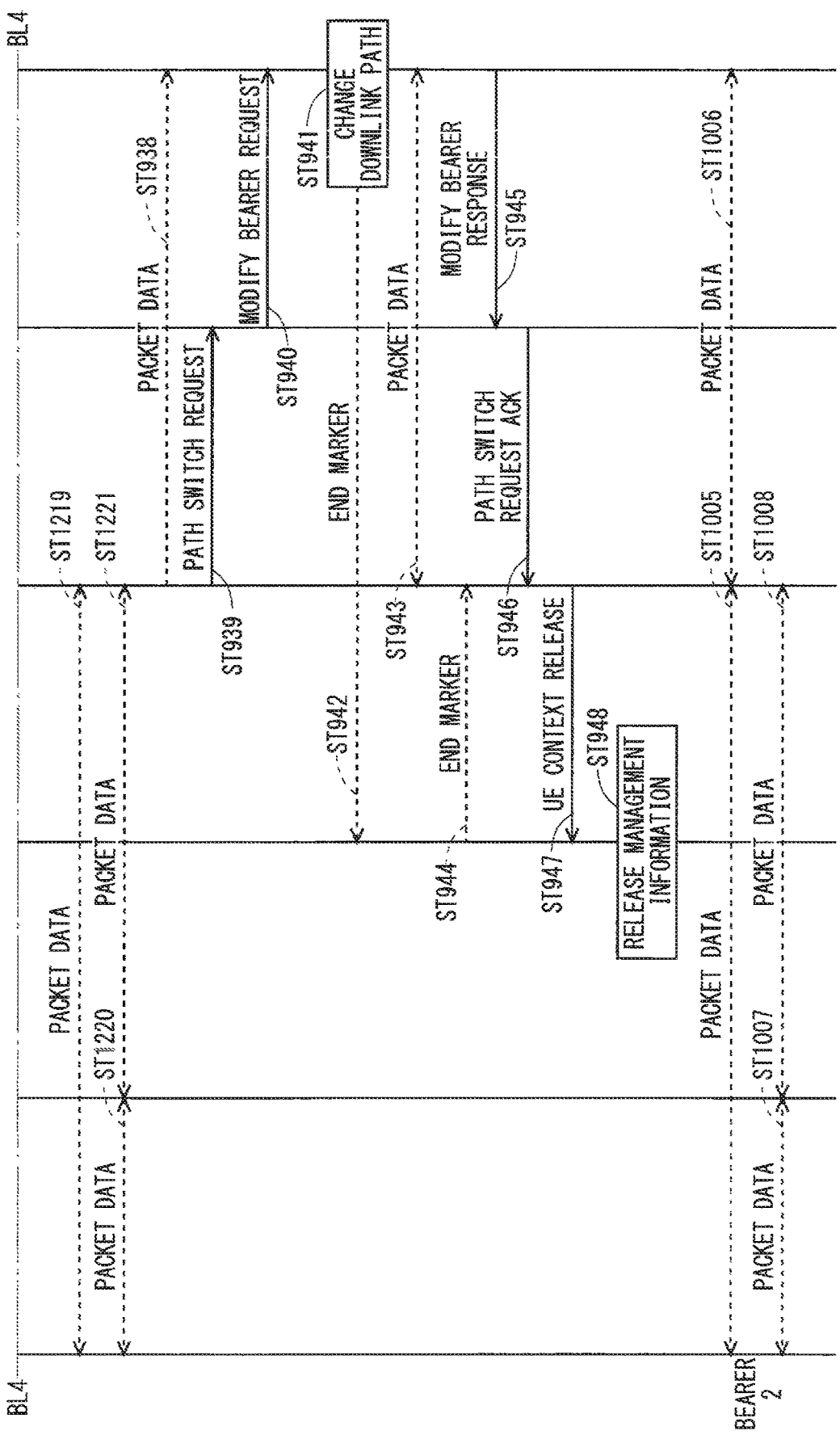
FIG. 22 shows the example sequence of the handover-related process in the communication system of the third embodiment of the present invention.

FIGS. 20 to 22 show an example sequence of a handover-related process in a communication system of a third embodiment of the present invention. FIG. 20 is continuous with FIG. 21 at a boundary BL3. FIG. 21 is continuous with FIG. 22 at a boundary BL4. The handover-related process of this embodiment is similar to the handover-related processes of the first embodiment shown in FIGS. 10 to 13 and the second embodiment shown in FIGS. 17 to 19 described above, and thus, the same steps will be denoted by the same steps numbers and description thereof will be omitted.

This embodiment will disclose a method of performing HO without releasing a SeNB in the case of Alternative 3C of the user plane architecture of dual connectivity described in Non-Patent Document 11 (see 8.1.1.8 of Non-Patent Document 11).

In Alternative 3C of the user plane architecture, the MeNB performs bearer split in which a bearer is split into a path through which the MeNB and the UE directly communicate with each other and a path through which the MeNB and the UE communicate with each other via a small cell.

When the UE during dual connectivity by bearer split performs HO between MeNBs, the connection with the SeNB is not released. In other words, HO between MeNBs is performed while keeping dual connectivity of the UE.

Although description has been made also in the first modification of the first embodiment, in bearer split, the E-RAB corresponding to one EPS bearer is separated into two paths by the S-MeNB, and data is communicated between the S-GW and the UE. Through one path, data is communicated directly between the S-MeNB and the UE in step ST1001. Through the other path, data is communicated between the S-MeNB and the UE via the SeNB in steps ST1003 and ST1004. In step ST1002, data is communicated between the S-MeNB and the S-GW through one path.

Described below is a case where the UE during dual connectivity performs HO between MeNBs by bearer split.

The method disclosed in the first embodiment is applicable as the method in which the MeNB notifies the UE during dual connectivity by bearer split of a measurement control message. Description thereof will be omitted here.

Described below is a case where the reception quality of an S-MeNB has degraded and the reception quality of a T-MeNB has improved in the measurement, and a measurement report is performed in accordance with event criteria.

In step ST906, the UE performs a measurement report to the S-MeNB. The measurement report from the UE may include the identifier and the reception quality of the SeNB used in dual connectivity.

The S-MeNB that has received the measurement report from the UE decides to cause the UE to perform HO to the T-MeNB using the result of the report.

In step ST1201, the S-MeNB notifies the T-MeNB of a HO request message. The SeNB information may be included in this message to be notified. The bearer information related to a bearer being subjected to bearer split using the SeNB may be notified. The information related to bearer split may be notified. Or, the RRC-related information in bearer split may be notified.

Examples of the SeNB information include the identifier of the SeNB and the reception quality of the SeNB by the UE.

A non-limiting example of the bearer information related to a bearer being subjected to bearer split is an E-RAB identifier.

A non-limiting example of the information related to bearer split is the information related to the configuration (hereinafter also referred to as a "split bearer configuration") of a bearer (hereinafter also referred to as a "split bearer") split into a direct path between the MeNB and the UE and a path between the MeNB and the UE via the SeNB. The MeNB may configure a split bearer for each split path. The identifier may be provided corresponding to each path. The identifier of each path and the information related to the split bearer configuration that is configured for each path may be notified in association with each other. For the path using a SeNB, the identifier of the SeNB and the identifier of the path may be notified in association with each other. Examples of the information related to a split bearer configuration that is configured for each path include QoS parameters such as QCI, ARP, and guaranteed bit rate QoS information.

This enables a split bearer configuration per path, thus allowing the S-MeNB to notify the T-MeNB of the split bearer configuration per path. The T-MeNB can obtain the split bearer configuration per path and determine whether the split bearer configuration per path needs to be changed.

The bearer information related to a bearer subjected to bearer split and the information related to a split bearer configuration may be notified in association with each other. The bearers subjected to and not subjected to bearer split are distinguishable from each other.

A non-limiting example of the configuration information related to RRC in bearer split is an RRC context. Examples of the RRC context include an AS configuration indicating the configuration of a radio resource and an RRM configuration indicating the RRM information.

The RRC-related information includes the RRC-related information for MeNB and the RRC-related information for SeNB. Each piece of RRC-related information may be discernable. For example, an RRC context for MeNB and an RRC context for SeNB are created separately. Alternatively, the information for MeNB and the information for SeNB may be created separately in one RRC context.

Consequently, the RRC-related information for SeNB and the RRC-related information for MeNB are configurable dedicatedly, so that the S-MeNB can notify the T-MeNB of the RRC-related information of each of the MeNB and the SeNB. The T-MeNB can obtain the RRC-related information of each of the S-MeNB and the SeNB. The T-MeNB can thus determine whether the RRC-related configuration of the SeNB needs to be changed.

In step ST1101, the T-MeNB uses the information received in the HO request message from the S-MeNB to determine whether to change the SeNB. The process of step ST1101 is similar to the process of step ST1101 of FIG. 17, and thus, description thereof will be omitted.

If judging to change the SeNB, the T-MeNB moves to step ST1102. The method disclosed in the second embodiment may be applied to the process of step ST1102, description of which will be omitted here.

If judging not to change the SeNB, in step ST1103, the T-MeNB decides to perform the HO process while continuously using the SeNB. In other words, the T-MeNB decides to change only the MeNB. If judging not to change the SeNB, the T-MeNB keeps the split bearer configuration using the SeNB. The T-MeNB does not perform the process of changing the split bearer configuration to the SeNB.

In step ST1202, the T-MeNB performs admission control in response to a HO request. The admission control may be performed before the judgment as to whether to change the SeNB or may be performed together with this judgment.

The T-MeNB does not change the SeNB, and thus, performs admission control due to a change of the MeNB. In admission control, the T-MeNB performs an RRC-related configuration for T-MeNB. Examples of the RRC-related configuration include an AS configuration indicating the configuration of a radio resource and an RRM configuration indicating RRM information. The T-MeNB may configure the information included in the RRC connection reconfiguration message.

The UE-dedicated RACH preamble configuration used by the T-MeNB may be provided and configured separately from the UE-dedicated RACH preamble configuration used by the SeNB. The C-RNTI used by the T-MeNB may be provided and configured separately from the C-RNTI used by the SeNB. In the case where, for example, the SeNB supports another UE not being served by the T-MeNB, the configuration or C-RNTI can be configured dedicatedly to each UE, thus enabling flexible control.

Alternatively, the UE-dedicated RACH preamble configuration used by the T-MeNB may be configured to be identical to the UE-dedicated RACH preamble configuration used by the SeNB. Also, the C-RNTI used by the T-MeNB may be configured to be identical to the C-RNTI used by the SeNB. In the case where, for example, the SeNB does not support another UE not being served by the T-MeNB, the configuration and C-RNTI need not to be configured dedicatedly to each UE and can be controlled by one value, resulting in simple control.

The RRC-related configuration for T-MeNB needs the information that enables the RRC connection reconfiguration of the UE with the T-MeNB.

When deciding to accept a HO request, in step ST1203, the T-MeNB notifies the S-MeNB of a handover request Ack message including a HO command message. This HO command message may include the configuration information related to RRC for T-MeNB described above.

When keeping the configuration of a split bearer using the SeNB, the T-MeNB notifies the S-MeNB of the identifier of the SeNB, the E-RAB identifier, the information related to bearer split, the RRC-related information in bearer split, and the like. The T-MeNB may notify the S-MeNB that HO is enabled while keeping the configuration of a split bearer using the SeNB. Or, when keeping the configuration of a split bearer using the SeNB, the T-MeNB may notify the S-MeNB that HO is enabled while keeping the RRC-related configuration for SeNB.

This reduces an amount of information to be notified. Such a notification may be performed in a handover request Ack message, may be performed together with a handover request Ack message to a bearer not using the SeNB, or may be performed separately from a handover request Ack message to a bearer not using the SeNB.

The handover request Ack message or the HO command message may include the information indicating whether there is a change in the RRC-related configuration of the SeNB. When obtaining the information and recognizing that there is a change, the S-MeNB may further obtain the RRC-related configuration of the SeNB. This simplifies the process when there is no change.

When there is no change in the RRC-related configuration of the SeNB, the configuration information needs not to be included in a HO command message. This reduces an amount of information to be signaled.

Alternatively, the HO command message may include the configuration information related to RRC for SeNB. The S-MeNB can compare the configuration information related to RRC for SeNB obtained from the T-MeNB with the configuration information related to RRC for SeNB of its own cell, thus reliably verifying that there is no change.

The S-MeNB that has received the handover request Ack message in step ST1203 can recognize that the relevant HO is HO to the T-MeNB while keeping the SeNB to the UE during dual connectivity.

The S-MeNB which has recognized that it is to perform HO while keeping the SeNB does not request the SeNB to change the split bearer configuration. The S-MeNB does not request to change the RRC-related configuration for SeNB.

A change of the bearer split configuration activated by the SeNB may be avoided while the UE during dual connectivity is performing HO between MeNBs. Any change in the bearer split configuration activated by the SeNB during HO can trigger the process when the MeNB is changed from the S-MeNB to the T-MeNB, leading to complicated control, which increases a possibility of malfunction. A change of the bearer split configuration activated by the SeNB during HO is avoided, thus reducing malfunctions.

Disclosed below is a method of avoiding a change of the bearer split configuration activated by the SeNB during HO.

The T-MeNB notifies the SeNB of the information indicating that HO is to be activated. This notification may be performed when the T-MeNB transmits a handover request Ack message to the S-MeNB. Alternatively, the S-MeNB that has received a handover request Ack message from the T-MeNB may notify the SeNB of the information indicating that HO is to be activated.

The SeNB that has received the information indicating that HO has been activated does not activate a request to change the bearer split information. The SeNB may avoid activating the request until the HO completes.

In another method, during the HO, the S-MeNB or the T-MeNB may notify the SeNB of Nack (or rejection) in response to the bearer split configuration change request from the SeNB. Cause information may be included, and the information indicating that Nack (or rejection) is notified because it is during HO may be provided and configured as a cause.

In the processes of FIGS. 20 to 22, in step ST1204, these processes are performed among the T-MeNB, the S-MeNB, and the SeNB.

The method in which a SeNB recognizes the completion of HO will be disclosed below. The T-MeNB may notify the SeNB of the information indicating the completion of HO. This notification may be performed when the T-MeNB receives a path switch request Ack message from the MME in the HO process. Alternatively, the completion of HO may be the completion of a process of changing a MeNB described below.

This prevents, in the HO process of a UE during dual connectivity, a change of the bearer split configuration to the UE activated by the SeNB. Malfunctions are thus reduced as a system.

Another method will be disclosed. Although it has been disclosed that when performing HO while keeping the SeNB as described above, the S-MeNB does not request the SeNB to change the split bearer configuration and to change the RRC-related configuration for SeNB, in another method, when performing HO while keeping the SeNB, the S-MeNB may notify the SeNB that the relevant HO is HO while keeping the SeNB. Alternatively, the S-MeNB may notify that it does not request the SeNB to change the split bearer configuration and to change the RRC-related configuration for SeNB. This may be notified together with the information indicating that HO is to be activated.

This allows the SeNB to recognize during HO, for example, whether the relevant HO is HO to be performed while keeping the SeNB. In the case of HO while keeping the SeNB, the SeNB can avoid the change of the bearer split configuration to the UE activated by the SeNB during the HO. Effects similar to those described above can be achieved.

In step ST1205, the S-MeNB that has received the handover request Ack message notifies the UE of an RRC connection reconfiguration message including mobility control information (MCI) to cause the UE to perform HO to the T-MeNB. The S-MeNB that has received the handover request Ack message may notify the UE that there is no change in the bearer split using the SeNB.

The S-MeNB notifies the UE that there is no change in the SeNB for E-RAB that configures a split bearer. The S-MeNB may notify that there is no change in the RRC-related configuration for SeNB. A notification may be made by being included in the RRC connection reconfiguration message including the MCI.

When recognizing the configuration information related to RRC for SeNB, the S-MeNB may notify the UE of the configuration information as desired. The UE can compare the configuration information related to RRC to the SeNB connected with its own UE and the received configuration information, thus reliably verifying that there is no change.

The UE that has received the RRC connection reconfiguration message including MCI in step ST1205 performs HO from the S-MeNB to the T-MeNB while remaining synchronized and connected with the SeNB. The UE performs HO while keeping the radio resource with the SeNB. For example, the UE does not reset the MAC configuration to the SeNB. Alternatively, the UE does not reconfigure the RLC configuration to the SeNB. In this state, the UE can communicate with the SeNB.

The configuration to the MeNB conforms to the configuration information related to RRC to the MeNB in the RRC connection reconfiguration message including the MCI. The PDCP is located at the MeNB, and thus, the configuration of the PDCP may conform to the configuration to the MeNB. For example, a reconfiguration is made from the configuration to the S-MeNB to the configuration to the T-MeNB. In the RRC connection reconfiguration message including MCI, the configuration information related to RRC to the MeNB and the configuration information related to RRC to the SeNB may be provided individually so as to be configurable individually. This allows the UE to individually reconfigure or keep the configuration to the SeNB and the configuration to the MeNB, or to shift these configurations to default configurations. In this example, the UE can reconfigure the configuration to the MeNB while keeping the configuration to the SeNB, and thus can change the MeNB from the S-MeNB to the T-MeNB while keeping the connection with the SeNB.

Disclosed below is a method of handing uplink data from the UE to the SeNB. Even when performing HO while remaining connected with the SeNB, the UE does not recognize whether the SeNB is connected with the S-MeNB or the T-MeNB. During the HO process, if the UE transmits uplink data to the SeNB when the SeNB is yet to be connected to the T-MeNB, the SeNB cannot transmit the uplink data to the T-MeNB, resulting in a loss of the uplink data. A method of solving such a problem will now be disclosed.

After receiving MCI from the S-MeNB, the UE stops transmitting uplink data and stores the uplink data in the buffer. The UE also stops transmitting uplink data until the RRC connection reconfiguration with the T-MeNB completes, and stores the uplink data in the buffer. The UE transmits the uplink data after notifying of an RRC connection reconfiguration complete message with the T-MeNB. The UE may stop transmitting new uplink data after receiving MCI from the S-MeNB and store the uplink data in the buffer. The uplink data may be all pieces of uplink data transmitted from the UE. The UE may stop transmitting the uplink data before the division into uplink data to be transmitted through a direct path to the T-MeNB and uplink data to be transmitted through a path to the T-MeNB via the SeNB, and store them in the buffer. Alternatively, if the uplink data to be transmitted through the direct path to the T-MeNB and the uplink data to be transmitted through the path to the T-MeNB via the SeNB are divided within the UE, the UE may stop transmitting these pieces of uplink data and store these pieces of uplink data in the buffer. Numbering of PDCP SNs may be performed as the process for uplink data by the UE. This solves a problem of an occurrence of uplink data loss.

In step ST1206, the UE that has received MCI instructing HO to the T-MeNB from the S-MeNB in step ST1205 stops transmitting the uplink data and stores the uplink data in the buffer. In step ST1207, the UE performs a process of changing connection from the S-MeNB to the T-MeNB in accordance with the MCI.

In step ST1207, the UE receives the MCI, and then, disconnects the connection with the S-MeNB to be connected to the T-MeNB. The UE reconfigures RRC connection for the T-MeNB using the contents received in the RRC connection reconfiguration message of step ST1205, to thereby being connected to the T-MeNB.

The UE performs the RA procedure with the T-MeNB in step ST1212 and notifies the T-MeNB of an RRC connection reconfiguration complete message in step ST1213.

The UE can perform data communication directly with the T-MeNB after notifying the T-MeNB of the RRC connection reconfiguration complete message.

The UE transmits pieces of uplink data after notifying of the RRC connection reconfiguration complete message with the T-MeNB. The pieces of uplink data are divided by the UE for one path through which uplink data is directly transmitted to the T-MeNB and the other path through which uplink data is transmitted to the T-MeNB via the SeNB, and the UE transmits the pieces of uplink data individually to the T-MeNB and the SeNB.

In step ST1219, the UE transmits uplink data through the path through which uplink data is directly transmitted to the T-MeNB. In step ST1220, the UE transmits uplink data to the SeNB. The uplink data may be transmitted in accordance with the PDCP SN.

The UE or the SeNB may perform the synchronization process between the UE and the SeNB while the UE is performing HO from the S-MeNB to the T-MeNB. Alternatively, the UE may perform the synchronization process before starting transmitting uplink data to the SeNB. The UE may use the RA procedure.

The UE may continue the transmission process for the uplink data to the S-MeNB, which has been transmitted and received to and from the SeNB before receiving MCI, or, before stopping transmitting uplink data. The UE may also continue the transmission process for uplink data, which has been directly transmitted and received to and from the S-MeNB, until no uplink data is delivered. These may be performed using, for example, an overhead compression configuration notified by the S-MeNB.

The UE may start transmitting, to the T-MeNB, the pieces of uplink data transmitted and received to and from the S-MeNB directly or via the SeNB before receiving MCI, or, before stopping transmitting uplink data starting from data whose transmission has failed. The UE may start transmitting data to the T-MeNB, starting from the data with the smallest PDCP SN among the pieces of data whose transmissions have failed. The UE may transmit the pieces of uplink data to the T-MeNB directly or via the SeNB, starting from the relevant data.

This can minimize a data loss. This method requires few buffers for uplink data in the SeNB, reducing the buffer capacity of the SeNB and simplifying the configuration thereof. The SeNB can be achieved inexpensively.

As to the transmission to the T-MeNB, the header compression configuration configured by the T-MeNB may be used in both of the transmission directly to the T-MeNB and the transmission to the T-MeNB via the SeNB.

In some cases, the SeNB is yet to be connected with the T-MeNB in the path through which uplink data is transmitted to the T-MeNB via the SeNB. In such a case, the SeNB may store the uplink data from the UE in the buffer until a change of the MeNB configuration with the T-MeNB completes. The SeNB transmits the uplink data from the UE to the T-MeNB after the change of the MeNB configuration with the T-MeNB completes. The SeNB may reorder the pieces of uplink data using the PDCP SNs thereof and transmit the reordered pieces of uplink data.

This solves the problem of an occurrence of data loss in the SeNB even when a change of the MeNB configuration delays for some reason between the SeNB and the T-MeNB, so that uplink data is transmitted from the UE to the SeNB.

Another method of solving the problem of an occurrence of uplink data loss will be disclosed. The UE transmits uplink data to the SeNB without waiting for the completion of the connection with the T-MeNB. The SeNB stores the uplink data from the UE in the buffer until the change of the MeNB configuration with the T-MeNB completes. The SeNB transmits the uplink data from the UE to the T-MeNB after the change of the MeNB configuration with the T-MeNB completes. The SeNB may reorder the pieces of uplink data using the PDCP SNs thereof and transmit the reordered pieces of uplink data. This solves the problem of an occurrence of data loss in the SeNB.

In this case, though an amount of buffers necessary for the SeNB increases compared with the method described above, the SeNB can transmit the buffered uplink data to the T-MeNB immediately after a change of the MeNB configuration between the SeNB and the T-MeNB is performed. This allows the uplink data from the UE to be delivered to the T-MeNB early.

A specific example in which the UE transmits uplink data to the SeNB before notifying the T-MeNB of the completion of connection will be described below.

After receiving MCI from the S-MeNB, the UE transmits new uplink data to the T-MeNB via the SeNB. The T-MeNB notifies the UE of a header compression configuration via the S-MeNB, and the UE uses the header compression configuration in new uplink transmission with the T-MeNB via the SeNB.

In this case, the UE may stop transmitting uplink data to the S-MeNB, which has been performed between the UE and the SeNB before receiving MCI. The UE may also transmit, to the SeNB, the uplink data whose transmission to the S-MeNB has failed in the header compression configuration configured by the T-MeNB. The UE may start transmitting data to the T-MeNB via the SeNB, starting from the data with the smallest PDCP SN among the pieces of data whose transmissions have failed.

Alternatively, the UE may transmit both of the uplink data directed to the S-MeNB and the uplink data directed to the T-MeNB to the SeNB. The SeNB may determine which header compression is used to determine to which MeNB the uplink data is directed. Or, in another method, the information indicating to which MeNB the uplink data is directed may be included in or added to the uplink data from the UE to the SeNB for transmission. For example, this information is included as one bit. In the method of configuring one bit, for example, when the SeNB transmits and receives only the user plane data, the D/C bit of a PDCP format may be configured as a bit for the information.

The SeNB buffers the uplink data from the UE until a change of the MeNB configuration with the T-MeNB completes and, after the change of the MeNB configuration with the T-MeNB completes, transmits the uplink data from the UE to the T-MeNB. The SeNB may reorder the pieces of uplink data using the PDCP SNs thereof and transmit the reordered pieces of uplink data.

The uplink data that the S-MeNB has received from the UE will be described. As to the pieces of uplink data from the UE which have been received by the S-MeNB, the uplink data received directly from the UE as well as the uplink data received via the SeNB, may be managed in accordance with the PDCP SNs. The S-MeNB reorders the pieces of uplink data in accordance with the PDCP SNs thereof and then transmits the reordered pieces of uplink data to the S-GW.

When the S-MeNB transmits MCI to the UE, the uplink data being communicated directly between the UE and the S-MeNB in the transmission of MCI may be transmitted from the S-MeNB to the S-GW after the data is successfully delivered to the S-MeNB. Similarly, the uplink data being communicated between the UE and the S-MeNB via the SeNB in the transmission of MCI may be transmitted to the S-GW after the data is successfully delivered to the S-MeNB. The S-GW may manage the order of the data received from the S-MeNB and the data received from the T-MeNB.

If the data whose transmission is determined to have completed at the time when the UE receives the MCI is yet to be successfully delivered to the S-MeNB for some reason, a data loss, which occurs because the UE does not transmit the data to the T-MeNB, can be prevented. The data may be forwarded to the T-MeNB in place of being transmitted from the S-MeNB to the S-GW. The T-MeNB may reorder pieces of data in accordance with the PDCP SNs thereof and transmit the reordered pieces of data to the S-GW. This achieves effects similar to those of the method of transmitting data to the S-GW.

Whether the S-MeNB transmits the data to the S-GW or forwards the data to the T-MeNB may be configured. The entity that performs the configuration may be a node at the RAN side or the core network side. The configuration information may be notified to the S-MeNB in advance. For example, the MME or the S-GW notifies the S-MeNB of the configuration information in advance.

When the S-MeNB transmits MCI to the UE, the data successfully delivered immediately after the data whose transmission has failed may be transmitted to the S-GW or forwarded to the T-MeNB. The UE performs uplink transmission to the T-MeNB, starting from the data whose transmission has failed. When the UE fails in delivering the relevant data and the following pieces of data to the T-MeNB after the completion of HO, the forwarded data is available.

Disclosed below is a method of handling downlink data notified to the UE by the MeNB via the SeNB.

The S-MeNB that has received the handover request Ack message in step ST1203 stops transmitting new downlink data and stores the downlink data in the buffer. The downlink data may be all pieces of downlink data transmitted to the UE that is caused to perform HO. The S-MeNB may stop the transmission before the division into downlink data to be transmitted through a direct path to the UE and downlink data to be transmitted through a path to the UE via the SeNB, and store these pieces of downlink data in the buffer. Alternatively, if the downlink data to be transmitted through the direct path to the UE and the downlink data to be transmitted through the path to the UE via the SeNB are divided within the S-MeNB, the S-MeNB may stop transmitting these pieces of downlink data and store them in the buffer. Numbering of PDCP SNs may be performed as the process for downlink data by the S-MeNB.

The S-MeNB forwards, to the T-MeNB, the downlink data that has not been delivered and the following pieces of downlink data among the pieces of downlink data transmitted and received to and from the UE before receiving the handover request Ack message, or, before data transmission is stopped.

The S-MeNB may forward, to the T-MeNB, pieces of downlink data that have not been delivered, starting from the data with the smallest PDCP SN. The S-MeNB may forward, to the T-MeNB, pieces of downlink data transmitted through the direct path from the S-MeNB to the UE as well as pieces of downlink data transmitted through the path via the SeNB, starting from the data with the smallest PDCP SN.

The S-MeNB starts forwarding to the T-MeNB in step ST1208, performs SN status transfer in step ST1209, and performs data forwarding in step ST1210. Forwarding is managed in accordance with the PDCP SNs, and forwarding is performed up to the end marker from the S-GW notified in steps ST942 and ST944.

In step ST1211, the T-MeNB stores the data forwarded from the S-MeNB in the buffer.

This prevents an occurrence of downlink data loss in the HO process even when the UE has performed dual connectivity using the SeNB.

The T-MeNB stores downlink data in the buffer until the direct RRC connection reconfiguration with the UE completes and until the process of changing a MeNB by the SeNB completes. The T-MeNB may buffer the downlink data through the direct path to the UE and the downlink data through the path via the SeNB before or after the separation by bearer split. Both of these pieces of downlink data can be managed in accordance with the PDCP SNs numbered. The UE can reorder the pieces of downlink data in accordance with the PDCP SNs.

In the method of storing pieces of downlink data in the buffer before separation, in the case where the bearer split configuration using the SeNB is to be changed, scheduling for data separation suitable for new bearer split configurations is enabled after the new bearer split configurations are configured for both of the paths. This enables scheduling efficient for the UE during dual connectivity.

In the method of storing pieces of downlink data in the buffer after the separation, when both of the paths become available, these paths can be used immediately to transmit downlink data to the UE. In other words, an increase in delay amount can be prevented.

Upon completion of the direct connection with the UE and upon completion of the process of changing a MeNB by the SeNB, the T-MeNB performs split scheduling of the pieces of downlink data to each path and transmits the downlink data to the UE through each path.

Another method will be disclosed. The T-MeNB starts a downlink data transmission to the UE upon completion of the direct connection with the UE or upon completion of the notification of a change of the MeNB by the SeNB, whichever comes earlier.

When storing pieces of data in the buffer before separating them, the T-MeNB performs downlink data transmission through an earlier path until both of the paths are established. After that, the T-MeNB may start bearer split when both of the paths are established.

When storing pieces of data in the buffer after separating them, the T-MeNB may perform downlink data transmission upon the establishment of each path.

This allows downlink data to be transmitted to the UE as early as possible.

The SeNB is notified of the configuration of a bearer for dual connectivity to the UE by the MeNB. The configuration information related to RRC of the SeNB to the UE is notified by the MeNB.

The SeNB thus needs to recognize, for example, by which MeNB the SeNB has been notified of the configuration of the bearer split, and to which MeNB the SeNB should notify of the configuration information related to RRC that has been configured by the SeNB. In other words, the SeNB needs to recognize the MeNB.

The SeNB performs data communication for the UE that performs dual connectivity between MeNBs. The SeNB needs to recognize the data from which MeNB the SeNB should transmit to the UE, and to which MeNB the SeNB should transmit the data from the UE. In other words, the SeNB needs to recognize the MeNB.

Although the former MeNB and the latter MeNB may be configured separately, the case where they are identical to each other will now be described. This MeNB is referred to as a control MeNB for the SeNB.

Disclosed below is a method of recognizing, in the HO process by the UE during dual connectivity, to which MeNB the control MeNB for the SeNB has been changed in the case where the SeNB is not changed and the MeNB is changed from the S-MeNB to the T-MeNB. The following two, (1) and (2), will be disclosed as specific examples of the method of recognizing to which MeNB the control MeNB for the SeNB has been changed.

(1) The S-MeNB notifies the SeNB of a change of the control MeNB.
(2) The T-MeNB notifies the SeNB of a change of the control MeNB.

The specific example (1) will be disclosed below specifically. Upon receipt of an RRC connection reconfiguration complete message from the UE, the T-MeNB notifies the S-MeNB of a message requesting to change the control MeNB for the SeNB. The notification may be made through X2 signaling. The identifier of a SeNB that is to change the control MeNB may be included in this notification to be notified. The change cause information may be included to be notified. Or, the information indicating that a change of the MeNB is due to HO may be provided to be notified.

The S-MeNB that has received this notification notifies the SeNB that is to change the control MeNB of a change of the control MeNB. This notification may be made through X2 signaling. Alternatively, this notification may be made through signaling on an interface provided between the MeNB and the SeNB.

The following seven, (1) to (7), will be disclosed as specific examples of the information included in the signaling.

(1) Information indicating a change of the control MeNB.
(2) Identifier of the control MeNB after change, which is herein the identifier of the T-MeNB.
(3) Bearer identifier of a path using a SeNB, which is herein an E-RAB identifier (which may be, for example, an E-RAB ID) or an EPS bearer identifier.
(4) Identifier of a split bearer whose control MeNB is to be changed in the SeNB.
(5) Identifier of a MeNB that has requested to configure a bearer split configuration, which is herein the identifier of an S-MeNB.
(6) Identifier of a UE that performs dual connectivity using bearer split.
(7) Combination of (1) to (6) above.

The SeNB that has received the control MeNB change notification message specifies a split bearer whose MeNB is to be changed from the information included in the change notification message. The SeNB changes the control MeNB of the split bearer to a MeNB after change. The SeNB may manage the split bearer in association with the identifier of a control MeNB. In other words, the SeNB may associate the identifier of the split bearer and the identifier of the control MeNB with each other. This allows the SeNB to change a control MeNB of the split bearer for a UE that performs dual connectivity.

After changing a control MeNB, the SeNB accepts a request to modify and release the split bearer only from the control MeNB after change. Additionally, the SeNB performs data communication with the MeNB after change.

This allows the SeNB to recognize to which MeNB the control MeNB has been changed and to perform, between the control MeNB after change and itself, communication for control of, for example, a request to modify and release the split bearer to the UE and data communication.

The SeNB that has changed the control MeNB may notify the S-MeNB of a control MeNB change response message. This message may include the information indicating that the control MeNB has been changed.

The S-MeNB that has received the control MeNB change response message from the SeNB may notify the control MeNB after change, here, the T-MeNB of a message indicating that a change of the control MeNB for the SeNB has completed.

This allows the MeNB after change, here, the T-MeNB to recognize that the control MeNB for the SeNB has been changed and to start, to the SeNB, communication for control of, for example, a request to modify and release the split bearer to the UE and data communication.

The MeNB after change may notify the SeNB of a message confirming that the control MeNB of the split bearer for the UE has been changed. The SeNB may respond to the message.

The specific example (2) will be disclosed specifically. Upon receipt of the RRC connection reconfiguration complete message from the UE, the T-MeNB notifies the SeNB of a control MeNB change request message. Used as the identifier of the SeNB may be the SeNB information included in the HO request message received from the S-MeNB. This notification may be made through X2 signaling or through signaling on an interface provided between the MeNB and the SeNB. The information disclosed in the method of the specific example (1) is applied as the information included in the signaling.

The process by the SeNB that has received the control MeNB change request message from the T-MeNB is similar to that of the specific example (1), and thus, description thereof will be omitted.

This allows the SeNB to recognize to which MeNB the control MeNB has been changed and to perform, between the control MeNB after change and itself, communication for control of, for example, a request to modify and release the split bearer to the UE and data communication.

The SeNB that has changed the control MeNB may notify the T-MeNB of a control MeNB change response message. This message may include the information indicating that the control MeNB has been changed.

The T-MeNB that has received the control MeNB change response message from the SeNB may notify the control MeNB before change, here, the S-MeNB of a message indicating that the control MeNB for the SeNB has been changed.

This allows the MeNB, here, the S-MeNB to recognize that the control MeNB for the SeNB has been changed and to end the communication for control of, for example, a request to modify and release the split bearer to the UE and data communication to the SeNB.

When the UE during dual connectivity using the SeNB has performed HO, the SeNB can perform communication for control related to the split bearer configuration and data communication with the MeNB after change (T-MeNB).

The UE and the T-MeNB can thus perform data communication via the SeNB.

A specific example of the process of changing a MeNB for the SeNB will be described. In step ST1214, the T-MeNB that has received the RRC connection reconfiguration complete message from the UE in step ST1213 of FIG. 21 notifies the S-MeNB of a message requesting to change the control MeNB for the SeNB. The identifier of the SeNB that is to change the control MeNB is included in this message.

In step ST1215, the S-MeNB that has received this message notifies the SeNB that is to change the control MeNB of a message requesting to change the control MeNB. This message includes the information indicating a change of the control MeNB, the identifier of the T-MeNB, the bearer identifier of the path using the SeNB, the identifier of a split bearer whose control MeNB is to be changed in the SeNB, the identifier of the S-MeNB, and the identifier of the UE being a HO target that performs dual connectivity using the SeNB. This allows the SeNB to recognize for which split bearer configured by which MeNB the SeNB needs to change the control MeNB.

In step ST1216, the SeNB that has received the message uses the information received in step ST1215 to change the control MeNB. This allows the SeNB to perform communication for control related to the split bearer and data communication with the T-MeNB being a MeNB after change. The SeNB that has changed the control MeNB ends the communication for control and data communication with the control MeNB before change.

In step ST1217, the SeNB that has changed the control MeNB notifies the S-MeNB of a control MeNB change response message to notify that the SeNB has changed the control MeNB. In step ST1218, the S-MeNB that has received the response message notifies the T-MeNB of a message responding to the change of the control MeNB for the SeNB in order to notify that a change of the control MeNB for the SeNB has completed. This allows the T-MeNB to recognize that the MeNB for the SeNB has been changed to the T-MeNB. The T-MeNB thus can perform communication for control related to the split bearer and data communication with the SeNB.

Thus, in steps ST1220 and ST1221, the downlink data from the T-MeNB to the UE and the uplink data from the UE to the T-MeNB can be communicated via the SeNB.

Steps ST1214 to ST1218 shown in FIG. 21 are referred to as step ST1222. Step ST1222 indicates the process of changing the MeNB for the SeNB that is performed among the T-MeNB, the S-MeNB, and the SeNB.

The path switch process by the S-GW for changing the MeNB from step ST939 to step ST947 is similar to that of FIG. 12, and thus, description thereof will be omitted.

Thus, data communication via the T-MeNB or via the T-MeNB and the SeNB can be performed between the S-GW and the UE being a HO target.

As to the data communication between the S-GW and the UE, through one path, data is directly communicated between the T-MeNB and the UE in step ST1005, and through the other path, data is communicated between the T-MeNB and the UE via the SeNB in steps ST1007 and ST1008. In step ST1006, data is communicated through one path between the T-MeNB and the S-GW.

The method disclosed in this embodiment allows the UE during dual connectivity by bearer split to perform HO between MeNBs.

Another method of the process of changing the MeNB for the SeNB in step ST1222 will be disclosed. In the method disclosed above, the process of changing the MeNB for the SeNB is performed after the T-MeNB receives an RRC connection reconfiguration complete message from the UE.

In the other method, the process of changing the MeNB for the SeNB may be performed after the T-MeNB notifies the S-MeNB of a handover request Ack message, after the S-MeNB receives the handover request Ack message from the T-MeNB, or after the S-MeNB transmits an RRC connection reconfiguration message including MCI to the UE. The method described above is applicable to the process of changing the MeNB for the SeNB.

This allows the SeNB to change the control MeNB to the T-MeNB early, so that data communication can be performed between the SeNB and the T-MeNB early.

The UE stops transmitting uplink data until the RRC connection reconfiguration with the T-MeNB completes and needs not to buffer uplink data. Or, the SeNB stops transmitting uplink data and needs not to buffer the uplink data. The UE can communicate uplink data to the T-MeNB via the SeNB early by split bearer using the SeNB.

The T-MeNB stops transmitting downlink data until it receives RRC connection reconfiguration complete from the UE and needs not to buffer the downlink data. The T-MeNB can communicate downlink data to the UE via the SeNB early by split bearer using the SeNB.

Consequently, communication can be performed through the path via the SeNB between the UE and the T-MeNB even when data communication is yet to be performed through the direct path between the UE and the T-MeNB. This enables the data communication process during HO with low delay, thus reducing data loss during HO.

Another method of the process of changing the MeNB for the SeNB in step ST1222 will be disclosed. The process of changing the MeNB for the SeNB may be performed after the T-MeNB completes the path switch process for the MME and the S-GW. The T-MeNB notifies the SeNB of a change of the MeNB upon receipt of a path switch request Ack message from the MME.

Alternatively, the S-MeNB may notify the SeNB of a change of the MeNB upon receipt of a UE context release message from the T-MeNB. The method described above may be applied to the process of changing a MeNB for the SeNB.

Thus, data communication by split bearer using the SeNB can be performed after the HO process, including a path switch from the MME and the S-GW to the T-MeNB, completes. Data communication is performed after the reliable completion of the HO process, thus preventing control of data communication from becoming more complicated.

Fourth Embodiment

Figure 23:
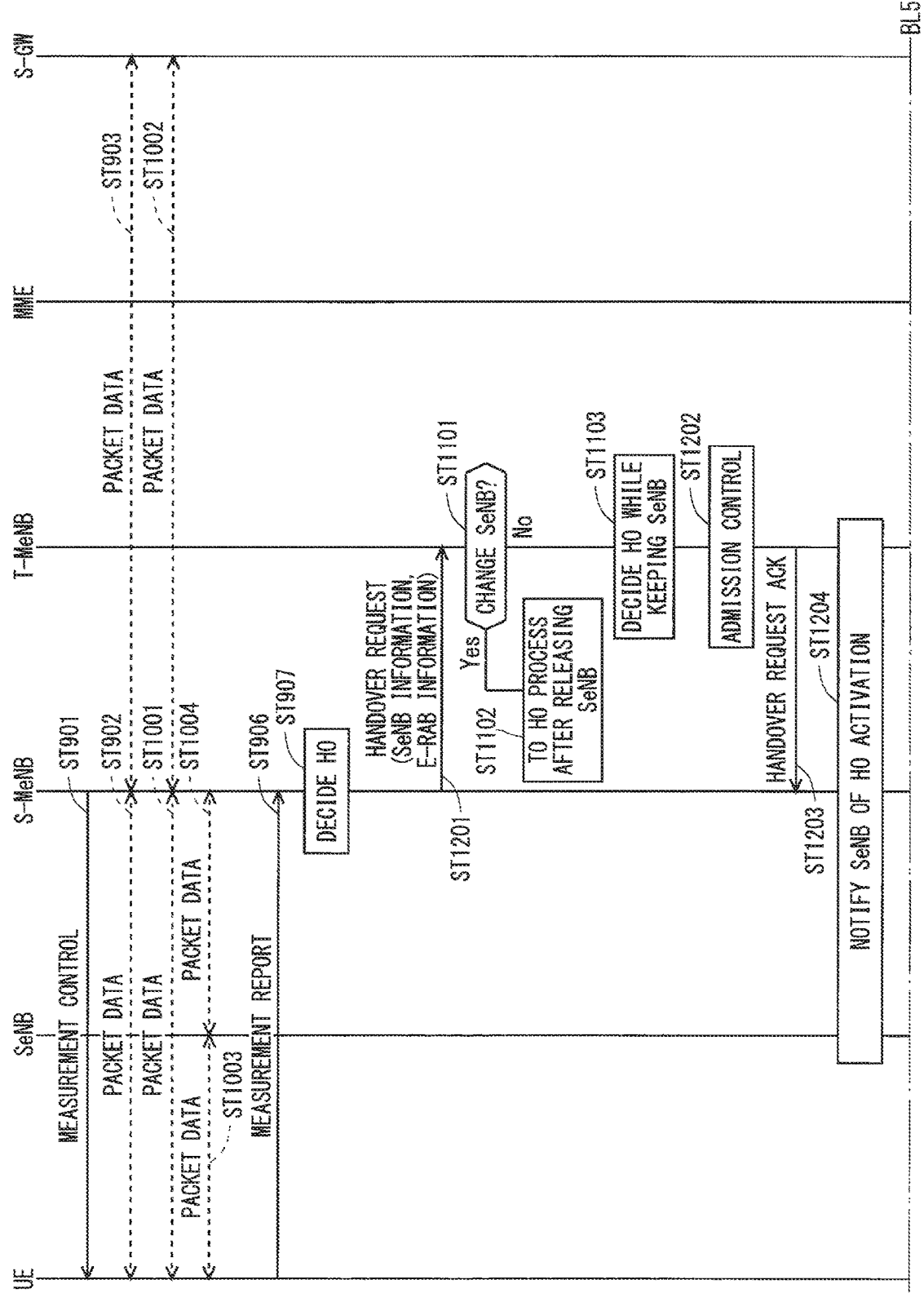
FIG. 23 shows an example sequence of a handover-related process in a communication system of a fourth embodiment of the present invention.
Figure 24:
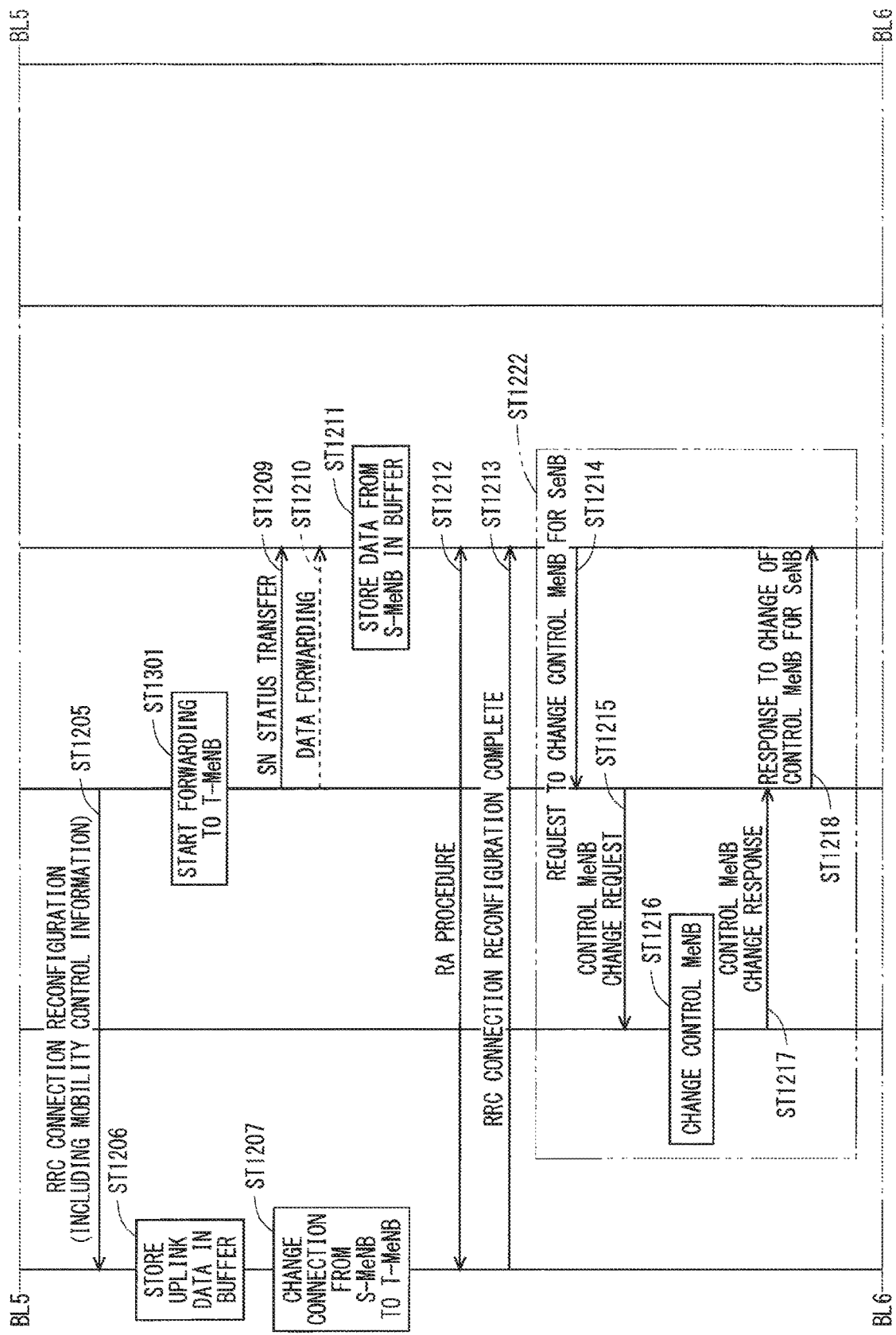
FIG. 24 shows the example sequence of the handover-related process in the communication system of the fourth embodiment of the present invention.
Figure 25:
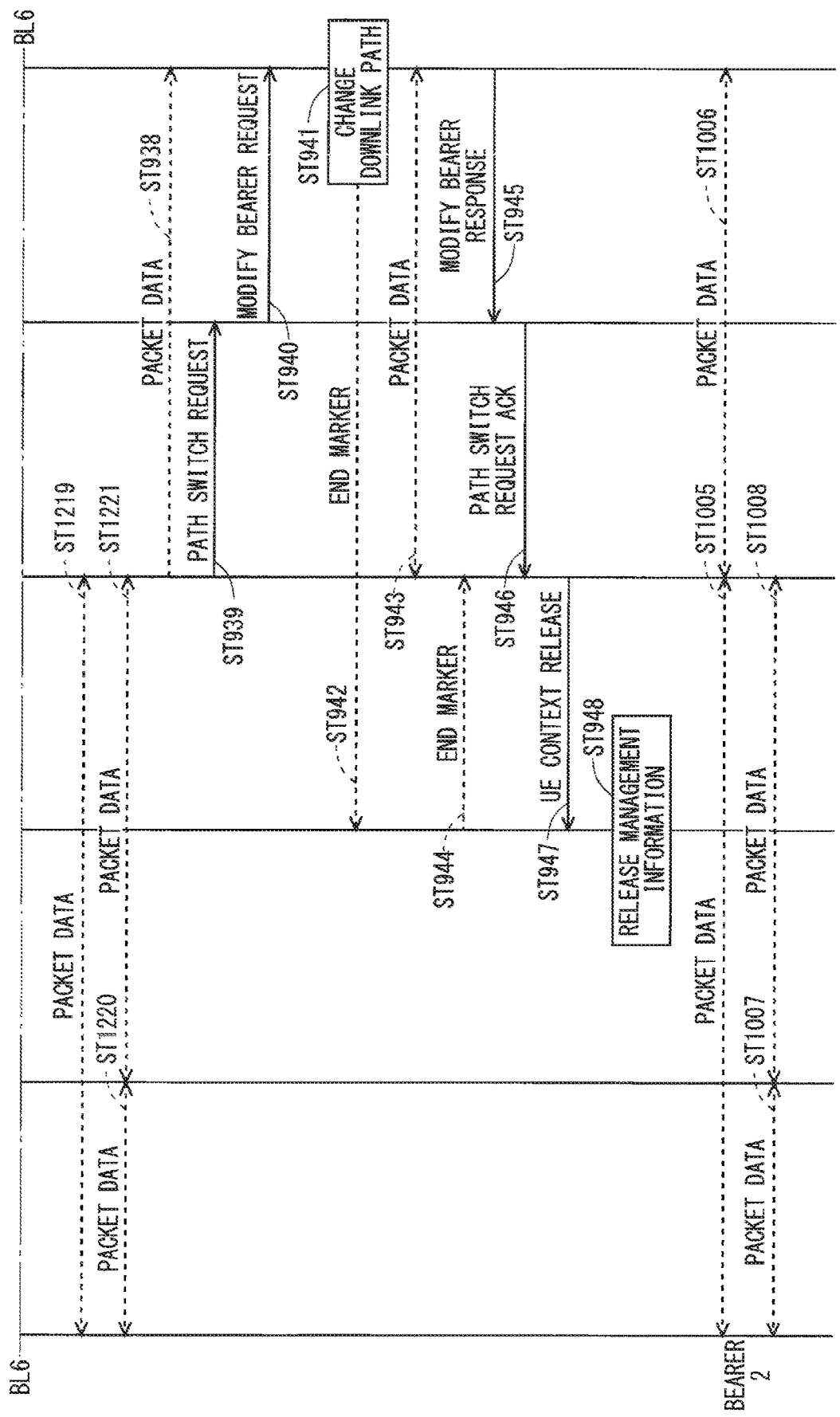
FIG. 25 shows the example sequence of the handover-related process in the communication system of the fourth embodiment of the present invention.

FIGS. 23 to 25 show an example sequence of a handover-related process in a communication system of a fourth embodiment of the present invention. FIG. 23 is continuous with FIG. 24 at a boundary BL5. FIG. 24 is continuous with FIG. 25 at a boundary BL6. The handover-related process of this embodiment is similar to the handover-related processes of the first embodiment shown in FIGS. 10 to 13, the second embodiment shown in FIGS. 17 to 19, and the third embodiment shown in FIGS. 20 to 22 described above, and thus, the same steps will be denoted by the same step numbers, and description thereof will be omitted.

In this embodiment, the method of handling downlink data differs from that of the third embodiment. This embodiment will disclose the method of handling downlink data to be notified to the UE by the MeNB via the SeNB.

In this embodiment, the S-MeNB that has received a handover request Ack message in step ST1203 stops transmitting new downlink data and stores the data in the buffer. The downlink data may be all pieces of downlink data transmitted to the UE that is caused to perform HO. The S-MeNB may stop the transmission after the division into downlink data to be transmitted through the direct path to the UE and downlink data to be transmitted through the path to the UE via the SeNB, store the pieces of downlink data in the buffer, and continue transmitting the downlink data to be transmitted through the path to the UE via the SeNB without a stop. As the process for downlink data by the S-MeNB, PDCP SNs may be numbered.

The S-MeNB forwards, to the T-MeNB, the downlink data that has not been delivered and the following pieces of downlink data among the pieces of downlink data transmitted and received to and from the UE before receiving the handover request Ack message, or, before stopping data transmission. The S-MeNB may forward, to the T-MeNB, the pieces of downlink data that have not been delivered starting from the data with the smallest PDCP SN. The S-MeNB may forward, to the T-MeNB, the pieces of downlink data transmitted from the S-MeNB through the direct path to the UE starting from the data with the smallest PDCP SN.

The S-MeNB starts forwarding to the T-MeNB in step ST1301, performs SN status transfer in step ST1209, and performs data forwarding in step ST1210. The forwarding is managed in accordance with PDCP SNs, and forwarding is performed up to the end marker from the S-GW notified in steps ST942 and ST944.

The following steps are executed as in the third embodiment. Specifically, in step ST1211, the T-MeNB stores the data forwarded from the S-MeNB in the buffer.

This prevents an occurrence of downlink data loss during the HO process even when the UE has performed dual connectivity using the SeNB.

In this embodiment, the T-MeNB stores downlink data in the buffer until a direct RRC connection reconfiguration with the UE completes and until the process of changing the MeNB by the SeNB completes. The T-MeNB may store pieces of downlink data in the buffer after the separation into downlink data through the direct path with the UE and downlink data through the path via the SeNB by bearer split. Pieces of downlink data can be managed in accordance with PDCP SNs numbered. The UE can reorder the pieces of downlink data in accordance with PDCP SNs.

In the method of storing downlink data in the buffer before separation, in the case where the bearer split configuration using the SeNB is to be changed, after a new bearer split configuration is configured for both of the paths, scheduling for data separation suitable for the bearer split configuration is enabled. Thus, scheduling efficient for the UE during dual connectivity can be performed.

In the method of storing downlink data in the buffer after the separation, when both paths become available, downlink data can be immediately transmitted to the UE using both of the paths. In other words, an increase in delay amount can be prevented.

The following steps are executed as in the third embodiment. Upon completion of the direct connection with the UE and upon completion of the process of changing a MeNB by the SeNB completes, the T-MeNB performs split scheduling of pieces of downlink data to each path, and uses each path to transmit the downlink data to the UE.

Another method will be disclosed. The T-MeNB starts a downlink data transmission to the UE upon completion of the direct connection with the UE or upon completion of the notification of a change of the MeNB with the SeNB, whichever comes earlier.

Thus, downlink data can be transmitted to the UE as early as possible.

Fifth Embodiment

Figure 26:
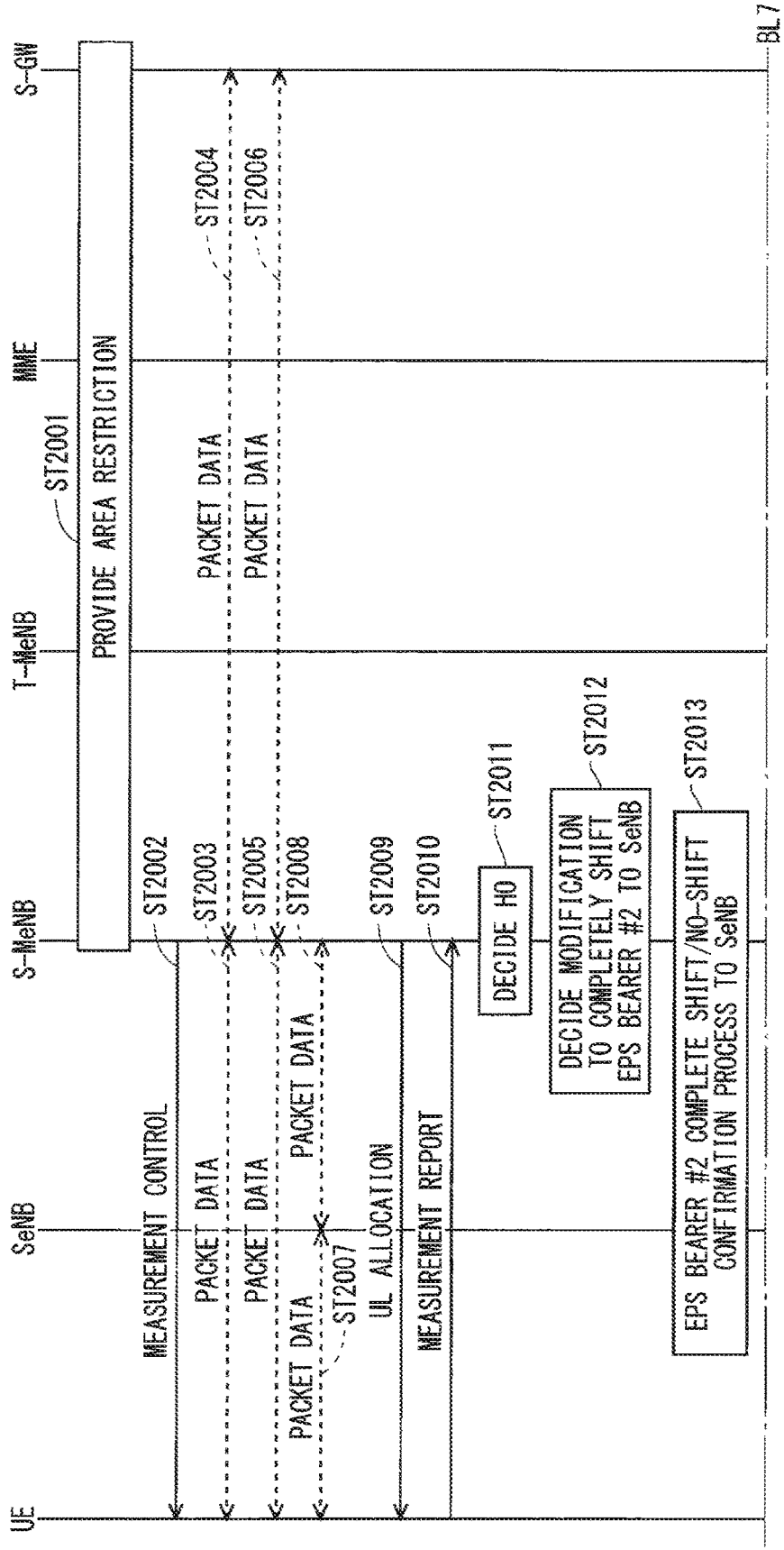
FIG. 26 shows an example sequence of a handover-related process in a communication system of a fifth embodiment of the present invention.
Figure 27:
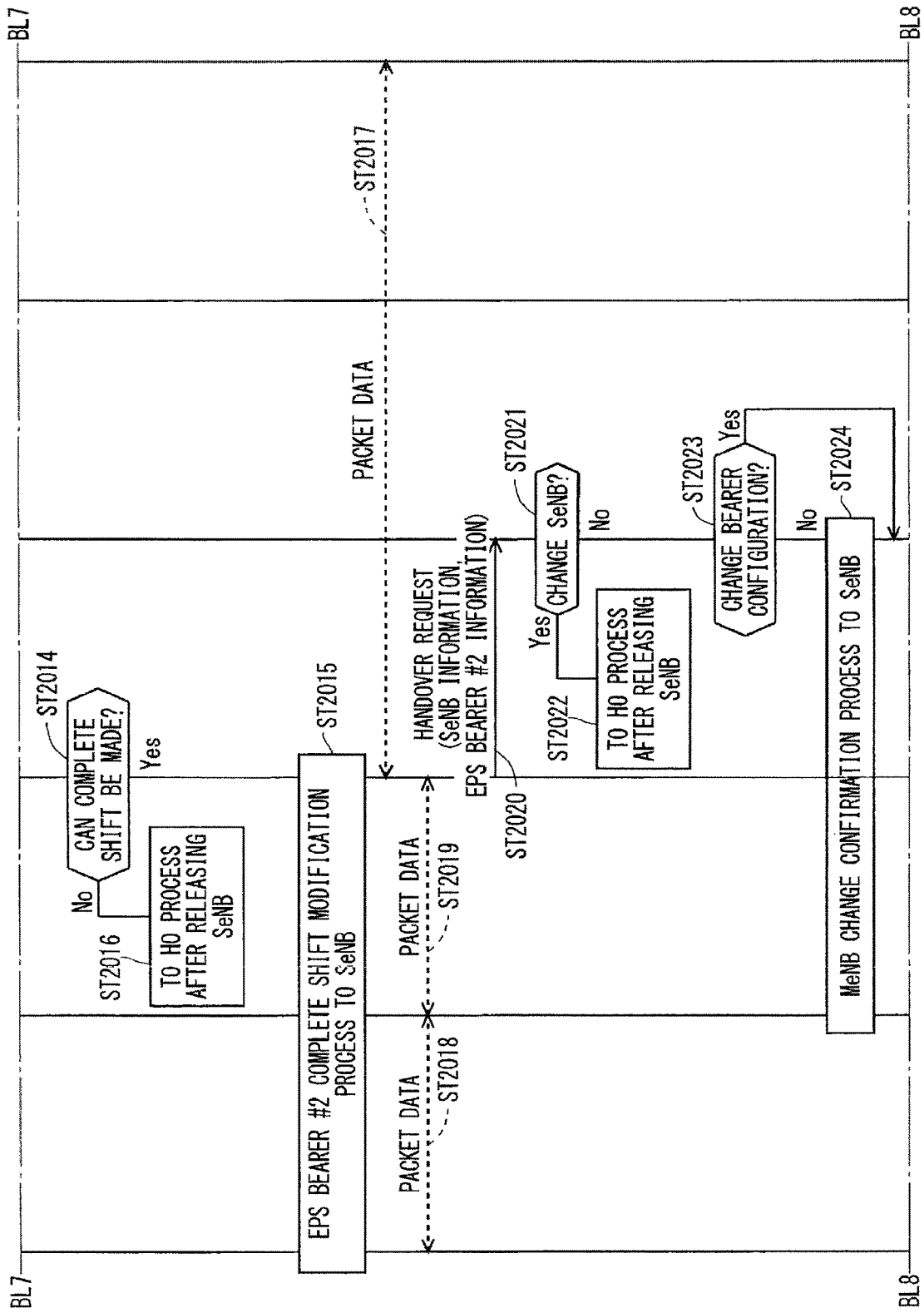
FIG. 27 shows the example sequence of the handover-related process in the communication system of the fifth embodiment of the present invention.
Figure 28:
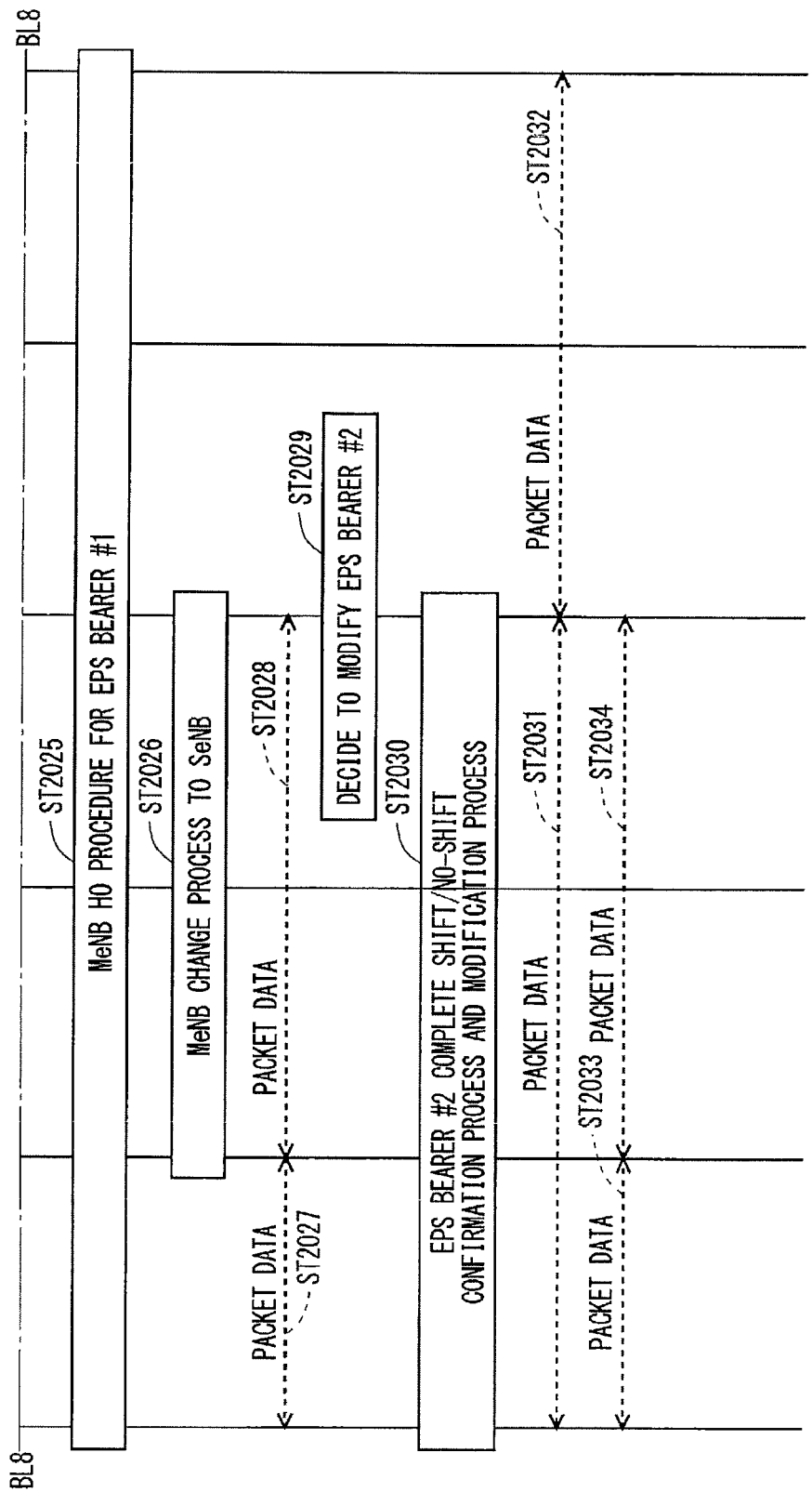
FIG. 28 shows the example sequence of the handover-related process in the communication system of the fifth embodiment of the present invention.

FIGS. 26 to 28 show an example sequence of a handover-related process in a communication system of a fifth embodiment of the present invention. FIG. 26 is continuous with FIG. 27 at a boundary BL7. FIG. 27 is continuous with FIG. 28 at a boundary BL8.

In this embodiment, before handover from the S-MeNB to the T-MeNB is performed, both of the SeNB and the S-MeNB transmit and receive data to and from the UE using a bearer 2 (hereinafter also referred to as an "EPS bearer #2") as a bearer corresponding to EPS (hereinafter also referred to as an "EPS bearer"). During the handover process, only the SeNB transmits and receives data to and from the UE. After the handover process, both of the SeNB and the T-MeNB transmit and receive data to and from the UE.

A UE that transmits and receives data to and from both of the SeNB and the S-MeNB using the EPS bearer #2 will be described as an example. When the UE performs handover from the S-MeNB to the T-MeNB, immediately before handover, the EPS bearer #2 is shifted completely to route only via the RLC/MAC/PHY of the SeNB without via the RLC/MAC of the S-MeNB. Alternatively, the EPS bearer #2 is shifted completely to route only via the RLC/MAC/PHY of the SeNB without via the S-MeNB at layers lower than the S-GW, which include GTPu/PDCP. Alternatively, in place of being shifted completely so as to route only via the RLC/MAC/PHY of the SeNB, the EPS bearers #2 is shifted completely so as to route via all of the GTPu/PDCP/RLC/MAC/PHY of the SeNB. In the description below, that the bearer is shifted completely so as to route via the SeNB may be referred to as that "the bearer is shifted completely to the SeNB".

In step ST2001 of FIG. 26, the S-MeNB, the T-MeNB, the MME, and the S-GW provide an area restriction (area restriction provided).

Step ST2002 to the HO decision of step ST2011 are performed as in the fourth embodiment described above. Specifically, in step ST2002, the S-MeNB notifies the UE of a measurement control message. Measurement of a neighbor SeNB may be configured in the measurement control message. Measurement of a frequency for SeNB may be configured. Or, as a measurement configuration, an event for SeNB or an event at a frequency for SeNB, or event criteria may be configured separately from that for the MeNB.

Examples of the configuration parameter include a SeNB identifier, a frequency, an event number for report, a threshold for reception quality, and a measurement period. Examples of the reception quality include reference signal received power (RSRP) and reference signal received quality (RSRQ).

The UE that has received the measurement control message in step ST2002 measures neighbor cells, that is, the MeNB and the SeNB.

In step ST2003, packet data is communicated between the UE and the S-MeNB. In step ST2004, packet data is communicated between the S-MeNB and the S-GW.

When the EPS bearer #2 is subjected to bearer split, packet data is directly communicated between the UE and the S-MeNB in step ST2005, and packet data is directly communicated between the S-MeNB and the S-GW in step ST2006.

In steps ST2007 and ST2008, packet data is communicated between the UE and the S-MeNB via the SeNB. Specifically, packet data is communicated between the UE and the SeNB in step ST2007, and packet data is communicated between the SeNB and the S-MeNB in step ST2008.

In step ST2009, the S-MeNB notifies the UE of UL allocation information. In step ST2010, the UE notifies the S-MeNB of a measurement report message.

In step ST2011, the S-MeNB that has received the measurement report message in step ST2010 uses the result of the measurement report to decide whether to cause the UE to perform handover (HO) to the T-MeNB. In the example shown in FIG. 26, in step ST2011, the S-MeNB decides to cause the UE to perform HO to the T-MeNB.

When deciding to cause the UE to perform HO to the T-MeNB in step ST2011, the S-MeNB moves to step ST2012. In step ST2012, the S-MeNB decides whether to perform a modification to completely shift the EPS bearer #2 to the SeNB (hereinafter also referred to as a "modification to completely shift the EPS bearer #2 to the SeNB"). In the example shown in FIG. 26, the S-MeNB decides to perform a modification to completely shift the EPS bearer #2 to the SeNB.

In step ST2013, the S-MeNB performs an EPS bearer #2 complete shift/no-shift confirmation process to the SeNB. Here, the EPS bearer #2 complete shift/no-shift confirmation process to the SeNB refers to the process of confirming with the SeNB about whether the EPS bearer #2 can be shifted completely to the SeNB, that is, whether a complete shift of the EPS bearer #2 to the SeNB can be made. Specifically, as the EPS bearer #2 complete shift/no-shift confirmation process, the S-MeNB notifies the SeNB of a complete shift/no-shift confirmation signal by which whether the EPS bearer #2 can be shifted completely to the SeNB is confirmed. The SeNB that has received the complete shift/no-shift confirmation signal notifies the S-MeNB of whether the EPS bearer #2 can be shifted completely to the SeNB.

In step ST2014, the S-MeNB determines whether a complete shift to the SeNB can be made based on whether a complete shift can be made, which has been notified from the SeNB. The S-MeNB moves to step ST2015 if judging that a complete shift to the SeNB can be made or moves to step ST2016 if judging that a complete shift to the SeNB cannot be made.

In step ST2015, the UE, the SeNB, and the S-MeNB perform a process of modifying a complete shift of the EPS bearer #2 to the S-MeNB. Specifically, in step ST2015, the process of completely shifting the EPS bearer #2 to the SeNB is performed.

In step ST2016, the S-MeNB releases the SeNB and then executes the HO process as in step ST1102 of FIG. 17. In another embodiment of the present invention, if judging that a complete shift to the SeNB cannot be made and moving to step ST2016, the S-MeNB may execute the HO process without releasing the SeNB.

In step ST2017, packet data is communicated between the S-MeNB and the S-GW. In step ST2018, packet data is communicated between the UE and the SeNB. In step ST2019, packet data is communicated between the SeNB and the S-MeNB.

In step ST2020, the S-MeNB notifies the T-MeNB that is a HO destination of a handover request message. The HO request message includes the SeNB information and the information about the EPS bearer #2 (hereinafter, also referred to as "EPS bearer #2 information"). The SeNB information and the EPS bearer #2 information may be notified in a message different from the HO request message.

In step ST2021, the T-MeNB determines whether the SeNB needs to be changed. The T-MeNB moves to step ST2022 if judging that the SeNB needs to be changed or moves to step ST2023 if judging that the SeNB needs not to be changed.

In step ST2022, the T-MeNB releases the SeNB and then executes the handover (HO) process as in step ST1102 of FIG. 17.

In step ST2023, the T-MeNB determines whether the bearer configuration needs to be changed. The T-MeNB moves to step ST2025 of FIG. 28 if judging that the bearer configuration needs to be changed or moves to step ST2024 if judging that the bearer configuration needs not to be changed.

In step ST2024, the SeNB and the T-MeNB perform a MeNB change confirmation process to the SeNB. Here, the MeNB change confirmation process refers to the process of confirming whether to change a MeNB from the S-MeNB to the T-MeNB. Specifically, as the MeNB change confirmation process, the T-MeNB notifies the SeNB of a MeNB change confirmation signal by which whether to change a MeNB from the S-MeNB to the T-MeNB is confirmed. The SeNB that has received the MeNB change confirmation signal notifies the T-MeNB of whether to change a MeNB. The S-MeNB is not involved in the process of step ST2024.

In step ST2025 of FIG. 28, the UE, the SeNB, the S-MeNB, the T-MeNB, the MME, and the S-GW perform a MeNB HO process for EPS bearer #1. Also with the NAS signaling via the SeNB, the MeNB HO process for EPS bearer #1 of step ST2025 is followed. The MeNB HO process for EPS bearer #1 will be described below in detail.

In step ST2026, the SeNB, the S-MeNB, and the T-MeNB perform a MeNB change process to the SeNB. This is the process of notifying that the control plane (C-plane) for the SeNB, for example, the macro eNB (MeNB) that is to perform signaling has been changed after the completion of the handover of the MeNB. This process is a process necessary for notifying that the MeNB of the EPS bearer #2 has been changed to the T-MeNB for data transmission and reception between the T-MeNB and the SeNB. Specifically, in step ST2026, the S-MeNB notifies the SeNB of a signal indicating that the MeNB has been changed to the T-MeNB.

In step ST2027, packet data is communicated between the UE and the SeNB. In step ST2028, packet data may be communicated between the SeNB and the T-MeNB.

In step ST2029, the T-MeNB determines whether to modify the EPS bearer #2 for a complete shift of the EPS bearer #2 to the SeNB. In the example shown in FIG. 28, the T-MeNB decides to modify the EPS bearer #2 for a complete shift of the EPS bearer #2 to the SeNB.

As a result, the EPS bearer #2 is changed for transmission and reception to and from only the SeNB not to be subjected to handover during the MeNB handover process, and thus, is unaffected by the handover. The handover process can thus be simplified, reducing handover failures. This also reduces dropped data.

In step ST2030, the UE, the SeNB, and the T-MeNB perform an EPS bearer #2 complete shift/no-shift confirmation process to the SeNB and a modification process to completely shift the EPS bearer #2 to the SeNB. The S-MeNB is not involved in the process of step ST2030.

In step ST2031, packet data is communicated between the UE and the T-MeNB. In step ST2032, packet data is communicated between the T-MeNB and the S-GW.

In step ST2033, packet data is communicated between the UE and the SeNB. In step ST2034, packet data is communicated between the SeNB and the T-MeNB.

Figure 29:
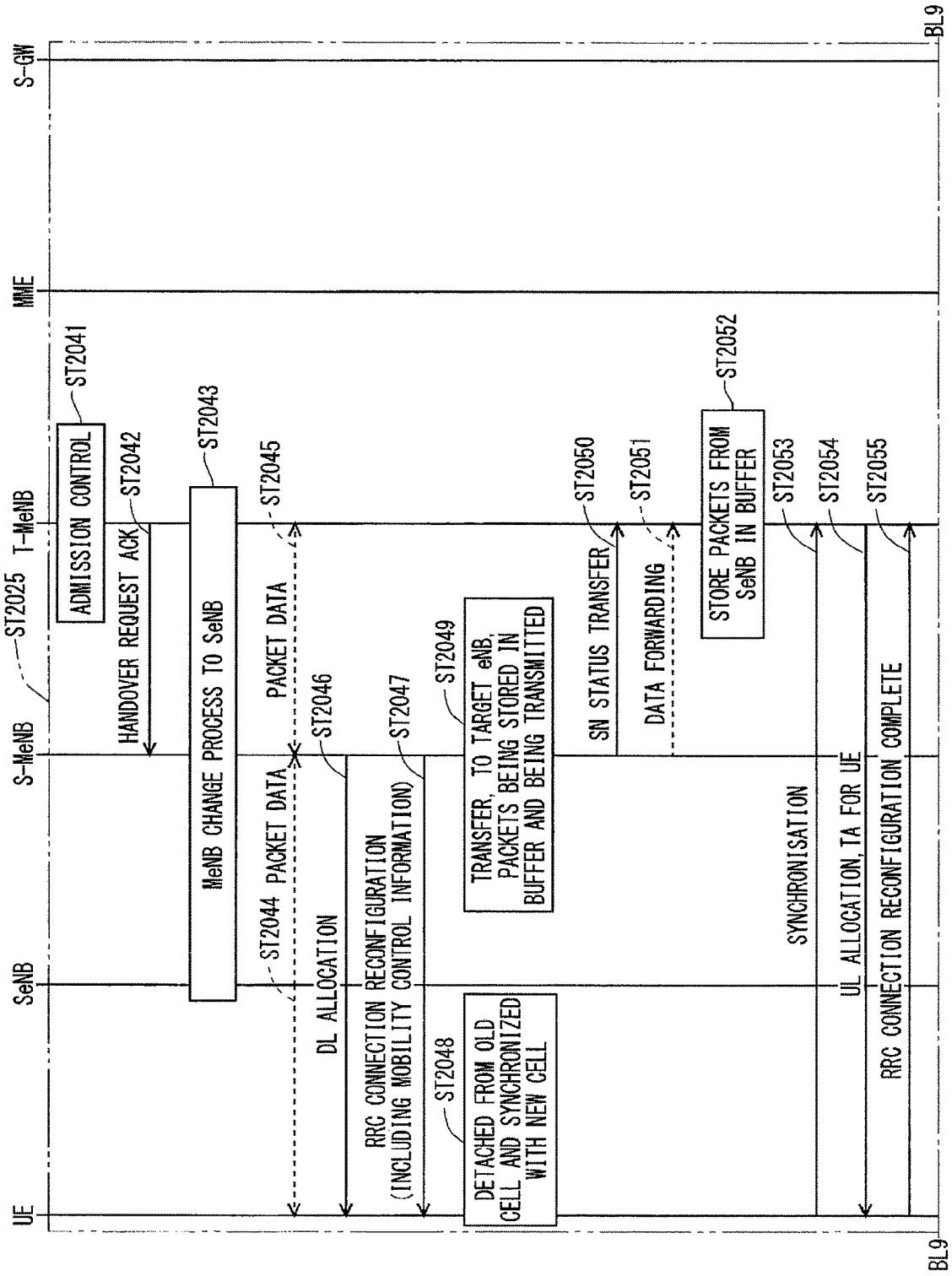
FIG. 29 shows an example sequence of a MeNB HO process for EPS bearer #1 in step ST2025 of FIG. 28.
Figure 30:
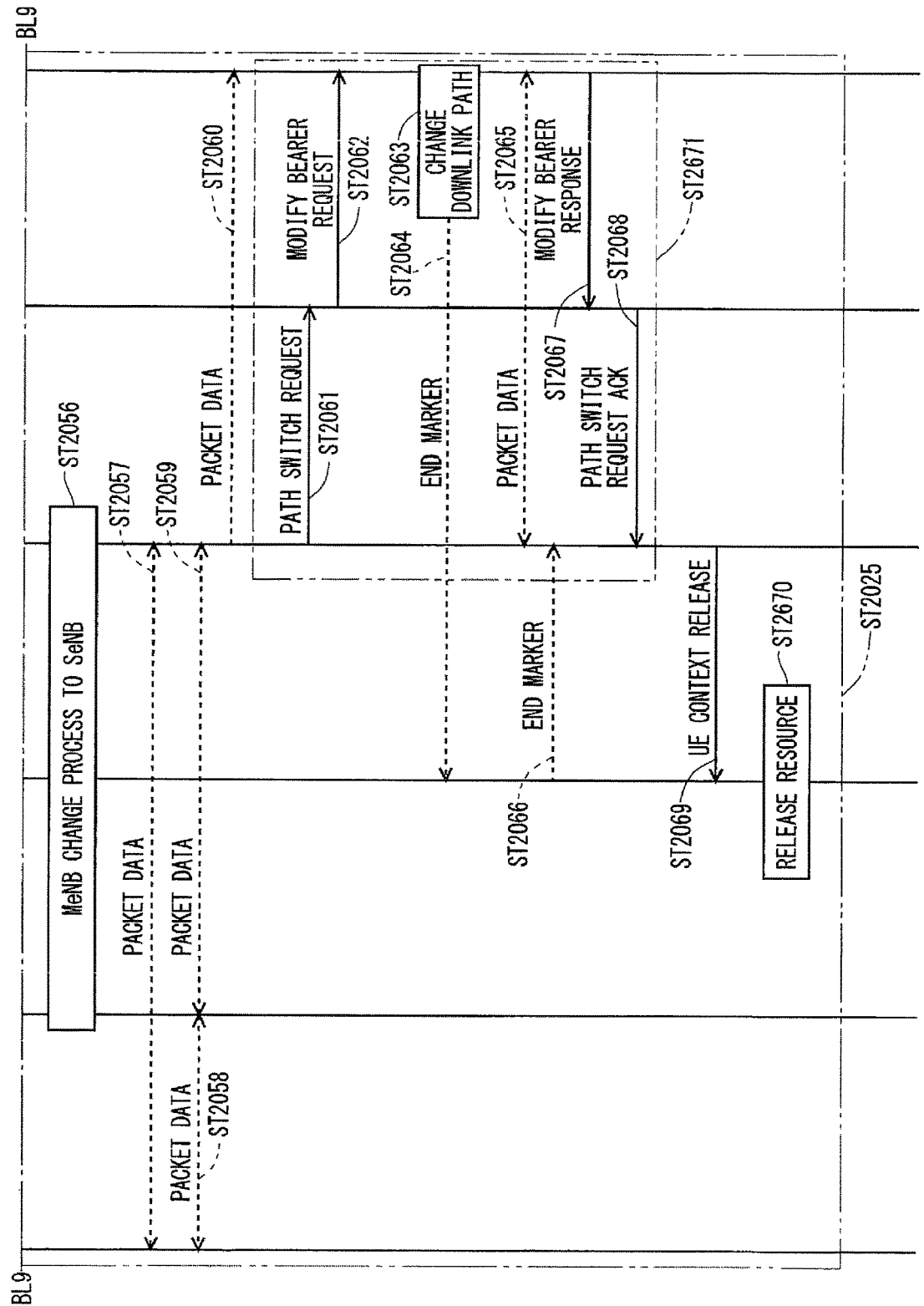
FIG. 30 shows the example sequence of the MeNB HO process for EPS bearer #1 in step ST2025 of FIG. 28.

FIGS. 29 and 30 show an example sequence of the MeNB HO process for EPS bearer #1 in step ST2025 of FIG. 28.

In step ST2041, the T-MeNB performs admission control to confirm accommodation capacity as in step ST930 of FIG. 12 described above. When judging that it can accept HO based on the result of the admission control, in step ST2042, the T-MeNB notifies the S-MeNB of a handover request Ack message as in step ST931.

In response to the handover request Ack message of step ST2042, in step ST2043, the SeNB, the S-MeNB, and the T-MeNB perform a MeNB change process to the SeNB. Here, the MeNB change process is a process of notifying that the control plane (C-plane) for the SeNB, for example, the macro eNB (MeNB) that performs signaling has been changed in the data flows from the T-MeNB to the S-MeNB and further from the S-MeNB to the SeNB, or in the data flows from the T-MeNB to the S-MeNB and from the T-MeNB to the SeNB. Specifically, the S-MeNB notifies the SeNB of a signal indicating that the MeNB has been changed to the T-MeNB. That the MeNB has been changed may be notified in a handover request Ack message of step ST2042.

In step ST2044, packet data is communicated between the UE and the S-MeNB. In step ST2045, packet data is communicated between the S-MeNB and the T-MeNB.

In step ST2046, the S-MeNB notifies the UE of DL allocation information. In step ST2047, the S-MeNB notifies the UE of an RRC connection reconfiguration message including mobility control information. In step ST2047, the S-MeNB may notify that there are no changes in the SeNB and the EPS bearer #2.

The processes from steps ST2048 to ST2055 are similar to those of 3GPP TS36.300. Specifically, in step ST2048, the UE detaches itself from the S-MeNB that is an old cell and starts synchronization with the T-MeNB that is a new cell.

In step ST2049, the S-MeNB transfers, to the T-MeNB that is a target eNB, the packet being stored in the buffer and the packet being transmitted.

In step ST2050, the S-MeNB performs SN status transfer to transfer the status of the sequence number (SN) of the PDCP to the T-MeNB, as in step ST912 of FIG. 11. In step ST2051, the S-MeNB may perform data forwarding to forward yet-to-be-transmitted data to the T-MeNB.

In step ST2052, the T-MeNB stores the packets transferred from the S-MeNB in the buffer.

In step ST2053, the UE is synchronized with the T-MeNB. In step ST2054, the T-MeNB notifies the UE of UL allocation information and a tracking area (TA) for the UE. In step ST2055, the UE notifies the T-MeNB of an RRC connection reconfiguration complete message.

In step ST2056 of FIG. 30, the SeNB, the S-MeNB, and the T-MeNB perform the process of changing a MeNB to the SeNB as in step ST2026 of FIG. 28. This is the process of notifying that the control plane (C-plane) for the SeNB, for example, macro eNB (MeNB) that performs signaling has been changed.

In step ST2057, packet data may be communicated between the UE and the T-MeNB. In step ST2058, packet data is communicated between the UE and the SeNB. In step ST2059, packet data may be communicated between the SeNB and the T-MeNB. In step ST2060, the T-MeNB may transfer packet data to the S-GW.

In step ST2671, the T-MeNB, the MME, and the S-GW perform a path switch request to request a change of both of the paths of the EPS bearer #1 and the EPS bearer #2 from the S-MeNB to the T-MeNB.

Specifically, in step ST2061, the T-MeNB notifies the MME of a path switch request message. In step ST2062, the MME that has been notified of the path switch request message notifies the S-GW of a modify bearer request message.

In step ST2063, the S-GW that has been notified of the modify bearer request message changes a downlink path. In step ST2064, the S-GW may provide an end marker to the PDCP to be transmitted to the S-MeNB, thereby informing about the end of the forwarding process. In step ST2066, the S-MeNB may provide an end marker and forward it to the T-MeNB. In step ST2065, packet data may be communicated between the T-MeNB and the S-GW.

In step ST2067, the S-GW notifies the MME of a modify bearer response message. In step ST2068, the MME that has been notified of the modify bearer response message notifies the T-MeNB of a path switch request Ack message indicating the completion of path switch. The process of step ST2671 completes in this way.

In step ST2069, the T-MeNB notifies the S-MeNB of a UE context release message. In step ST2670, the S-MeNB that has been notified of the UE context release message releases the resource allocated to the UE. After the resource release process of step ST2670, the MeNB change process to the SeNB in step ST2026 of FIG. 28 is performed.

As described above, in the process of step ST2029 of FIG. 28, only the SeNB is configured to transmit and receive data to and from the UE using the EPS bearer #2 during handover. How to perform the process of step ST2029 will be described with reference to FIG. 31.

FIG. 31 shows an example status of the data transmission and reception to and from the UE. An S-GW 601 includes a PDCP processing eNB switch unit 602. An S-MeNB 603 includes a first PDCP processing unit 604, an RLC processing unit 605, a MAC processing unit 606, a PHY processing unit 607, and a second PDCP processing unit 608. A SeNB 609 includes a PDCP processing unit 610, a PDCP path switch unit 611, an RLC processing unit 612, a MAC processing unit 613, and a PHY processing unit 614.

Before handover switching, a UE 615 transmits and receives data to and from both of the S-MeNB 603 and the SeNB 609 using the EPS bearer #2. For example, for downlink, the S-GW 601 provides data to the first PDCP processing unit 604 and the second PDCP processing unit 608 of the S-MeNB 603. The first and second PDCP processing units (hereinafter, collectively referred to as "PDCP processing units" as well) 604 and 608 perform the PDCP process in LTE or LTE-A.

The data provided to the second PDCP processing unit 608 is provided to the PDCP path switch unit 611 of the SeNB 609. The PDCP path switch unit 611 switches the path of the PDCP. The PDCP path switch unit 611 is not during handover, and thus, determines to provide the PDCP from the second PDCP processing unit 608 to the RLC processing unit 612 and provides the data from the second PDCP processing unit 608 to the RLC processing unit 612. The RLC processing unit 612 performs the RLC process in LTE or LTE-A.

The data provided to the RLC processing unit 612 is then sequentially provided to the MAC processing unit 613 and the PHY processing unit 614, and is subsequently provided to the UE 615 through radio transmission. The MAC processing unit 613 performs the MAC process in LTE or LTE-A. The PHY processing unit 614 performs the PHY process in LTE or LTE-A.

When only handover of the MeNB is performed with the data transmission and reception in SeNB 609 unchanged as in this embodiment, data transmission and reception using the EPS bearer #2 are not performed between the UE 615 and the S-MeNB 603 during handover.

When shifting completely to the SeNB 609 including the PDCP, the S-GW 601 causes the PDCP processing eNB switch unit 602 to switch an eNB that processes the PDCP. The PDCP processing eNB switch unit 602 transmits data using the EPS bearer #2 not to the second PDCP processing unit 608 of the S-MeNB 603 but to the PDCP processing unit 610 of the SeNB 609. The PDCP processing unit 610 performs the PDCP process in LTE or LTE-A.

The SeNB 609 that has received the data from the S-GW 601 performs the PDCP process on the received data by the PDCP processing unit 610, and provides the data after the process to the PDCP path switch unit 611. The SeNB 609 selects not the PDCP data from the second PDCP processing unit 608 of the S-MeNB 603 but the PDCP data from the PDCP processing unit 610 of its own device by the PDCP path switch unit 611, and then provides the selected data to the RLC processing unit 612.

The PDCP data provided to the RLC processing unit 612 is then provided to and processed by the MAC processing unit 613 and the PHY processing unit 614 in the stated order, and is eventually transmitted to the UE 615 through radio transmission.

The provision of the PDCP processing eNB switch unit 602 and the PDCP path switch unit 611 enables a process of transmitting data by only the SeNB that is not to be subjected to handover during handover of the MeNB.

The process flow in uplink is as in downlink. Also in uplink, as in downlink, the provision of the PDCP processing eNB switch unit 602 and the PDCP path switch unit 611 enables a process of transmitting data only by the SeNB that is not to be subjected to handover during handover of the MeNB.

The process, performed when the SeNB and the T-MeNB perform data transmission and reception using the EPS bearer #2 after the handover process in step ST2025 of FIG. 28, is executed as follows. During handover, the SeNB changes its connection from the S-MeNB to the T-MeNB. After that, the T-MeNB changes the path for transmitting and receiving data only to and from the SeNB to the paths for transmitting and receiving data to and from the SeNB and the T-MeNB. In a conceivable alternative method, connection is performed through the path for transmitting and receiving data of both of the SeNB and the T-MeNB during handover.

On that occasion, a radio resource configuration is conceivably changed in two ways: (A) by configuring the configuration of a split bearer from the T-MeNB, and (B) by changing a switch of a data transmission and reception path.

The following four, (A-1) to (A-4), will be disclosed as specific examples of the way in which a radio resource configuration is changed (A) by configuring the configuration of a split bearer from the T-MeNB.

(A-1) The information that needs to be notified to the T-MeNB by the S-MeNB is the SeNB identification information, specifically, the information about an address of the SeNB. This is because at the time the data subjected to the PDCP process is transmitted to the SeNB, the SeNB identification information is necessary. In the absence of the SeNB identification information, the T-MeNB does not know to which SeNB it should transmit data, and from which SeNB it should receive data. Additionally, the T-MeNB needs to know parameter information indicating in accordance with which RRC connection parameter the SeNB operates, and thus, this information is also notified.

(A-2) The information that needs to be notified to the S-MeNB by the T-MeNB is the information indicating whether handover of a MeNB has succeeded or failed. When the data stays in the buffer of the S-MeNB, the information indicating a command to perform data forwarding is also the information that needs to be notified to the S-MeNB by the T-MeNB.

(A-3) The information that needs to be notified to the UE is a notification indicating that the MeNB has been switched by handover from the S-MeNB to the T-MeNB. In this case, the UE transmits and receives data not to and from the S-MeNB but to and from the T-MeNB.

(A-4) In the configuration of the split bearer, the SeNB transmits and receives data to and from the S-GW via the PDCP processing unit of the S-MeNB or the T-MeNB. The information that needs to be notified to the SeNB is the information indicating the PDCP processing unit of the MeNB, that is, the S-MeNB or the T-MeNB, via which the SeNB is routed.

The following four, (B-1) to (B-4), will be disclosed as specific examples of the way in which a radio resource configuration is changed (B) by changing a switch of a data transmission and reception path.

(B-1) The information that needs to be notified to the T-MeNB by the S-MeNB is the SeNB identification information. This is because if the S-MeNB does not know with which SeNB it has performed simultaneous communication before handover, it does not know with which SeNB it should perform simultaneous communication after handover. Additionally, the T-MeNB needs to know parameter information indicating in accordance with which RRC connection parameter the SeNB operates, and thus, the T-MeNB is also notified of that information. Assumed in the specific example (B-1) is a case where the SeNB handles only data transmission and reception and the T-MeNB handles control information (signaling).

(B-2) The information that needs to be notified to the S-MeNB by the T-MeNB is, as in the specific example (A-2), the information indicating whether handover of the MeNB has succeeded or failed and the notification instructing to perform data forwarding when the data stays in the buffer of the S-MeNB.

(B-3) The information that needs to be notified to the UE is, as in the specific example (A-3), the notification indicating that the MeNB has been switched by handover from the S-MeNB to the T-MeNB. In this case, the UE transmits and receives data not to and from the S-MeNB but to and from the T-MeNB.

(B-4) The information that needs to be notified to the SeNB is the information indicating that the MeNB has been switched from the S-MeNB to the T-MeNB upon completion (success) of handover. This is because the SeNB depends on the MeNBs and thus needs to know a MeNB, on which the SeNB depends, transmitting and receiving a control signal to and from its own device, for example, signaling from among the MeNBs and to follow the control from the relevant MeNB.

In the sequence shown in FIGS. 26 to 30, a radio resource configuration is changed at three timings: (1) step ST2026, (2) step ST2056, and (3) step ST2043. Each of the timings (1) to (3) above will be specifically described below.

(1) At the timing of the MeNB change process to the SeNB in step ST2026, a radio resource configuration is changed after the timing of changing a downlink path in step ST2063. Thus, the MeNB has been switched to the T-MeNB and the resource of the S-MeNB has been released, thereby preventing an erroneous process by the resource before handover. Additionally, a radio resource configuration can be changed in a simple process, and the process can be enabled by a relatively small circuit.

(2) At the timing of the MeNB change process to the SeNB in step ST2056, a radio resource configuration is changed before the timing of changing a downlink path in step ST2063. This results in a contradiction in which, before the higher-layer entity is switched from the S-MeNB to the T-MeNB by handover, the radio communication with the UE has become the operation that should be performed after handover radio.

This leads to a complicated process compared with the case where a radio resource configuration is changed at the timing (1). However, thanks to an early switch timing, a risk that data transmission and reception are performed only by the SeNB, for example, a situation in which access is centered on the SeNB from a plurality of UEs and a congestion occurs can be accordingly avoided, enabling a stable operation.

(3) The timing of the MeNB change process to the SeNB in step ST2043 is immediately after the T-MeNB notifies of an Ack response to the handover request in step ST2042. At this timing, a radio resource configuration is changed at a timing earlier than the timing (2).

Although this results in, for example, a more complicated process performed when handover fails than in the case where a radio resource configuration is changed at the timing (2), the above-mentioned risk can be avoided more reliably, thus enabling a more stable operation.

It is only the uplink data that can be transmitted and received with the configuration of a radio resource at the timings (2) and (3). Downlink data is transmitted and received after the T-MeNB receives data from the S-GW.

Sixth Embodiment

Figure 33:
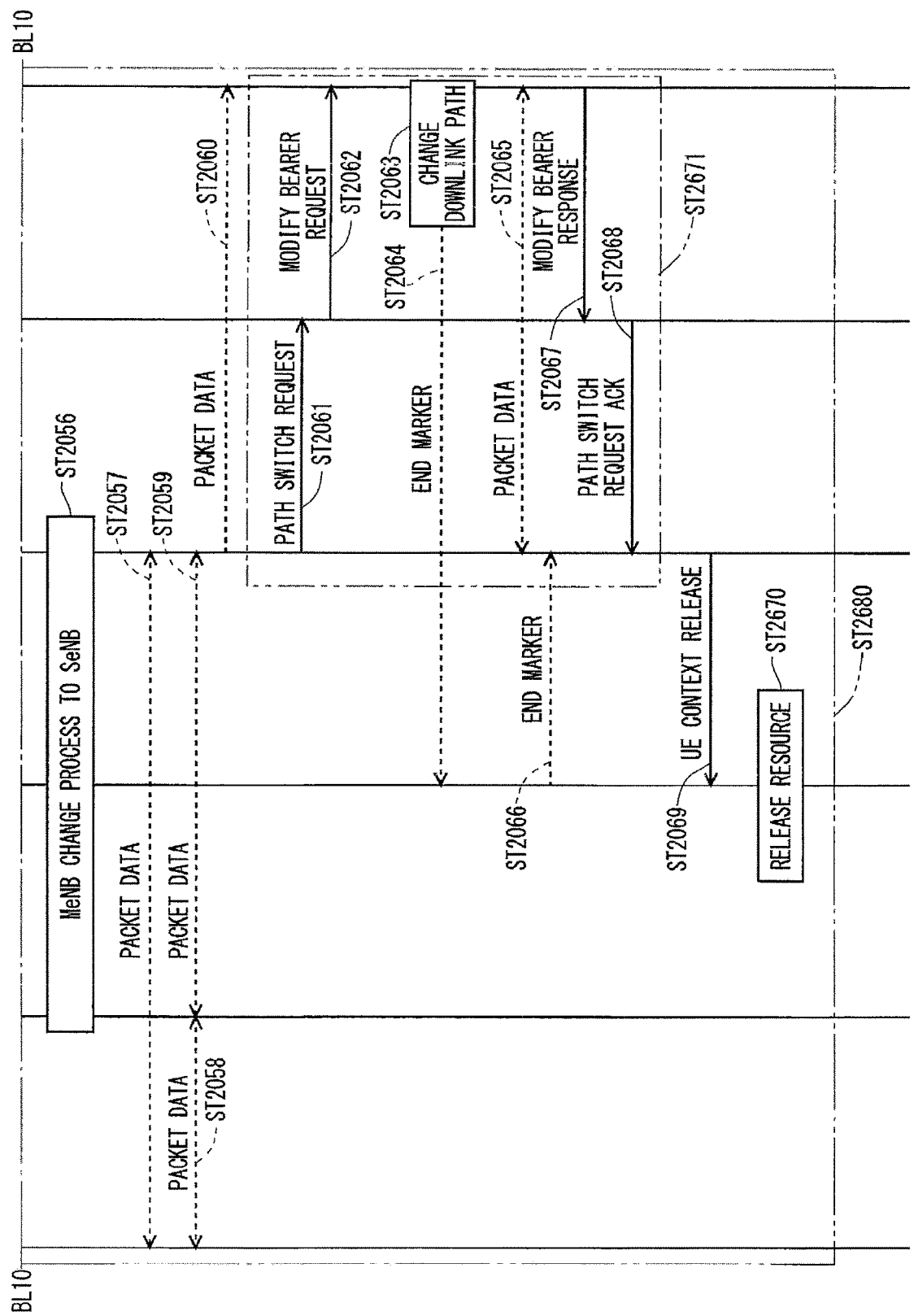
FIG. 33 shows the example sequence of the MeNB HO process for EPS bearer #1 in the communication system of the sixth embodiment of the present invention.

FIGS. 32 and 33 show an example sequence of a MeNB HO process for EPS bearer #1 in a communication system of a sixth embodiment of the present invention. FIG. 32 is continuous with FIG. 33 at a boundary BL10.

While the S-MeNB performs a reconfiguration in the fifth embodiment described above, the T-MeNB performs a reconfiguration in this embodiment. Specifically, in this embodiment, the processes similar to those of the fifth embodiment are performed except for that a MeNB HO process for EPS bearer #1 in step ST2680 shown in FIGS. 32 and 33 is performed in place of step ST2025 shown in FIGS. 29 and 30 in the sequence of the fifth embodiment shown in FIGS. 26 to 30 described above.

The process of step ST2680 shown in FIGS. 32 and 33 is similar to the MeNB HO process for EPS bearer #1 of step ST2025 shown in FIGS. 29 and 30, and thus, the same steps will be denoted by the same step numbers, and common description will be omitted.

The process of step ST2680 is similar to the process of step ST2025 of the fifth embodiment except for that in step ST2025 of the fifth embodiment shown in FIGS. 29 and 30, the processes of steps ST2681 and ST2682 are performed in place of steps ST2046 and ST2047 of FIG. 29.

In this embodiment, in step ST2681, the T-MeNB notifies the UE of DL allocation information. In step ST2682, the T-MeNB also notifies the UE of an RRC connection reconfiguration message. In this embodiment, the RRC connection reconfiguration message does not include mobility control information.

Although the S-MeNB notifies the UE of an RRC connection reconfiguration message in the fifth embodiment described above, the T-MeNB notifies the UE of an RRC connection reconfiguration message in this embodiment.

This allows not the S-MeNB being a handover source but the T-MeNB being a handover destination, which is to perform communication connection, to perform an optimal RRC connection configuration, thus stabilizing the communication between the UE and the MeNB.

Seventh Embodiment

FIGS. 34 and 35 show an example sequence of a MeNB HO process for EPS bearer #1 in a communication system of a seventh embodiment of the present invention. FIG. 34 is continuous with FIG. 35 at a boundary BL11.

In this embodiment, processes similar to those of the fifth embodiment are performed except for that a MeNB HO process for EPS bearer #1 of step ST2690 shown in FIGS. 34 and 35 is performed in place of step ST2025 shown in FIGS. 29 and 30 in the sequence of the fifth embodiment shown in FIGS. 26 to 30 described above.

The process of step ST2690 shown in FIGS. 34 and 35 is similar to the MeNB HO process for EPS bearer #1 of step ST2025 shown in FIGS. 29 and 30, and thus, the same steps will be denoted by the same step numbers, and common description will be omitted.

The process of step ST2690 is similar to the process of step ST2025 in the fifth embodiment except for that the process of step ST2691 is performed in addition to the process of step ST2025 of the fifth embodiment shown in FIGS. 29 and 30.

In this embodiment, before steps ST2046 and ST2047, in step ST2691, the T-MeNB notifies the S-MeNB of an RRC connection reconfiguration message and DL allocation information.

In this embodiment, as described above, the T-MeNB notifies the S-MeNB of the reconfiguration message, and then, the S-MeNB notifies the UE of the contents of the reconfiguration message. Consequently, the S-MeNB does not notify the UE of the reconfiguration message as in the sixth embodiment described above, but notifies the UE, via the S-MeNB, of the contents of a reconfiguration message notified by the T-MeNB.

As in the sixth embodiment, consequently, an optimal RRC connection configuration is performed not by the S-MeNB being a handover source but by the T-MeNB being a handover destination, which is to perform communication connection, thus stabilizing the communication between the UE and the MeNB.

The embodiments and the modifications thereof are also applicable to the case where a SeNB configures a plurality of serving cells. Similarly, they are also applicable to the case where a MeNB configures a plurality of serving cells. The cluster of serving cells configured by a SeNB may be referred to as a secondary cell group (SCG), and a cluster of serving cells may be referred to as a master cell group (MCG).

The embodiments and the modifications thereof are merely an illustration of the present invention and can be freely combined within the scope of the invention. Also, the elements of the embodiments and the modifications thereof can be appropriately modified or omitted.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

51 S-MeNB, 52 coverage of S-MeNB, 53 T-MeNB, 54 coverage of T-MeNB, 55 and 58 SeNB, 56 and 59 coverage of SeNB, 57 UE.

The invention claimed is:

1. A mobile communication system in which a master base station, that performs radio communication via a processing unit, and a secondary base station, that forwards data via a transmitter, concurrently perform radio communication with a user equipment,
   wherein when the master base station that performs radio communication with the user equipment is changed to a target base station, the secondary base station forwards data to the master base station, and the secondary base station is released from radio communication that the master base station and the secondary base station concurrently perform with the user equipment, and
   an end marker is provided to the data to be forwarded.

2. A master base station in a mobile communication system in which the master base station, that performs radio communication via a processing unit, and a secondary base station, that forwards data via a transmitter, concurrently perform radio communication with a user equipment, the master base station comprising:
   the processing unit, that is configured to
      when the master base station that performs radio communication with the user equipment is changed to a target base station, receive data forwarded from the secondary base station, and the secondary base station is released from radio communication that the master base station and the secondary base station concurrently perform with the user equipment, and
      receive an end marker provided to the data to be forwarded.

3. A secondary base station in a mobile communication system in which a master base station, that performs radio communication via a processing, unit, and the secondary base station, that forwards data via a transmitter, concurrently perform radio communication with a user equipment, the secondary base station comprising:
   the transmitter, that is configured to
      when the master base station that performs radio communication with the user equipment is changed to a target base station, forward data to the master base station, and the secondary base station is released from radio communication that the master base station and the secondary base station concurrently perform with the user equipment, and
      provide an end marker to the data to be forwarded.

4. A user equipment in a mobile communication system in which a master base station, that performs radio communication via a processing unit, and a secondary base station, that forwards data via a transmitter, concurrently perform radio communication with the user equipment,
   wherein when the user equipment changes the master base station that performs radio communication with the user equipment to a target base station, the secondary base station forwards data to the master base station, and the secondary base station is released from radio communication that the master base station and the secondary base station concurrently perform with the user equipment, and
   an end marker is provided to the data to be forwarded.

* * * * *